United States Patent [19]
Mano et al.

[11] Patent Number: 5,538,656
[45] Date of Patent: Jul. 23, 1996

[54] MAGNETIC OXIDE AND PROCESS FOR PRODUCING SAME

[75] Inventors: Yasuhiko Mano, Toyohashi; Takeshi Mochizuki, Shizuoka; Isamu Sasaki; Akira Shimokawa, both of Kosai, all of Japan

[73] Assignee: Fuji Electrochemical Co., Ltd., Tokyo, Japan

[21] Appl. No.: 387,722

[22] PCT Filed: Jul. 4, 1994

[86] PCT No.: PCT/JP94/01082

§ 371 Date: Feb. 16, 1995

§ 102(e) Date: Feb. 16, 1995

[87] PCT Pub. No.: WO95/06948

PCT Pub. Date: Mar. 9, 1995

[30] Foreign Application Priority Data

| Aug. 31, 1993 | [JP] | Japan | 5-215873 |
| Oct. 20, 1993 | [JP] | Japan | 5-262223 |
| Oct. 20, 1993 | [JP] | Japan | 5-262224 |
| Feb. 15, 1994 | [JP] | Japan | 5-018758 |

[51] Int. Cl.$^6$ .............. H01F 1/00; H01F 1/11; H01F 1/36

[52] U.S. Cl. .............. 252/62.59; 252/62.56; 252/62.62; 252/62.63

[58] Field of Search .............. 423/632, 633; 252/62.56, 62.63, 62.59, 62.62

[56] References Cited

U.S. PATENT DOCUMENTS

3,929,657 12/1975 Jones .............. 252/62.1 P

FOREIGN PATENT DOCUMENTS

| 62-37782 | of 1987 | Japan . |
| 62-238580 | of 1987 | Japan . |
| 63-184764 | of 1988 | Japan . |
| 2-51505 | of 1990 | Japan . |
| 2-39498 | of 1990 | Japan . |

*Primary Examiner*—Melissa Bonner
*Attorney, Agent, or Firm*—Jacobson, Price, Holman & Stern

[57] ABSTRACT

A magnetic oxide obtained by mixing a given amount ranging from 0.20 to 76.0% by weight of at least one member selected from among Ca, Ti, Sn, Si and Mg magnetization control (regulation) materials with hematite, a mixture of hematite and magnetite, or magnetite as a starting material to obtain a mixed powder, adding 0.1 to 4.0% by weight of a liquid or powder substance having a carbon-to-carbon single or double bond to the mixed powder, stirring the mixture to obtain a substantially homogeneous mixture and sintering the obtained mixture in an inert gas at 550° to 1500° C., and a process for producing the same.

16 Claims, 9 Drawing Sheets

1

MAGNETIC OXIDE AND PROCESS FOR PRODUCING SAME

TECHNICAL FIELD

The present invention relates to a magnetic oxide suitable for use in a wide range of technical fields, e.g., those of toners and carriers for electrophotography, electric resistance elements and magnetic fluids, which magnetic oxide is produced by mixing a magnetization control material of Ca, Ti, Sn, Si or Mg with hematite, hematite+magnetite, or magnetite to obtain a mixed powder and sintering the mixed powder so that it exhibits a given saturation magnetization. Also, the present invention relates to a process for producing the above magnetic oxide.

BACKGROUND ART

A single phase magnetite powder as one of the magnetic oxides has been utilized in a wide range of technical fields, e.g., those of magnetic fluids, electric resistance elements and toners and carriers for electrophotography. It is highly desired in the art to mass-produce a single phase magnetite powder exhibiting any predetermined saturation magnetization at a lowered cost.

The following three general methods are known for producing such a magnetite, and it is know that they have respective drawbacks as described below.

(1) Wet Process: an aqueous solution of $Fe^{2+}+2Fe^{+3}$ is rendered alkaline and coprecipitated.
   Drawbacks: production cost is high and it is not suitable for mass production, although fine particles each having a relatively high purity are readily obtained by coprecipitation.
(2) Dry Process: hematite is heated in either hydrogen and carbon monoxide or steam to thereby be reduced.
   Drawbacks: the reaction is performed in a relatively highly reducing atmosphere, e.g., either high pressure steam or hydrogen and carbon monoxide, so that danger accompanies the mass production, and that large scale equipment is required.
(3) Process in which natural magnetite is pulverized.
   Drawbacks: a natural mineral is used as a starting material, so that it is difficult to stably produce fine quality powder for a prolonged period of time.

The magnetite powders produced by the above conventional processes have a drawback in that their saturation magnetization values are so high as compared with those of the conventional spinel ferrite that it is unfeasible to attain control of the saturation magnetization by composition regulation with the result that the conventional magnetite powders cannot be employed in use in which the saturation magnetization values inherent in magnetite powder are unacceptable. Magnetite powder having a saturation magnetization value inherent therein (fixed value specified in the second experimental example described later, e.g., up to 92 emu/g) has only partly been employed in use in carriers for electrophotographic development and the like. Moreover, the above magnetite powder having the saturation magnetization value inherent therein as it is cannot replace ferrite or the like in uses in which it has been employed, and, when the replacement is to be made, it is required to alter the circuit or device to be employed disadvantageously.

Taking into account the advantages and disadvantages of the above processes, various proposals have been made with respect to the production of magnetite powder for use in magnetic toners for electrophotography, etc.

For example, Japanese Patent Publication Nos. 238,580/1987, 39,498/1990 and 51,505/1990 disclose processes for producing magnetite useful as a carrier component of an electrophotographic developer, especially a two-component developer composed of a toner and a carrier. Each of these processes comprises providing magnetite powder (or globular magnetite particles) as a starting material, granulating the same into globular grains through, for example, mixing with a binder, followed by heating (sintering), and applying a resin coating to the resultant globular magnetite particles according to the conventional technique.

The use of a material called soft ferrite as carrier particles is known (U.S. Pat. No. 3,929,657, etc.). In this connection, it is known that the carrier particles each composed of the above ferrite not only are excellent in magnetic properties but also do not require a resin coating layer, so that their durability is excellent. Nothing that ferrite particles have resistance variations depending on the control of sintering atmosphere, even with the same composition, attempts have been made to enlarge resistance variation ranges by changing the sintering atmosphere. As an example thereof, there can be mentioned an attempt described in Japanese Patent Publication No. 37782/1987. This comprises providing an Mg ferrite as a starting material and increasing the amount of ferric oxide ($Fe_2O_3$) to more that 53% by mole so as to enlarge its resistance variation range.

DISCLOSURE OF THE INVENTION

The Inventor's primary object, in view of the above prior art, is to easily mass-produce a magnetic oxide, in particular, a magnetic oxide exhibiting any desired saturation magnetization at a lowered cost by mixing a magnetization control material of Ca, Ti, Sn, Si or Mg with hematite, hematite+magnetite, or magnetite to obtain a mixed powder, further mixing a substance having a carbon-to-carbon single or double bond with the mixed powder and sintering the obtained mixture.

Another object of the present invention is to provide a process for mass-producing the above magnetic oxide of fine quality at a lowered cost and safely by simple equipment and operation, as compared with the above conventional processes.

A further object of the present invention is to provide a process for mass-producing the above magnetic oxide having any desired saturation magnetization value.

According to the present invention, there is provided a magnetic oxide obtained by mixing a given amount ranging from 0.20 to 76.0% by weight of at least one member selected from among Ca, Ti, Sn, Si and Mg magnetization control (regulation) materials with hematite, hematite+magnetite, or magnetite as a starting material to obtain a mixed powder, adding 0.1 to 4.0% by weight of a liquid or powdery substance having a carbon-to-carbon single or double bond to the mixed powder, stirring the mixture to obtain a substantially homogeneous mixture and sintering the obtained mixture in an inert gas at 550° to 1500° C., and also provided is a process for producing the same.

In the above magnetic oxide and the process for producing the same, preferred conditions for embodying the present invention are as set forth below with respect to each magnetization control material.

In the employment of Ca compound
  (1) Starting material: hematite or hematite+magnetite
     Ca compound: 1.43 to 64.0% by weight (in terms of Ca)
     Sintering temperature: 1200° to 1450° C.

(2) Starting material: magnetite
Ca compound: 1.43 to 64.0% by weight (in terms of Ca)
Sintering temperature: 550° to 1450° C.
In the employment of Ti compound
(3) Starting material: hematite+magnetite
Hematite: 0.0 to 79.0% by weight
Magnetite: 9.8 to 98.8% by weight
Ti compound: 1.2 to 52.7% by weight (in terms of Ti)
Sintering temperature: 1200° to 1450° C.
(4) Magnetite: 47.3 to 98.8% by weight
Ti compound: 1.2 to 52.7% by weight
Sintering temperature: 550° to 1450° C.
In the employment of Sn compound
(5) Hematite or hematite+magnetite: 24.0 to 99.2% by weight
Sn compound: 0.8 to 76.0% by weight
Sintering temperature: 1200° to 1450° C.
(6) Magnetite: 24.0 to 99.2% by weight
Sn compound: 0.8 to 76.0% by weight
Sintering temperature: 550° to 1450° C.
In the employment of Si compound
(7) Hematite (or hematite+magnetite): 35 to 99.5% by weight
Si compound: 0.5 to 65% by weight
Sintering temperature: 1200° to 1450° C.
(8) Magnetite: 35 to 99.5% by weight
Si compound: 35 to 99.5% by weight
Sintering temperature: 550° to 1450° C.
In the employment of Mg compound
(9) Starting compound: hematite (or hematite+magnetite)
Mg compound: 0.20 to 18.50% by weight
Sintering temperature: 550° to 1500° C.
(10) Starting compound: magnetite
Mg compound: 0.20 to 26.20% by weight
Sintering temperature: 550° to 1500° C.
(11) Starting compound: hematite (or hematite+magnetite)
Addition of manganese: 0.20 to 10.0% by weight
Mg compound: 0.20 to 26.20% by weight
Sintering temperature: 550° to 1500° C.
(12) Starting compound: magnetite
Addition of manganese: 0.20 to 10.0% by weight
Mg compound: 0.20 to 26.20% by weight
Sintering temperature: 550° to 1500° C.

BEST MODE FOR CARRYING OUT THE INVENTION

Preferred embodiments of the present invention will now be described with reference to the following Experimental Examples.

First Embodiment

Figure 1:
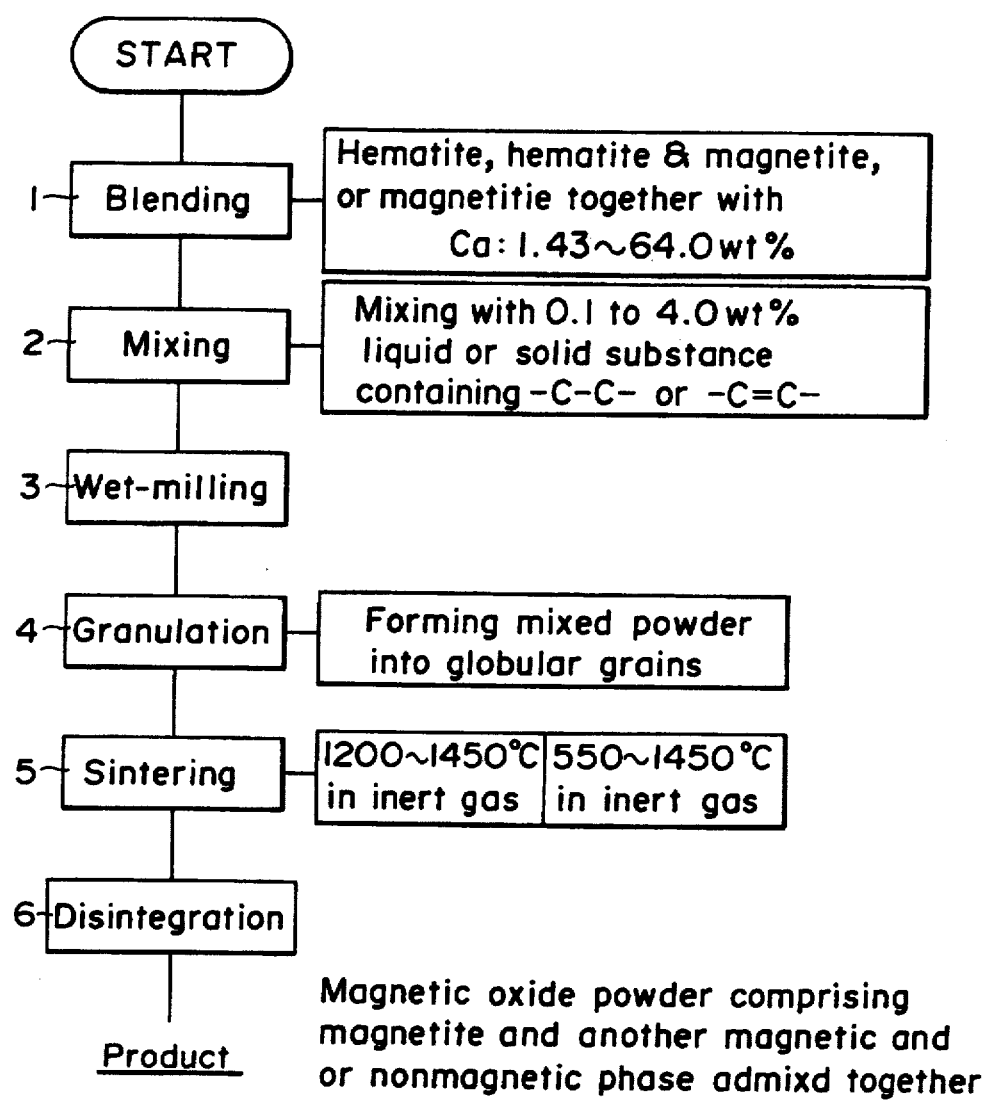
FIG. 1 is an explanatory view of the steps taken in the first embodiment of the present invention.

Referring to FIG. 1, hematite, hematite+magnetite, or magnetite is blended with 1.43 to 64.0% by weight of Ca to form a mixed powder in the blending step 1. The term "Ca" is employed herein for simplification of the description of the specification, and means the Ca moiety, expressed in % by weight, of organic and inorganic compounds each containing Ca, such as $CaO$, $CaCO_3$, $Ca(OH)_2$, $CaCl_2$ and $CaF_2$. The sum of the weight percentage of hematite, hematite+magnetite, or magnetite and the 1.43 to 64.0% by weight of this Ca is 100% by weight (that is, for example, the weight percentage of the "O" moiety of CaO is not contained n the value of 100% by weight). The terminology "hematite+magnetite" employed herein means a mixture (mixed powder) of hematite and magnetite. In particular, the magnetite as a starting material may be either of:

(1) magnetite powder (produced in the house or purchased from other companies), and
(2) magnetite powder obtained by pulverizing a product having an off-specification particle size (recovered item) so as for the same to have the given particle size.

The product grains described later are those each composed of, for example, $10^3$ to $10^7$ starting powder particles (1–3 μm) gathered into a globular form having a diameter of 50 to 100 μm. Thus, any once produced magnetite powder product (off-specification item) can be pulverized to thereby easily obtain the desired starting material powder.

In the mixing step 2, the above mixed powder is mixed with 0.1 to 4.0% by weight of a compound having —C—C— or —C=C— in its molecules (liquid or solid substance). For example, 2% by weight of PVA (polyvinyl alcohol) as a binder and 1% by weight of a polycarboxylate as a dispersant are added to hematite powder as a starting material, and further water is added for granulation into globular grains. The amount of waster added is in the range of 30 to 70% by weight. When the amount of water was less that 30% by weight, the viscosity of a slurry obtained by milling was too high to be granulated into globular grains. On the other hand, when the amount of waster exceeded 70% by weight, the slurry concentration was too low to be granulated into dense globular grains.

In the wet-milling step 3, the mixture obtained in the mixing step 2 is wetly crushed in an attrition mill to thereby prepare a slurry having a mixed powder concentration of about 50% by weight.

In the granulating step 4, globular grains are formed. In this step, the slurry is agitated in an attrition mill for 1 hr, and subjected to hot-air drying by a spray dryer to obtain globular grains.

In the sintering step 5, the grains obtained in the granulating step 4 are heated at 1200° to 1450° C., provided that those of magnetite may be heated at 550° to 1450° C., in an atmosphere of an inert gas such as nitrogen gas for 2 hr to thereby obtain powder in which single phase magnetite and another magnetic and/or nonmagnetic phase are coexistent. The value of saturation magnetization of the powder can be regulated by the amount of Ca added, so that it is feasible to produce a powdery magnetic oxide having any desired saturation magnetization by changing the amount of Ca added (see Tables 1 to 4). When hematite is present in part of the hematite or magnetite powder, during the 1200° to 1450° C. sintering step 5, not only is the thermal transition from hematite to magnetite effected in the inert gas (in weakly reducing atmosphere) but also the organic substance mixed is brought by the heating in the inert gas into the state of incomplete combustion, in which the hematite is deprived of oxygen during the thermal decomposition of the organic substance to thereby be reduced to markedly promote the conversion to magnetite. In particular, with respect to magnetite, a magnetic oxide having any desired saturation magnetization can be obtained by the sintering at temperatures as relatively low as 550° to 1450° C. This is because there is no need for newly making conversion into magnetite (reduction of hematite), so that the strength required for handling, etc. can be obtained by bonding or mild sintering of the starting material magnetite in the form of a vast plurality of grains.

In the disintegration step 6, the powder in which single phase magnetite and nonmagnetic phase are coexistent, obtained in the sintering step 5, is crushed into a product. According to the above steps, hematite, hematite+magnetite, or magnetite is mixed with the above Ca to obtain a mixed powder, and this mixed powder is further mixed with a compound having —C—C— or —C=C— in its molecules (liquid or solid substance) and water, milled well, hot-air dried, granulated into globular grains and sintered in an inert gas at 1200° to 1450° C., provided that the sintering of magnetite is conducted at 550° to 1450° C., so that the powder in which magnetite and nonmagnetic phase are coexistent (magnetic oxide powder) can be produced. Thus, it has become feasible to safely mass-produce the magnetic oxide powder having any desired saturation magnetization at a lowered cost. Descriptions will be made in order below.

Table 1 shows sintering experiment results (hematite) of the present invention. In the experiment, Ca was blended with hematite powder in the amount specified in the Table, and mixed with water to obtain a slurry having a powder concentration of 50% by weight. The slurry was agitated in an attrition mill for 1 hr, and dried at 110° C. 1.0% by weight of polyvinyl alcohol was added to the obtained powder. The mixture was mixed in a mortar, and sifted through a 425-μm-mesh standard sieve to obtain grains. 0.5 g of the resultant grains were put in a cylindrical mold having a diameter of 12.5 mm, and shaped under a molding pressure of 1 t/cm$^2$. The molding was heated at 1100° to 1500° C. for 2 hr in nitrogen gas. The saturation magnetization of each sample after the heating was measured by means of an vibrating sample magnetometer.

(1) When Ca was not added (Sample Nos. 9, 17 and 25) and the conversion to single phase magnetite was effected, the saturation magnetization of each of the samples was 92 emu/g.

(2) When the heating was conducted at 1100° C., the conversion to magnetite was incomplete so as for hematite ($\alpha$-Fe$_2$O$_3$) to remain with the result that the saturation magnetization values of Sample Nos. 1 to 8 were 80 emu/g or less to show the inappropriateness of the heating temperature of 1100° C. On the other hand, when the heating was conducted at 1500° C., the conversion to magnetite was incomplete so as to form wustite (FeO) with the result that the saturation magnetization values of Sample Nos. 33 to 40 were as low as 87 emu/g or less to show the inappropriateness of the heating temperature of 1500° C. Therefore, it has been found that the appropriate heating temperature is in the range of 1200° to 1450° C., the amount of Ca added was increased from 0% by weight. Sample Nos. 11, 19 and 27 of Table 1 containing Ca in an amount of 1.43% by weight exhibited a slight change in saturation magnetization as compared with the sample not containing Ca. The above value of 1.43% by weight was taken as the lower limit of the amount of Ca to be added. On the other hand, the upper limit of the amount of Ca to be added was taken as 10.65% by weight at which the saturation magnetization attributed to the nonmagnetic phase formed by the amount of Ca increased from 1.43% by weight was 20 to 10 emu/g or which was just below the value at which melting would occur during the sintering. Therefore, the amount of Ca to be added to hematite was appropriately in the range of 1.43 to 10.65% by weight.

It has been found from the above experimental results that powder (magnetic oxide) having an arbitrary saturation magnetization in which magnetite and nonmagnetic phase are coexistent can be formed by sintering at 1200° to 1450° C. for 2 hr a mixed powder obtained by mixing 1.43 to 10.65% by weight of Ca with hematite.

Table 2 shows sintering experiment results regarding hematite+magnetite. In the experiment, Ca was blended in the amount specified in the Table with powder of 1:1 mixture of hematite and magnetite, and treated and measured in the same manner as described above with respect to Table 1.

(1) When Ca was not added (Sample Nos. 9, 17 and 25), the saturation magnetization of each of the samples was 92 emu/g.

(2) When the heating was conducted at 1100° C., the conversion to magnetite was incomplete so as for hematite ($\alpha$-FE$_2$O$_3$) to remain with the result that the saturation magnetization values of Sample Nos. 1 to 8 saturation magnetization values of Sample Nos. 1 to 8 were 67 emu/g or less to show the inappropriateness of the heating temperature of 1100° C. On the other hand, when the heating was conducted at 1500° C., the conversion to magnetite was incomplete so as to form wustite (FeO) with the result that the saturation magnetization values of Sample Nos. 33 to 40 were as low as 87 emu/g or less to show the inappropriateness of the heating temperature of 1500° C. Therefore, it has been found that the appropriate heating temperature is in the range of 1200° to 1450° C.

(3) while the heating was conducted at a temperature ranging from 1200° to 1450° C., the amount of Ca added was increased from 0% by weight. Sample Nos. 11, 19 and 27 of Table 2 containing Ca in an amount of 1.43% by weight exhibited a slight change in saturation magnetization as compared with the sample not containing Ca. The above value of 1.43% by weight was taken as the lower limit of the amount of Ca to be added. On the other hand, the upper limit of the amount of Ca to be added was taken as 10.65% by weight at which the saturation magnetization attributed to the nonmagnetic phase formed by the amount of Ca increased from 1.43% by weight was 20 to 10 emu/g or which was just below the value at which melting would occur during the sintering. Therefore, the amount of Ca to be added to hematite+magnetite was appropriately in the range of 1.43 to 10.65% by weight.

It has been found from the above experimental results that powder (magnetic oxide) having an arbitrary saturation magnetization in which magnetite and nonmagnetic phase are coexistent can be formed by sintering at 1200° to 1450° C. for 2 hr a mixed powder obtained by mixing 1.43 to 10.65% by weight of Ca with hematite+magnetite.

Table 3 shows sintering experiment results regarding magnetite. In the experiment, Ca was blended with magnetite powder in the amount specified in the Table, and treated and measured in the same manner as described above with respect to Table 1.

(1) When Ca was not added (Sample Nos. 13, 25, 37, 49, 61 and 73), the saturation magnetization of each of the samples was 91 to 92 emu/g.

(2) When the heating was conducted at 500° C., the magnetite was converted to hematite ($\alpha$-$FE_2O_3$) with the result that the saturation magnetization values of Sample Nos. 1 to 12 were as low as 86 emu/g to show the inappropriateness of the heating temperature of 500° C. The cause of the phenomenon of the above conversion has been found to be the partial oxidation of the magnetite to hematite by a trace (for example, on the order of 10 ppm) of inevitable $O_2$ contained in the inert gas (nitrogen gas in this embodiment). On the other hand, when the heating was conducted at 1500° C., the magnetite was converted to wustite (FeO) with the result that the saturation magnetization values of Sample Nos. 85 to 96 were as low as 86 emu/g or less to show the inappropriateness of the heating temperature of 1500° C. Therefore, it has been found that the appropriate heating temperature is in the range of 550° to 1450° C.

(3) While the heating was conducted at a temperature ranging from 550° to 1450° C., the amount of Ca added was increased from 0% by weight. Sample Nos. 15, 27, 39, 51 63 and 75 of Table 3 containing Ca in an amount of 1,434 by weight exhibited a slight change in saturation magnetization as compared with the sample not containing Ca. The above value of 1.43% by weight was taken as the lower limit of the amount of Ca to be added. On the other hand, the upper limit of the amount of Ca to be added was taken as 64.0% by weight at which the saturation magnetization attributed to the nonmagnetic phase formed by the amount of Ca increased from 1.43% by weight was as low as 20 to 10 emu/g as observed with respect to Sample Nos. 24, 36, 45 and 57 of Table 3 or which was just below the value at which melting would occur during the sintering. Therefore, the amount of Ca to be added to magnetite was appropriately in the range of 1.43 to 64.0% by weight.

It has been found from the above experimental results that powder (magnetic oxide powder) having an arbitrary saturation magnetization in which magnetite and nonmagnetic phase are coexistent can be formed by sintering at 550° to 1450° C. for 2 hr a mixed powder obtained by mixing 1.43 to 64.0% by weight of Ca with magnetite.

Figure 2:
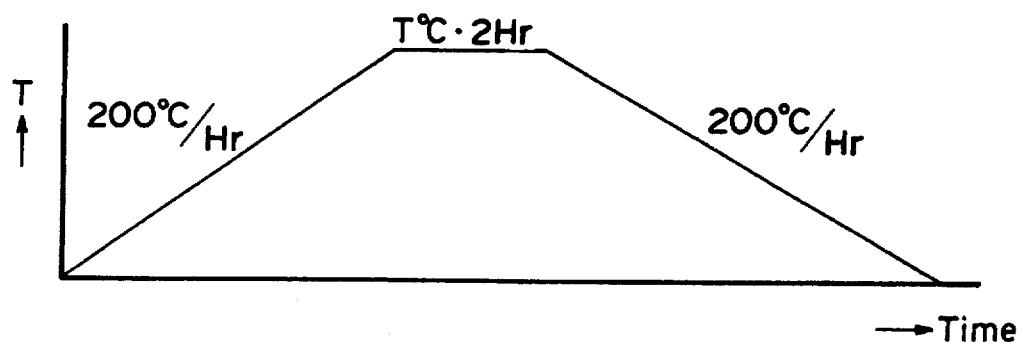
FIG. 2 is a view of an exemplary heating curve suitable for sintering in the first embodiment.

FIG. 2 illustrates an exemplary heating curve suitable for the present invention. The curve shows an exemplary course of heating in which heating is conducted at T°C. for 2 hr. In particular, the heating is so performed that the temperature is elevated at a rate of 200° C./hr from room temperature to T°C., which is held for 2 hr. Thereafter, the temperature is lowered to room temperature at a rate of 200° C./hr. Herein, T°C. is the heating temperature specified in Tables 1 to 3.

Figure 3:
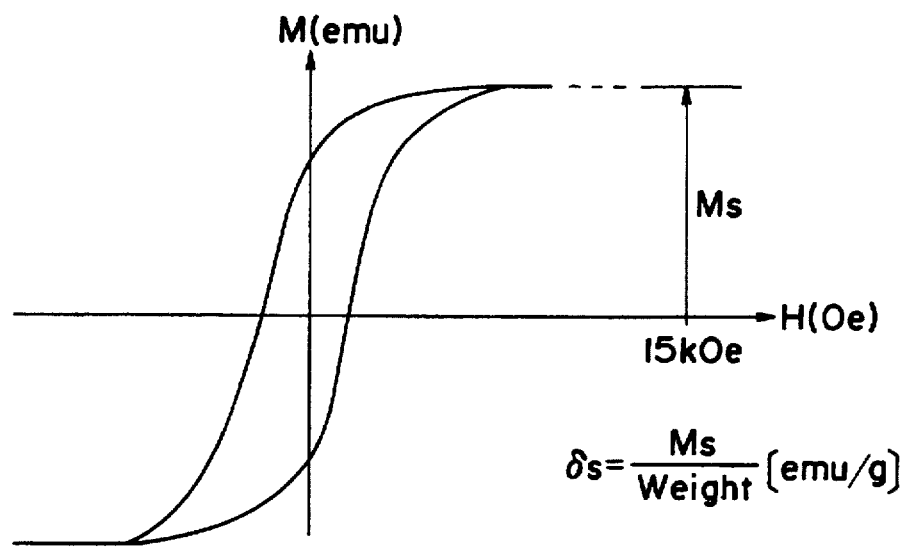
FIG. 3 is an explanatory view of the saturation magnetization referred to in the present invention.

FIG. 3 illustrates the saturation magnetization referred to in the present invention. In particular, it is an explanatory view of the measurement of the saturation magnetization shown in Table 1 to 3. The axis of abscissa indicates the intensity of applied magnetic field (H Oe) while the axis of ordinate indicates the corresponding intensity of magnetization (M emu). The intensity of magnetization (Ms emu) of powder in which magnetite and nonmagnetic phase are coexistent is measured by the use of an vibrating sample magnetometer while keeping the application of, for example, 15 kOe magnetic field as specified in FIG. 3. The saturation magnetization is calculated by the following formula specified in the figure:

$$\delta = Ms/[\text{weight (g) of sample powder}][emu/g]$$

The values calculated by the above formula are shown as the saturation magnetization $\delta$ s in Tables 1 to 3.

In the above embodiment, the saturation magnetization of magnetite is regulated only through the nonmagnetic phase created by the addition of Ca. In this connection, the saturation magnetization may further finely be regulated by the formation of an oxide phase (hematite, calcium peroxide, etc.), for example, on the surface of the magnetite powder.

Second Embodiment

Figure 4:
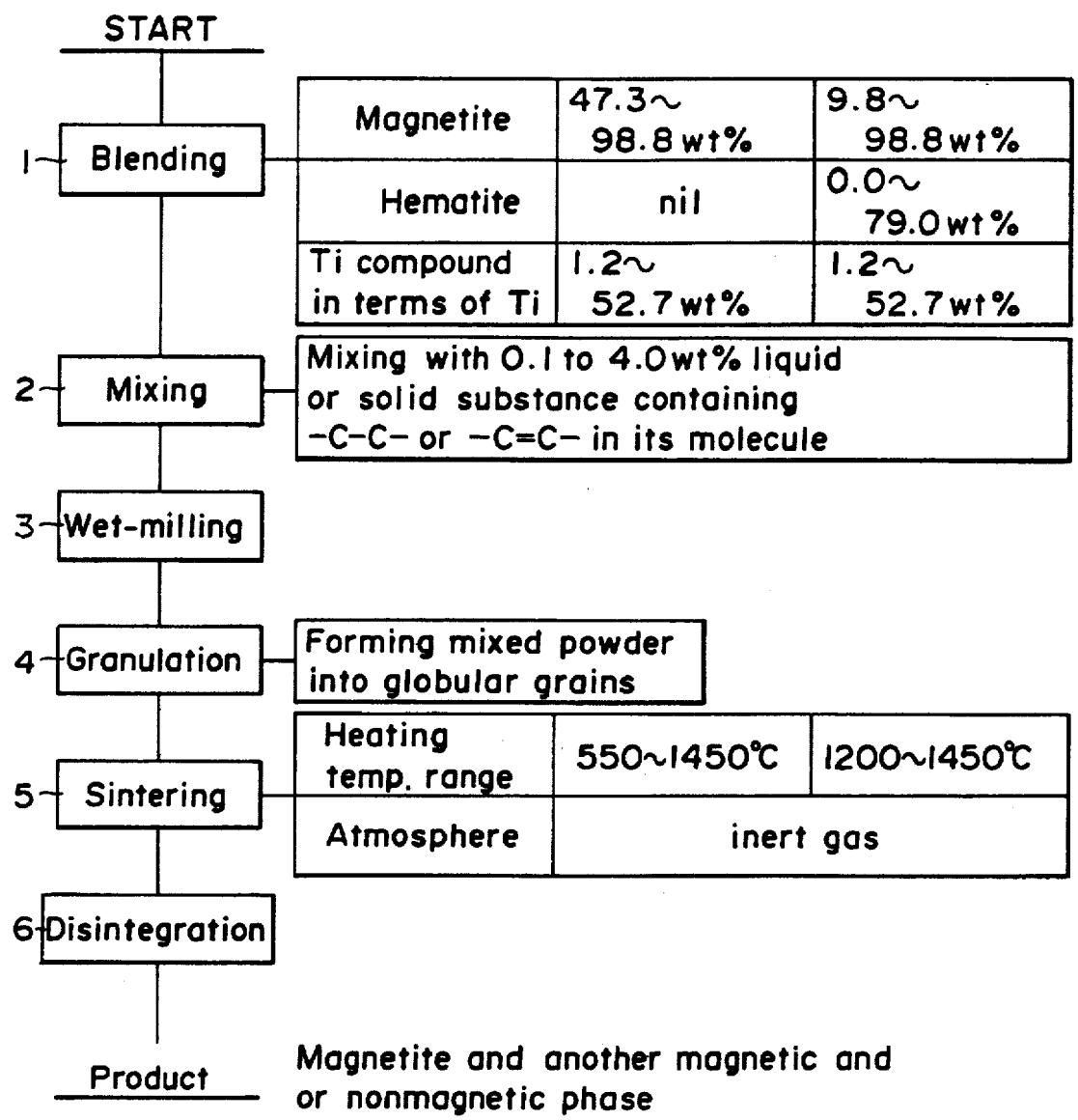
FIG. 4 is an explanatory view of the steps taken in the second embodiment of the present invention.

The production of magnetic oxides having desired saturation magnetization values by mixing Ti compounds with magnetite or magnetite+hematite will now be described referring to FIGS. 4 and 5 and Tables 5 to 7.

| magnetite | 47.3–98.8% by weight | 9.8–98.8% by weight |
| hematite | none | 0.0–79.0% by weight |
| Ti compound | 1.2–52.7% by weight | 1.2–52.7% by weight |

(Value for Ti compound: in terms of Ti)

In the mixing step 2, the above mixed powder is mixed with 0.1 to 4.0% by weight of a compound having —C—C or —C≡C— in its molecules (liquid or solid substance). For example, 2% by weight of PVA (polyvinyl alcohol) as a binder and 1% by weight of a polycarboxylate as a dispersant are added to the mixed powder as a starting material, and further water is added for granulation into globular grains. The amount of water added is in the range of 30 to 70% by weight. When the amount of water was less that 30% by weight, the viscosity of a slurry obtained by milling was too high to be granulated into globular grains. On the other hand, when the amount of water exceeded 70% by weight, the slurry concentration was too low to be granulated into dense globular grains.

In the wet-milling step 3, the mixture obtained in the mixing step 2 is wet milled in an attrition mill to thereby prepare a slurry having a mixed powder concentration of about 50% by weight.

In the granulating step 4, globular grains are formed. In thus step, the slurry is agitated in an attrition mill for 1 hr, and subjected to hot-air drying by a spray dryer to obtain globular grains.

In the sintering step 5, the grains obtained in the granulating step 4 are heated at 550° to 1450° C. (with respect to magnetite) in an atmosphere of an inert gas such as nitrogen gas for 2 hr to thereby form magnetite and another magnetic and/or nonmagnetic phase. The ratio of the nonmagnetic phase can be controlled by regulating the amount, in terms of Ti, of Ti compound added, so that it is feasible to produce a magnetic oxide having any desired saturation magnetization by changing the amount of Ti compound added (see FIG. 5). When hematite is present in part of the magnetite powder, during the 1200° to 1450° C. sintering step 5, not only is the thermal transition from hematite to magnetite effected in the inert gas (in weakly reducing atmosphere) but also the organic substance mixed is brought by the heating in the inert gas into the state of incomplete combustion, in which the hematite is deprived of oxygen during the thermal decomposition of the organic substance to thereby be reduced so as to markedly promote the conversion to magnetite.

In the disintegration step 6, the powder in which magnetite and nonmagnetic phase are coexistent, obtained in the sintering step 5, is crushed into a product.

According to the above steps, magnetite or magnetite+ hematite is mixed with the Ti compound to obtain a mixed powder, and this mixed powder is further mixed with a compound having —C—C— or —C=C— in its molecules (liquid or solid substance) and water, milled well, hot-air dried, granulated into globular grains and sintered in an inert gas at 550° to 1450° C. (for only magnetite as the starting material) or 1200° to 1450° C. (for magnetite+hematite), so that the powder in which magnetite and another magnetic and/or nonmagnetic phase are coexistent (magnetic oxide powder) can be produced. Thus, it has become feasible to safely mass-produce the magnetic oxide powder having any desired saturation magnetization at a lowered cost.

Table 4 shows sintering experiment results ($TiO_2$: 0% by weight). PVA (polyvinyl alcohol) was added as a binder in the amount specified in Table 4 to hematite powder, and 1% by weight of a polycarboxylate as a dispersant and further water were added and agitated for granulation into grains. The resultant grains were sintered at the temperature specified in the Table, and the qualitative analysis thereof by powder X-ray diffractometry was conducted. Results are shown in Table 4. The following has been found from the results.

(1) No single phase magnetite was obtained from only hematite powder without the addition of PVA (Sample Nos. 1 to 8), even if the heating temperature was changed. The X-ray diffraction pattern shows the presence of the phase of $\alpha\text{-FE}_2O_3$ or FeO.

(2) When the amount of PVA added was set at 2% by weight and the heating temperature was varied, single phase magnetite ($Fe_3O_4$ only) (Sample Nos. 13 to 15) was obtained at heating temperatures ranging from 1200° to 1450° C. $\alpha\text{-FE}_2O_3$ was coexistent at heating temperatures of 1150° C. or below (Sample Nos. 9 to 12) and FeO was coexistent at heating temperatures of 1500° C. or above (Sample No. 16). Therefore, it is requisite that the heating temperature be in the range of 1200° to 1450° C. (Sample Nos. 13 to 15).

(3) At a heating temperature of 1300° C., the amount of PVA added was varied between 0.1 and 3.0% by weight. Single phase magnetite was obtained without exception (Sample Nos. 17 to 22).

It has been found from the above experimental results that single phase magnetite is formed as long as the amount of PVA added to hematite powder is 0.1% by weight (4% by weight) and the sintering is conducted at temperatures ranging from 1200° to 1450° C.

Tables 5 and 6 show experimental example results (magnetite plus Ti) of the present invention. In this experimental example, 0.0 to 84.4% by weight, in terms of Ti of powdery titanium oxide ($TiO_2$) was mixed with magnetite powder, 1.0% by weight of polyvinyl alcohol was added, and further water was added and mixed to obtain a slurry having a powder concentration of 50% by weight. The slurry was agitated in an attrition mill for 1 hr, and granulated by means of a spray dryer. The thus obtained grains were heated at 400° to 1500° C. in nitrogen gas for 2 hr. The oxygen concentration of the nitrogen gas was measured by means of a zirconia oxygen concentration meter. The saturation magnetization of each heated sample was measured by means of the vibrating sample magnetometer (see FIG. 3 relating to the first embodiment). The material phase was identified by the powder X-ray diffractometry. The collapse test of each sample was conducted by the use of a microcompression tester (MCTM-500 manufactured by Shimadzu Corp.), and the corresponding grain strength was calculated according to the following Hiramatsu's formula.

(Grain strength)={2.8×(Breaking load of grains)}/{π×(Diameter of grain)$^2$}

(1) Heating temperature range

As shown in Table 5, the formation of hematite ($\alpha\text{-FE}_2O_3$) attributed to the oxidation by trace O contained in nitrogen gas was not detected when the heating was performed at 500° C. (Sample Nos. 1 to 12). However, the grains strength Pa was on the order of E6 (meaning $10^6$), so that the strength of globular grains formed by joining of a vast plurality of magnetite powder particles was weak to a practical disadvantage. On the other hand, it was found that, when the heating was performed at 1500° C. (Sample Nos. 85 to 96), wustite (FeO) was formed, so that the single phase magnetite ($Fe_3O_4$ only) cannot be obtained. Further, it was found that, when a Ti compound is mixed with magnetite as a starting material and the saturation magnetization is arbitrarily regulated by the formation of magnetite and another magnetic and/or nonmagnetic phase, the assurance of a strength required for actual handling by joining or mild sintering is satisfactory because it is not necessary to newly reduce the concerned magnetite for conversion to magnetite, so that desirable saturation magnetization regulation can be made even if the heating is performed at a temperature as low as 550° C.

The above demonstrates that the suitable heating temperature range is from 550° to 1450° C.

(2) Amount of Ti added (% by weight)

Upon noting the amount, in terms of Ti, of powdery titanium oxide added (Sample Nos. 13 to 84) within the heating temperature range of 550° to 1450° C. set in section (1) above, it was found that the saturation magnetization was continuously decreased from 90 to 0 emu/g as the above amount was increased from 1.2 to 52.7% by weight. When the amount of Ti added exceeded 52.7% by weight, the saturation magnetization was decreased to about 0 emu/g to thereby cause the magnetic oxide to lose practicability.

Therefore, it has been found that the suitable amount, in terms of Ti, of Ti compound added is in the range of 1.2 to 52.7% by weight.

The above demonstrates that desirable single phase magnetite and another magnetic and/or nonmagnetic phase can be formed by mixing 1.2 to 52.7% by weight, in terms of Ti, of a Ti compound with magnetite and effecting the heating at 550° to 1450° C. (provided that 0.2 to 4.0% by weight of a substance having a carbon-to-carbon single or double bond is also added).

Figure 5:
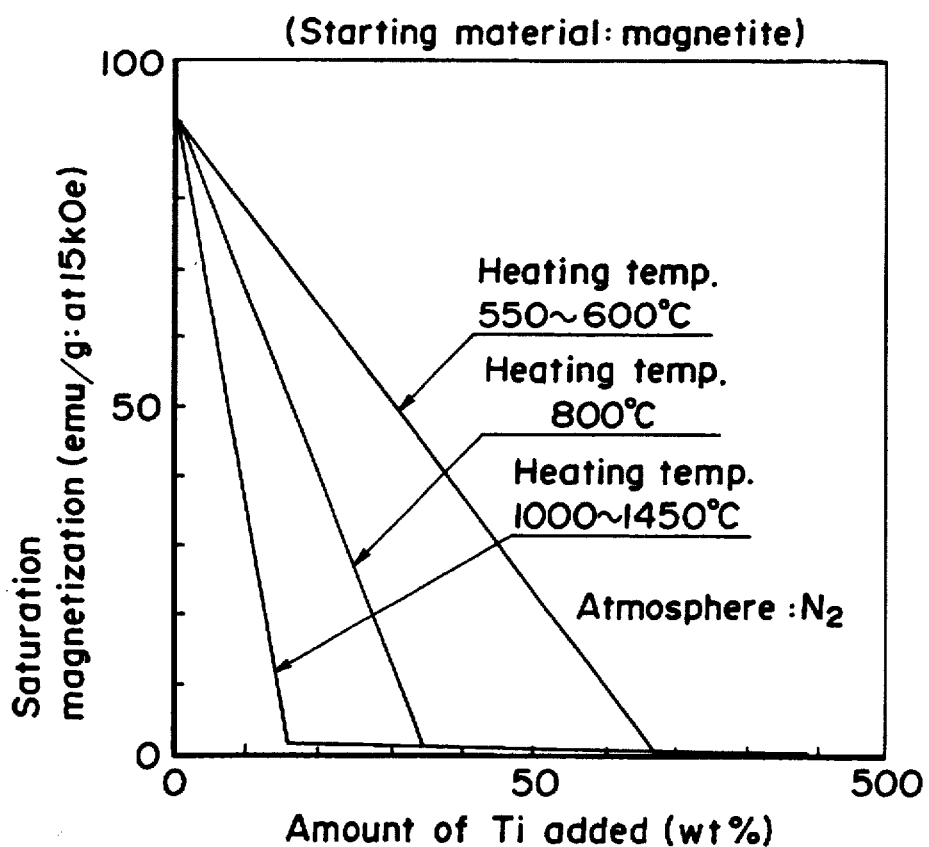
FIG. 5 is a view of an exemplary heating-cooling curve suitable for the second embodiment of the present invention.

FIG. 5 shows exemplary saturation magnetization curves as functions of the amount of Ti added. The saturation magnetization curves are drawn in a graph in which the axis of abscissa indicates the weight percentage, in terms of Ti, of a Ti compound added while the axis of ordinate indicates the corresponding saturation magnetization value. They represent experimental example results shown in Table 3. In particular, the saturation magnetization curves are line segments formed by plotting data shown in Table 3 with respect to each of the heating temperature range of 550° to 600° C., heating temperature of 800° C. and heating temperature range of 1100° to 1450° C. in a graph in which the axis of abscissa indicates the weight percentage of Ti added while the axis of ordinate indicates the corresponding saturation magnetization value emu/g and connecting the plots.

Once the saturation magnetization curves of FIG. 5 have been established, therefore, not only can the weight percentage of Ti to be added for obtaining the desired saturation magnetization emu/g be determined but also the saturation magnetization emu/g can contrarily be determined with respect to any certain weight percentage of Ti, to thereby ensure production of a magnetic oxide powder having a desired saturation magnetization.

Table 6 shows results of another experimental example (1:1 mixture of magnetite and hematite, Ti) according to the present invention. It shows experimental data obtained by varying the amount of Ti added as specified in the Table while the proportion of magnetite powder to hematite powder was kept at 1:1. In practice, 0.0 to 84.4% by weight, in terms of Ti, of titanium oxide ($TiO_2$) was mixed with a mixture of magnetite and hematite powders whose proportion was kept at 1:1, and granulated in the same manner as specified in Table 5. The resultant grains were heated at 1100° to 1500° C. in nitrogen gas for 2 hr. After the heating, the samples were measured in the same manner as specified in Table 5, and results are shown in Table 6.

(1) Heating temperature range

Table 6 demonstrates that the heating at 1100° C. (Sample Nos. 1 to 12) causes hematite ($\alpha$-$FE_2O_3$) to remain while the heating at 1500° C. (Sample Nos. 37 to 48) forms wustite (FeO), so that the single phase magnetite ($Fe_3O_4$ only) cannot be obtained.

Therefore, it has been found that the suitable heating temperature range is from 1200° to 1450° C.

(2) Amount of Ti added (% by weight)

Upon noting the amount, in terms of Ti, of powdery titanium oxide added (Sample Nos. 13 to 36) within the heating temperature range of 1200° to 1450° C. set in section (1) above, it was found that the saturation magnetization was continuously decreased from 87 to 0 eum/g as the above amount was increased from 1.2 to 52.7% by weight. When the amount of Ti added exceeded 52.7% by weight, the saturation magnetization was decreased to about 0 emu/g to thereby cause the magnetic oxide to lose practicability.

Therefore, it has been found that the suitable amount, in terms of Ti, of Ti compound to be added is in the range of 1.2 to 52.7% by weight.

The above demonstrates that desirable single phase magnetite and another magnetic and/or nonmagnetic phase can be formed by mixing 1.2 to 52.7% by weight, in terms of Ti, of a Ti compound with a 1:1 mixture of magnetite and hematite and effecting the heating at 1200° to 1450° C. (provided that 0.1 to 4.0% by weight of substance having a carbon-to carbon single or double bond is also added).

Table 7 shows results of an additional experimental example (1:3 mixture of magnetite and hematite, Ti). It shows experimental data obtained by varying the amount of Ti added as specified in the Table while the proportion of magnetite powder to hematite powder was kept at 1:3. In practice, 0.0 to 84.4% by weight, in terms of Ti, of powdery titanium oxide ($TiO_2$) was mixed with a mixture of magnetite and hematite powders whose proportion was kept at 1:3 in the same manner as specified in Table 6, and granulated in the same manner as specified in Table 5. The resultant grains were heated at 1100° to 1500° C. in nitrogen gas for 2 hr. After the heating, the samples were measured in the same manner as specified in Table 5, and results are shown in Table 7.

(1) Heating temperature range

Table 7 demonstrates that the heating at 1100° C. (Sample Nos. 1 to 12) causes hematite ($\alpha$-$FE_2O_3$) to remain while the heating at 1500° C. (Sample Nos. 37 to 48) forms wustite (FeO), so that the single phase magnetite ($Fe_3O_4$ only) cannot be obtained.

Therefore, it has been found that the suitable heating temperature range is from 1200° to 1450° C.

(2) Amount of Ti added (% by weight)

Upon noting the amount, in terms of Ti, of powdery titanium oxide added (Sample Nos. 13 to 36) within the heating temperature range of 1200° to 1450° C. set in section (1) above, it was found that the saturation magnetization was continuously decreased from 87 to 0 emu/g as the above amount was increased from 1.2 to 52.7% by weight. When the amount of Ti added exceeded 52.7% by weight, the saturation magnetization was decreased to about 0 emu/g to thereby cause the magnetic oxide to lose practicability.

Therefore, it has been found that the suitable amount, in terms of Ti, of Ti compound to be added is in the range of 1.2 to 52.7% by weight.

The above demonstrates that desirable single phase magnetite and another magnetic and/or nonmagnetic phase can be formed by mixing 1.2 to 52.7% by weight, in terms of Ti, of a Ti compound with a 1:3 mixture of magnetite and hematite and effecting the heating at 1200° to 1450° C. (provided that 0.1 to 4.0% by weight of a substance having a carbon-to-carbon single or double bond is also added).

Table 8 shows results of a further experimental example (1:4 mixture of magnetite and hematite, Ti). It shows experimental data obtained by varying the amount of Ti added as specified in the Table while the proportion of magnetite powder to hematite powder was kept at 1:4. In practice, 0.0 to 84.4% by weight, in terms of Ti, of powdery titanium oxide ($TiO_2$) was mixed with a mixture of magnetite and hematite powders whose proportion was kept at 1:4 in the same manner as specified in Table 6, and granulated in the same manner as specified in Table 5. The resultant grains were heated at 1100° to 1500° C. in nitrogen gas for 2 hr. After the heating, the samples were measured in the same manner as specified in Table 5, and results are shown in Table 8.

(1) Heating temperature range

Table 8 demonstrates that the heating at 1100° C. (Sample Nos. 1 to 12) causes hematite ($\alpha$-$FE_2O_3$) to remain while the heating at 1500° C. (Sample Nos. 37 to 48) forms wustite (FeO), so that the single phase magnetite ($Fe_3O_4$ only) cannot be obtained.

Therefore, it has been found that the suitable heating temperature range is from 1200° to 1450° C.

(2) Amount of Ti added (% by weight)

Upon noting the amount, in terms of Ti, of powdery titanium oxide added (Sample Nos. 13 to 36) within the heating temperature range of 1200° to 1450° C. set in section (1) above, it was found that the saturation magnetization was continuously decreased from 87 to 0 emu/g as the above amount was increased from 1.2 to 52.7% by weight. When the amount of Ti added exceeded 52.7% by weight, the saturation magnetization was decreased to about 0 emu/g to thereby cause the magnetic oxide to lose practicability.

Therefore, it has been found that the suitable amount, in terms of Ti, of Ti compound to be added is in the range of 12 to 52.7% by weight Therefore, it has been found that the suitable amount, in terms of Ti, of Ti compound to be added is in the range of 1.2 to 52.7% by weight.

The above demonstrates that desirable single phase magnetite and another magnetic and/or nonmagnetic phase can be formed by mixing 1.2 to 52.7% by weight, in terms of Ti, of a Ti compound with a 1:4 mixture of magnetite and hematite and effecting the heating at 1200° to 1450° C. (provided that 0.1 to 4.0% by weight of a substance having a carbon-to-carbon single or double bond is also added).

Detailed descriptions on the heating curves and the saturation magnetization measurements are omitted in view of the similarity to and obviousness from those for FIGS. 2 and 3 relating to the first embodiment of the present invention.
Third Embodiment The production of magnetic oxides having desired saturation magnetization values by mixing Sn compounds with hematite, hematite+magnetite, or magnetite will now be described referring to FIG. 6 and Tables 9 to 11.

Figure 6:
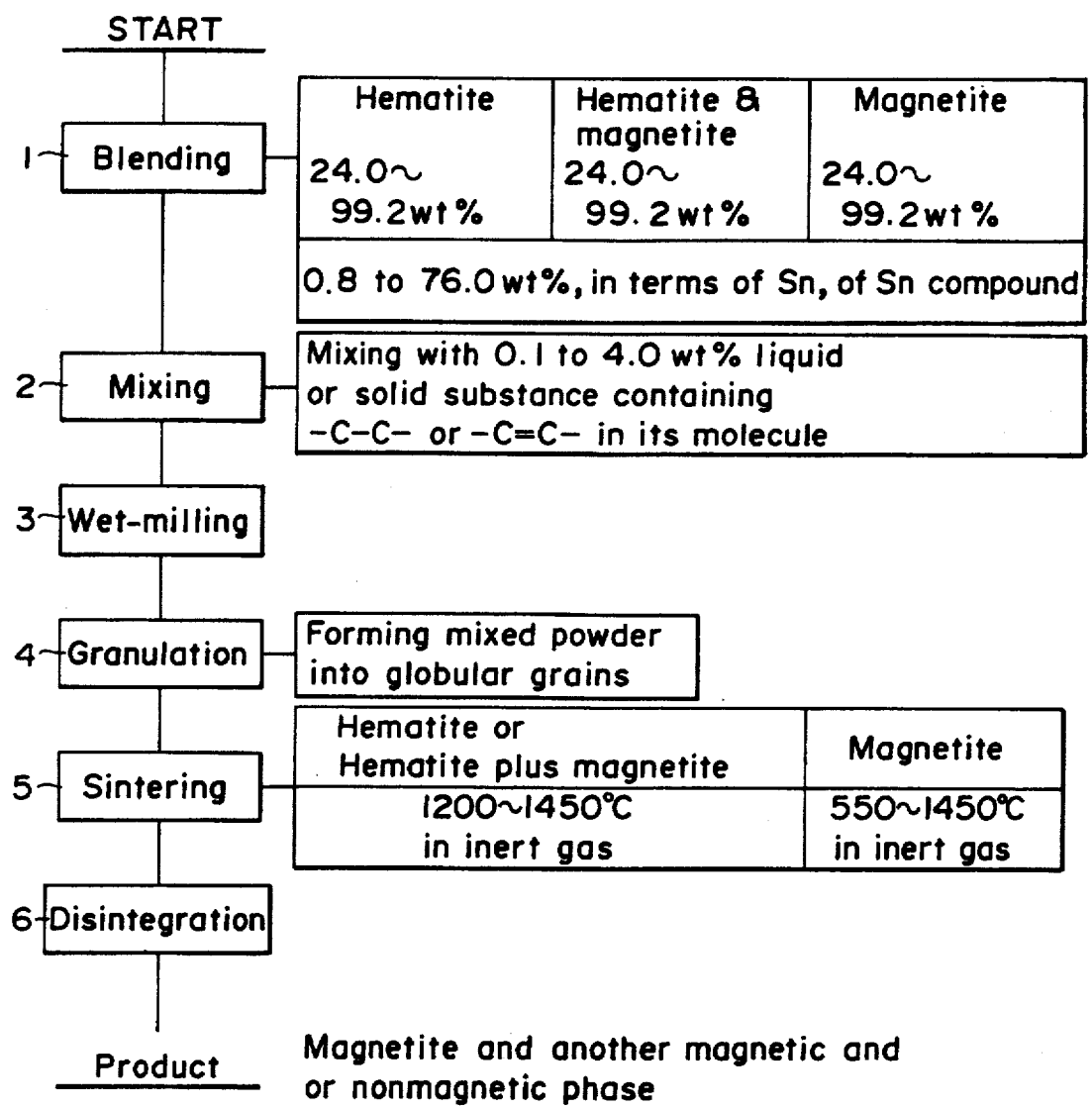
FIG. 6 is an explanatory view of the steps taken in the third embodiment of the present invention.

Referring now to FIG. 6, hematite, hematite+magnetite or magnetite and an Sn compound are weighed and blended in the following proportions in the blending step 1.

| | |
|---|---|
| hematite | 24.0–99.2% by weight |
| hematite + magnetite | 24.0–99.2% by weight, or |
| magnetite | 24.0–99.2% by weight |
| together with | 0.8–87.6% by weight. |
| Sn compound (in terms of Sn) | |

Thus, a mixed powder is obtained.

In the mixing step 2, the above mixed powder is mixed with 0.1 to 4.0% by weight of a compound having —C—C— or —C=C— in its molecules (liquid or solid substance). For example, 2% by weight of PVA (polyvinyl alcohol) as a binder and 1% by weight of a polycarboxylate as a dispersant are added to the mixed powder as a starting material, and further water is added for granulation into globular grains. The amount of water added is in the range of 30 to 70% by weight. When the amount of water was less than 30% by weight, the viscosity of a slurry obtained by milling was too high to be granulated into globular grains. On the other hand, when the amount of water exceeded 70% by weight, the slurry concentration was too low to be granulated into dense globular grains.

In the wet-milling step 3, the mixture obtained in the mixing step 2 is wet crushed in an attrition mill to thereby prepare a slurry having a mixed powder concentration of about 50% by weight.

In the granulating step 4, globular grains are formed. In this step, the slurry is agitated in an attrition mill for 1 hr, and subjected to hot-air drying by a spray dryer to obtain globular grains.

In the sintering step 5, the grains obtained in the granulating step 4 are heated at 1200° to 1450° C. (with respect to hematite or hematite+magnetite) or 550° to 1450° C. (with respect to magnetite) in an atmosphere of an inert gas such as nitrogen gas for 2 hr to thereby form magnetite and another magnetic and/or nonmagnetic phase. The ratio of the nonmagnetic phase can be controlled by regulating the amount, in terms of Sn, compound added, so that it is feasible to produce a magnetic oxide having any desired saturation magnetization by changing the amount of Sn compound added. When hematite is present in part of the magnetite powder, not only is the thermal transition from hematite to magnetite effected in the inert gas (in weakly reducing atmosphere) but also the organic substance mixed is brought by the heating in the inert gas into the state of incomplete combustion, in which the hematite is deprived of oxygen during the thermal decomposition of the organic substance to thereby be reduced so as to markedly promote the conversion to magnetite.

In the crushing step 6, the powder in which magnetite and another magnetic and/or nonmagnetic phase are coexistent, obtained in the sintering step 5, is crushed into a product.

According to the above steps, hematite, hematite+magnetite, or magnetite is mixed with the Sn compound to obtain a mixed powder, and this mixed powder is further mixed with a compound having —C—C— or —C=C— in its molecules and water, milled well, hot-air dried, granulated into globular grains and sintered in an inert gas at 550° to 1450° C. (with respect to magnetite) to 1200° to 1450° C. (with respect to magnetite) or 1200° to 1450° C. (with respect to hematite or hematite+magnetite), so that the magnetic oxide powder in which magnetite and another magnetic and/or nonmagnetic phase are coexistent can be produced. Thus, it has become feasible to safely mass-produce the magnetic oxide powder having any desired saturation magnetization at a lowered cost. Descriptions will be made in order below.

Table 9 shows experimental example results (hematite, Sn) according to this embodiment. In this experimental example, 0.8 to 87.6% by weight, in terms of Sn of powdery tin oxide was mixed with hematite powder, 1.0% by weight of polyvinyl alcohol was added, and further water was added and mixed to obtain a slurry having a powder concentration of 50% by weight. The slurry was agitated in an attrition mill for 1 hr, and granulated by means of a spray dryer. The thus obtained grains were heated at 1100° to 1500° C. in nitrogen gas for 2 hr. The oxygen concentration of the nitrogen gas was measured by means of the zirconia oxygen concentration meter. The saturation magnetization of each heated sample was measured by means of the vibrating sample magnetometer. The material phase was identified by the powder X-ray diffractometry.

(1) Heating temperature range

Table 9 demonstrates that the heating at 1100° C. (Sample Nos. 1 to 10) causes hematite ($\alpha$-$FE_2O_3$) to remain while the heating at 1500° C. (sample Nos. 41 to 50) forms wustite (FeO), so that the single phase magnetite ($Fe_3O_4$ only) cannot be obtained.

Therefore, it has been found that the suitable heating temperature range is from 1200° to 1450° C.

(2) Amount of Sn added (% by weight)

Upon noting the amount, in terms of Sn of powdery tin oxide added (Sample Nos. 11 to 40) within the heating temperature range of 1200° to 1450° C. set in section (1) above, it was found that the saturation magnetization was continuously decreased from 91 to 8 emu/g as the above amount was increased from 0.8 to 87.6% by weight. When the amount of Sn added exceeded 76.0% by weight, the saturation magnetization became extremely low to thereby cause the magnetic oxide to lose practicability.

Therefore, it has been found that the suitable amount, in terms of Sn, of Sn compound to be added is in the range of 0.8 to 76.0% by weight.

Figure 7:
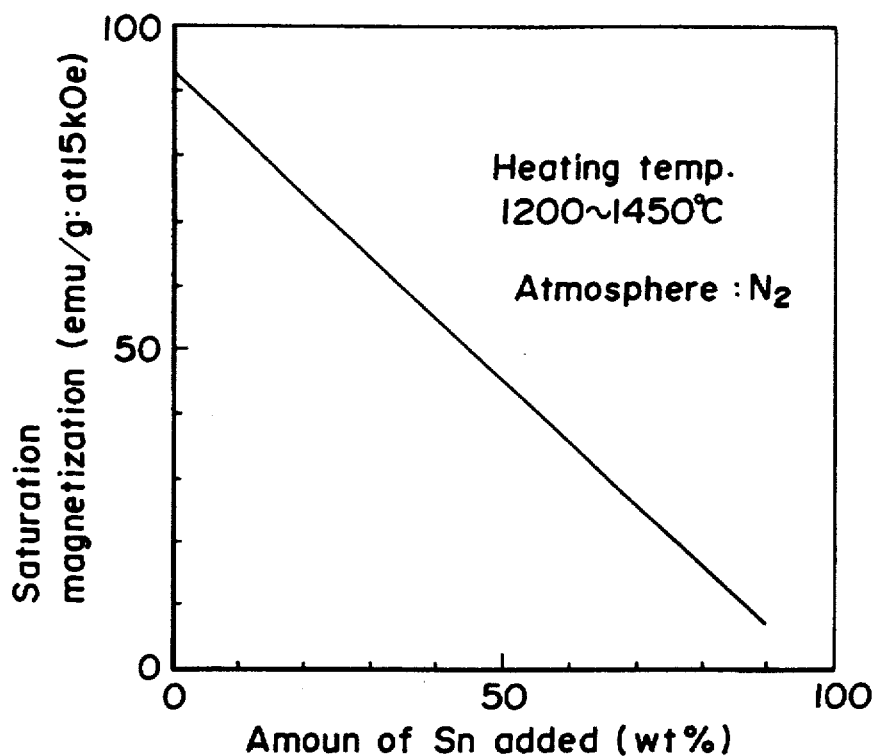
FIG. 7 is a view of an exemplary heating-cooling curve suitable for the third embodiment of the present invention.

The above demonstrates that desirable single phase magnetite and another magnetic and/or nonmagnetic phase can be formed by mixing 0.8 to 76.0% by weight, in terms of Sn, of an Sn compound with hematite and effecting the heating at 1200° to 1450° C. (provided that 0.1 to 4.0% by weight of a substance having a carbon-to-carbon single or double bond is also added). FIG. 7 shows an exemplary saturation magnetization curve as a function of the amount of Sn added. The saturation magnetization curve is drawn in a graph in which the axis of abscissa indicates the weight percentage, in terms of Sn, or Sn compound added while the axis of ordinate indicates the corresponding saturation magnetization value. It represents experimental example results shown in Table 9. In particular, the saturation magnetization curve is a line segment formed by plotting data shown in Table 9 with respect to the heating temperature range of 1200° to 1450° C. in a graph in which the axis of abscissa indicates the weight percentage of Sn added while the axis of ordinate indicated the corresponding saturation magnetization value emu/g and connecting the plots.

Once the saturation magnetization curve of FIG. 7 has been established, therefore, not only can the weight percentage of Sn to be added for obtaining a desired saturation magnetization emu/g be determined but also the saturation magnetization emu/g can contrarily be determined with respect to any given weight percentage of Sn, to thereby ensure production of a magnetic oxide powder having a desired saturation magnetization.

Table 10 shows results of another experimental example (1;1 mixture of hematite and magnetite, Sn) according to this embodiment. It shows experimental data obtained by varying the amount of Sn added as specified in the Table while the proportion of hematite powder to magnetite powder was kept at 1:1. In practice, 0.0 to 87.6% by weight, in terms of Sn, of powdery tin oxide was mixed with a 1:1 mixture of hematite and magnetite powders, and granulated in the same manner as specified in Table 9. The resultant grains were heated at 100° to 1500° C. in nitrogen gas for 2 hr. After the heating, the samples were measured in the same manner as specified in Table 9, and results are shown in Table 10.

(1) Heating temperature range

Table 10 demonstrates that the heating at 1100° C. (Sample Nos. 1 to 10) causes hematite ($\alpha$-FE$_2$O$_3$) to remain while the heating at 1500° C. (Sample Nos. 41 to 50) forms wustite (FeO), so that the single phase magnetite (Fe$_3$O$_4$ only) cannot be obtained.

Therefore, it has been found that the suitable heating temperature range is from 1200° to 1450° C.

(2) Amount of Sn added (% by weight)

Upon noting the amount, in terms of Sn, of powdery tin oxide added (Sample Nos. 11 to 40) within the heating temperature range of 1200° to 1450° C. set in section (1) above, it was found that the saturation magnetization was continuously decreased from 91 to 9 emu/g as the above amount was increased form 0.8 to 87.6% by weight. When the amount of Sn added exceeded 76.0% by weight, the saturation magnetization became extremely small to thereby cause the magnetic oxide to lose practicability.

Therefore, it has been found that the suitable amount, in terms of Sn, of Sn compound to be added is in the range of 0.8 to 76.0% by weight.

The above demonstrates that desirable single phase magnetite and another magnetic and/or nonmagnetic phase can be formed by mixing 0.8 to 76.0% by weight, in terms of Sn, of a Sn compound with a 1:1 mixture of hematite and magnetite and effecting the heating at 1200° to 1450° C. (provided that 0.1 to 4.0% by weight of a substance having a carbon-to-carbon single or double bond is also added).

Table 11 shows results of an additional experimental example (magnetite, Sn) according to this embodiment. In this experimental example, 0.0 to 87.6% by weight, in terms of Sn, of powdery tin oxide was mixed with magnetite powder, and granulated in the same manner as specified in Table 9. The thus obtained grains were heated at 500° to 1500° C. in nitrogen gas for 2 hr. After the heating, the samples were measured in the same manner as specified in Table 9, and results are shown in Table 11.

(1) Heating temperature range

Table 11 demonstrates that, during the heating at 500° C. (Sample Nos. 1 to 10), the magnetite is oxidized by trace amount of O$_2$ contained in nitrogen gas to form hematite ($\alpha$-FE$_2$O$_3$) while the heating at 1500° C. (Sample Nos. 81 to 90) forms wustite (FeO), so that the single phase magnetite (Fe$_3$O$_4$ only) cannot be obtained. When an Sn compound is mixed with magnetite as a starting material and magnetite and another magnetic and/or nonmagnetic phase is formed to attain arbitrary regulation of the saturation magnetization, there is no need for newly reducing the magnetite to achieve conversion to magnetite, so that it is satisfactory to obtain the strength required for handling, etc., by bonding or mild sintering. Thus, it has been found that desirable saturation magnetization regulation can be achieved at a temperature as low as 550° C.

(2) Amount of Sn added (% by weight)

Upon noting the amount, in terms of Sn, of powdery tin oxide added (Sample Nos. 11 to 80) within the heating temperature range of 550° to 1450° C. set in section (1) above, it was found that the saturation magnetization was continuously decreased from 91 to 8 emu/g as the above amount was increased from 0.8 to 87.6% by weight. When the amount of Sn added exceeded 76.9% by weight, the saturation magnetization became extremely low to thereby cause the magnetic oxide to lose practicability.

Therefore, it has been found that the suitable amount, in terms of Sn, of Sn compound to be added is in the range of 0.8 to 76.0% by weight.

The above demonstrates that desirable single phase magnetite and another magnetic and/or nonmagnetic phase can be formed by mixing 0.8 to 76.0% by weight, in terms of Sn, of an Sn compound with magnetite and effecting the heating at 550° to 1450° C. (provided that 0.1 to 4.0% by weight of a substance having a carbon-to-carbon single or double bond is also added).

As described above, in the second and third embodiments, Ti and Sn compounds are individually mixed with magnetite, magnetite+hematite or hematite, and the resultant mixed powder is mixed with a substance having a carbon-to-carbon single or double bond and sintered to thereby produce a powder comprising magnetite and another magnetic and/or nonmagnetic phase and having an arbitrary saturation magnetization value. Therefore, a magnetic oxide having any desired saturation magnetization can easily be mass-produced at a lowered cost. In particular, a magnetic oxide comprising magnetite and another magnetic and/or nonmagnetic phase and having an arbitrary saturation magnetization value can easily be produced at a lowered cost by a simple process in which a large volume of magnetite, magnetite+hematite or hematite is mixed with a Ti or Sn compound, further mixed with an organic substance and directly brought into the sintering step 5.

Fourth Embodiment

Figure 8:
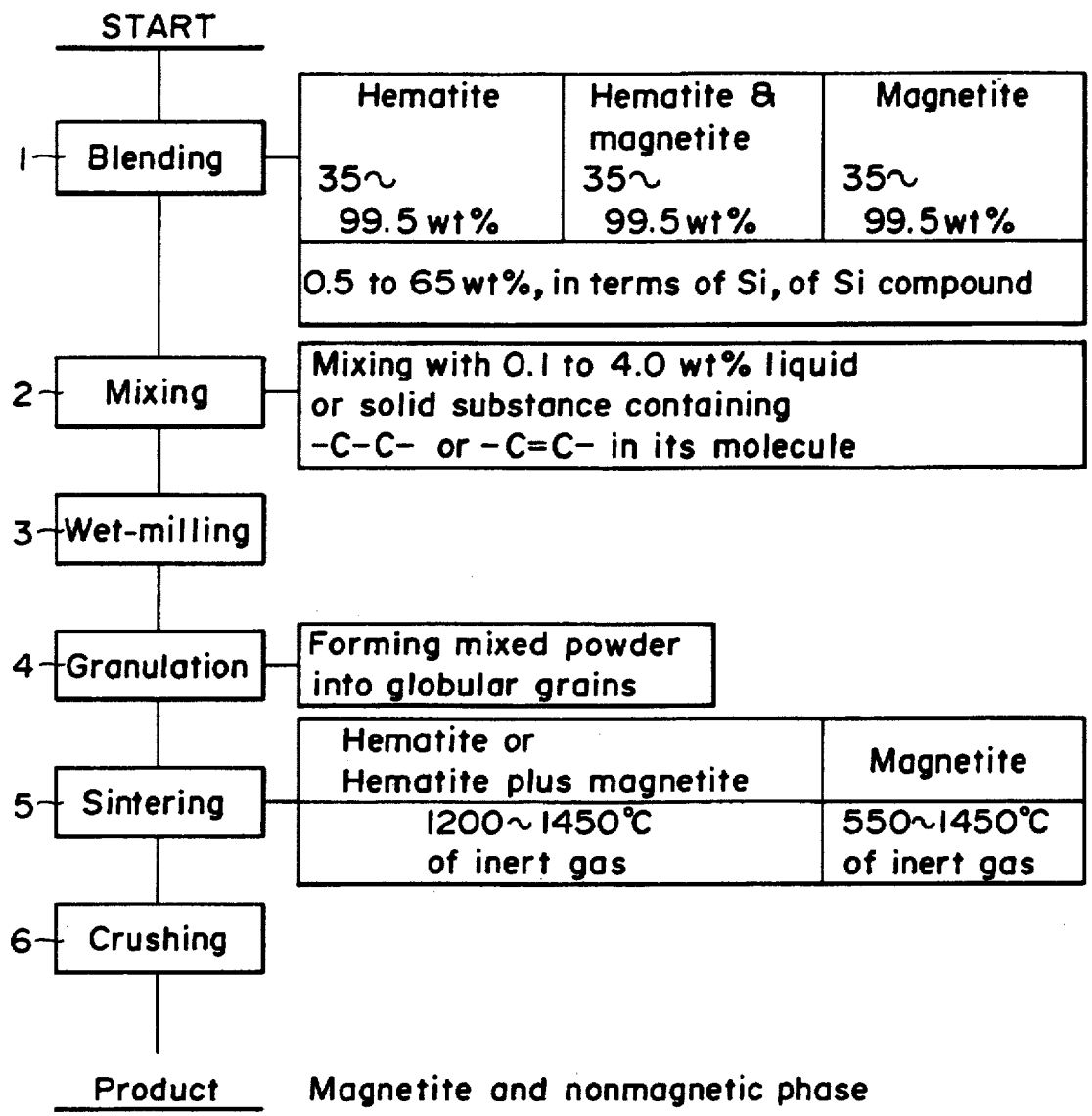
FIG. 8 is an explanatory view of the steps taken in the fourth embodiment of the present invention.

As shown in FIG. 8, 0.5 to 65% by weight, in terms of Si, of a powdery Si compound was weighed and mixed with a member selected from among hematite, hematite+magnetite and magnetite powders in the blending step 1.

In the mixing step 2, the thus mixed powder is mixed with 0.1 to 4.0% by weight of a compound having —C—C— or —C=C— in its molecules (liquid or solid). For example, 2% by weight of polyvinyl alcohol as a binder and 1% by weight of a polycarboxylate as a dispersant are added to the mixed powder, and further water is added for granulation into globular grains. The amount of water added is in the range of 30 to 70% by weight. When the amount of water was less that 30% by weight, the viscosity of a slurry obtained by milling was too high to be granulated into globular grains. On the other hand, when the amount of water exceeded 70% by weight, the slurry concentration was too low to be granulated into dense globular grains.

In the wet-milling step 3, the mixture obtained in the mixing step 2 is wet crushed in an attrition mill to thereby prepare a slurry having a mixed powder concentration of about 50% by weight.

In the granulating step 4, globular grains are formed. In this step, the slurry is agitated in an attrition mill for 1 hr, and hot-air dried by a spray dryer to obtain globular grains.

In the sintering step 5, the grains obtained in the granulating step 4 are heated at 1200° to 1450° C. or 550° to 1450° C. in an atmosphere of an inert gas (such as nitrogen gas) for 2 hr to thereby form magnetite and another magnetic and/or nonmagnetic phase. The value of the saturation magnetization can be controlled by regulating the amount, in terms of Si, of Si compound added, so that it is feasible to produce a magnetic oxide having any desired saturation magnetization by changing the amount of Si compound added (see Tables 13 to 15). When hematite is present in part of the hematite or magnetite powder, not only is the thermal transition from hematite to magnetite effected in the inert gas (in weakly reducing atmosphere) but also the organic substance mixed is brought by the heating in the inert gas into the state of incomplete combustion, in which the hematite is deprived of oxygen during the thermal decomposition of the organic substance to thereby be reduced so as to markedly promote the conversion to magnetite.

In the crushing step 6, the powder in which magnetite and another magnetic and/or nonmagnetic phase are coexistent, obtained in the sintering step 5, is crushed into a product.

According to the above steps, 35 to 99.5% by weight of hematite, hematite+magnetite, or magnetite is mixed with 0.6 to 65% by weight, in terms of Si, of an Si compound to obtain a mixed powder, and this mixed powder is further mixed with 0.1 to 4.0% by weight of a compound having —C—C— or —C=C— in its molecules and still further water, milled well, hot-air dried, granulated into globular grains and sintered in an inert gas at 1200° to 1450° C. (with respect to hematite or hematite+magnetite) or 550° to 1450° C. (with respect to magnetite only), so that the magnetic oxide powder in which magnetite and another magnetic and/or nonmagnetic phase are coexistent can be produced. Thus, it has become feasible to safely mass-produce the magnetic oxide powder having any desired saturation magnetization at a lowered cost. Descriptions will be made below.

Table 12 shows sintering experiment results ($SiO_2$: 0% by weight) According to this embodiment. In this experiment, PVA (polyvinyl alcohol) was added as a binder in an amount specified in the Table to hematite powder, and further 1% by weight of a polycarboxylate as a dispersant and water were added and mixed. The mixture was granulated, and sintered at a temperature T specified in the Table. After the sintering, a qualitative analysis by powder X-ray diffractometry was conducted. Results are shown in the Table. The following has been found from the results.

(1) No single phase magnetite was obtained even with the changed heating temperatures from only hematite powder having no PVA added thereto (Sample Nos. 1 to 8). The X-ray diffractometry showed the presence of the phase of hematite ($\alpha\text{-FE}_2O_3$) or wustite (FeO).

(2) When the amount of PVA added was set at 2% by weight and the heating temperature was varied, single phase magnetite ($Fe_3O_4$ only) was obtained at heating temperatures ranging from 1200° to 1450° C. (Sample Nos. 9 to 12), and wustite (FeO) was coexistent at heating temperatures of 1500° C. or above (Sample Nos. 16).

Therefore, it is requisite that the heating temperature be in the range of 1200° to 1450° C. (Sample Nos. 13 to 15).

(3) At a fixed heating temperature of 1300° C., the amount of PVA added was varied between 0.1 and 3.0% by weight. In any case, single phase magnetite was obtained (Sample Nos. 17 to 22).

From the above experimental results, it has been found that completely single phase magnetite can be obtained whenever PVA is added to hematite powder in an amount of 0.1 to 3% by weight (4% by weight) and whenever the sintering performed by heating at 1200° to 1450° C.

Table 13 shows experimental example results (hematite) according to this embodiment. In this experimental example, 0.0 to 79.5% by weight, in terms of Si, of powdery silicon oxide was mixed with hematite powder, and further mixed with water to obtain a slurry having a powder concentration of 50% by weight. The slurry was agitated in an attrition mill for 1 hr, and dried at 110° C. 1.0% by weight of polyvinyl alcohol was added to the obtained pellet. The mixture was mixed in a mortar, and sifted through a 425-µm-mesh standard sieve to obtain grains. 0.5 g of the resultant grains were put in a cylindrical mold having a diameter of 12.5 mm, and shaped under a molding pressure of 1 t/cm². The molding was heated at 1100° to 1500° C. for 2 hr in nitrogen gas. The oxygen concentration of the nitrogen gas was measured by the use of a zirconia oxygen concentration meter. The saturation magnetization of each sample after the heating was measured by means of a vibrating sample magnetometer (see FIG. 3 of the first embodiment). Results are shown in Table 13.

(1) Heating temperature range

Table 13 demonstrates that the heating at 1100° C.(Sample Nos. 1 to 10) causes hematite ($\alpha\text{-FE}_2O_3$) to remain while the heating at 1500° C. (Sample Nos. 41 to 50) forms wustite (FeO), so that the single phase magnetite ($Fe_3O_4$ only) cannot be obtained.

Therefore, it has been found that the suitable heating temperature range is from 1200° to 1450° C.

(2) Amount of Si added (% by weight)

Upon noting the amount, in terms of Si, of powdery silicon oxide added (Sample Nos. 11 to 40) within the heating temperature range of 1200° to 1450° C. set in section (1) above, it was found that the saturation magnetization was continuously decreased from 91 to 20 emu/g as the above amount was increased from 0.5 to 65.0% by weight (see FIG. 9 referred to later). When the amount of Si added exceeded as small as 20 emu/g or less to thereby cause the magnetic oxide to lose practicability.

Therefore, it has been found that the suitable amount, in terms of Si, of Si compound to be added is in the range of 0.5 to 65% by weight.

The above demonstrates that desirable single phase magnetite+ nonmagnetic phase can be formed by mixing 0.5 to 65% by weight, in terms of Si, of an Si compound with hematite and effecting the heating at 1200° to 1450° C. (provided that 0.1 to 4.0% by weight of a substance having a carbon-to-carbon single or double bond is also added).

Figure 9:
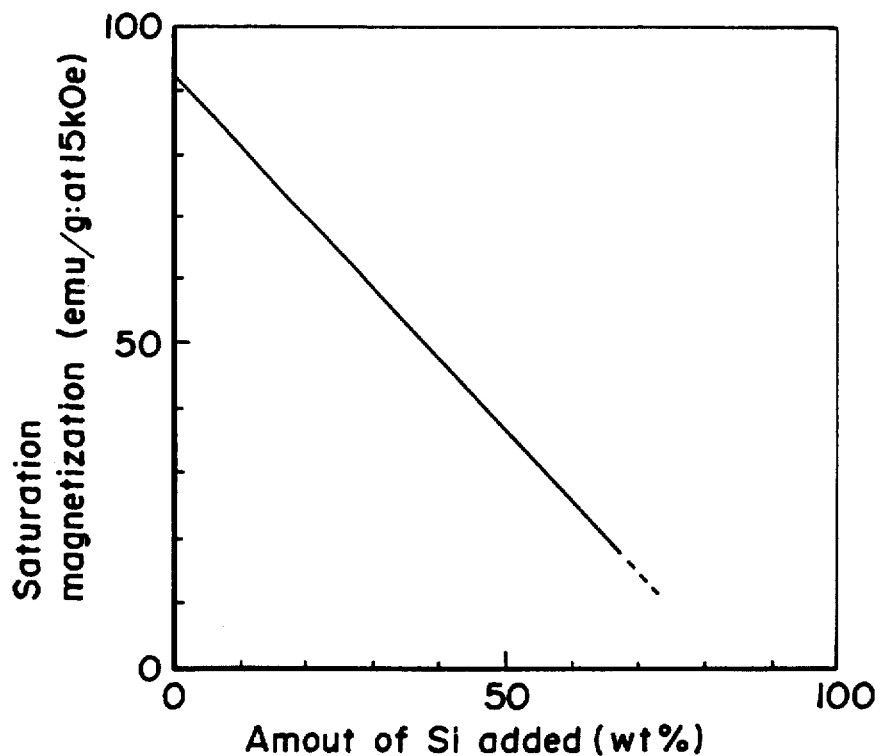
FIG. 9 is a view of an exemplary heating-cooling curve suitable for the fourth embodiment of the present invention.

FIG. 9 shows an exemplary saturation magnetization curve as a function of the amount of Si added in this embodiment. The saturation magnetization curve is drawn in a graph in which the axis of abscissa indicates the weight percentage, in terms of Si, of Si compound added while the axis of ordinate indicates the corresponding saturation magnetization value. It represents experimental example results shown in Table 13. In particular, the saturation magnetization curve is a line segment formed by plotting data shown in Table 18 with respect to the heating temperature range of 1200° to 1450° C. in a graph in which the axis of abscissa indicates the weight percentage of Si added while the axis of ordinate indicates the corresponding saturation magnetization value emu/g and connecting the plots.

Once the saturation magnetization curve of FIG. 9 has been established, therefore, not only can the weight percentage of Si to be added for obtaining a desired saturation magnetization emu/g be determined but also the saturation magnetization emu/g can contrarily be determined with respect to any given weight percentage of Si, to thereby ensure production of a magnetic oxide powder having a desired saturation magnetization.

Table 14 shows results of another experimental example (hematite+magnetite) according to this embodiment. In the experimental example, 0.0 to 79.5% by weight, in terms of Si, of powdery silicon oxide was mixed with a 50% by weight: 50% by weight mixture of hematite and magnetite powders (hematite+magnetite), and the resultant mixed powder was mixed with water, milled, granulated, molded and heated in the same manner as specified in Table 13 to thereby obtain samples. The samples were measured, and results are shown in Table 14.

(1) Heating temperature range

Table 14 demonstrates that the heating at 1100° C. (Sample Nos. 1 to 10) causes hematite ($\alpha$-$FE_2O_3$) to remain while the heating at 1500° C. (Sample Nos. 41 to 50) forms wustite (FeO), so that the single phase magnetite ($Fe_3O_4$ only) cannot be obtained.

Therefore, it has been found that the suitable heating temperature range is from 1200° to 1450° C.

(2) Amount of Si added (% by weight)

Upon noting the amount, in terms of Si, of powdery silicon oxide added (Sample Nos. 11 to 40) within the heating temperature range of 1200° to 1450° C. set in section (1) above, it was found that the saturation magnetization was continuously decreased from 91 to 20 emu/g as the above amount was increased from 0.5 to 65.0% by weight. When the amount of Si added exceeded 65% by weight, the saturation magnetization became as small as 20 emu/g to thereby cause the magnetic oxide to lose practicability.

Therefore, it has been found that the suitable amount, in terms of Si, of Si compound to be added is in the range of 0.5 to 65% by weight.

The above demonstrates that desirable single phase magnetite and another magnetic and/or nonmagnetic phase can be formed by mixing 0.5 to 65% by weight, in terms of Si, of a Si compound with hematite+magnetite and effecting the heating at 1200° to 1450° C. (provided that 0.1 to 4.0% by weight of a substance having a carbon-to-carbon single or double bond is also added).

Table 15 shows results of a further experimental example (magnetite) according to this embodiment. In this experimental example, 0.0 to 79.5% by weight, in terms of Si, of powdery silicon oxide was mixed with magnetite powder and further mixed with water in the same manner as specified in Table 13 to obtain a slurry having a powder concentration of 50% by weight. The slurry was agitated in an attrition mill for 1 hr, and dried at 110° C. 1.0% by weight of polyvinyl alcohol was added to the obtained pellet. The mixture was mixed in a mortar, and sifted through a 425-μm-mesh standard sieve to obtain grains. 0.5 g of the resultant grains were put in a cylindrical mold having a diameter of 12.5 mm, and shaped under a molding pressure of 1 t/cm². The molding was heated at 500° to 1500° C. for 2 hr in nitrogen gas. The oxygen concentration of the nitrogen gas was measured by the use of a zirconia oxygen concentration meter. The saturation magnetization of each sample after the heating was measured by means of a vibrating sample magnetometer (see FIG. 3 of the first embodiment). Results are shown in Table 15.

(1) Heating temperature range

Table 15 demonstrates that, during the heating at 500° C. (Sample Nos. 1 to 10), the magnetite is oxidized by trace $O_2$ contained in nitrogen gas to form hematite ($\alpha$-$FE_2O_3$) while the heating at 1500° C. (Sample Nos. 81 to 90) forms wustite (FeO), so that the single phase magnetite ($Fe_3O_4$ only) cannot be obtained. When an Si compound is mixed with magnetite as a starting material and magnetite and another magnetic and/or nonmagnetic phase is formed to attain arbitrary regulation of the saturation magnetization, there is no need for newly reducing the magnetite to achieve conversion to magnetite, so that it is satisfactory to obtain the strength required for handling and other practical operation by bonding or mild sintering. Thus, it has been found that desirable saturation magnetization regulation can be achieved at a temperature as low as 550° C.

Therefore, it has been found that the suitable heating temperature range is from 550° to 1450° C.

(2) Amount of Si added (% by weight)

Upon noting the amount, in terms of Si, of powdery silicon oxide added (Sample No. 11 to 80) within the heating temperature range of 550° to 1450° C. set in section (1) above, it was found that the saturation magnetization was continuously decreased from 91 to 16 emu/g as the above amount was increased from 0.5 to 65.0% by weight. When the amount of Si added exceeded 65% by weight, the saturation magnetization became as small as 16 emu/g or less to thereby cause the magnetic oxide to lose practicability.

Therefore, it has been found that the suitable amount, terms of Si, of Si compound to be added is in the range of 0.5 to 65% by weight.

The above demonstrates that desirable single phase magnetite and another magnetic and/or nonmagnetic phase can be formed by mixing 0.5 to 65% by weight, in terms of Si, of an Si compound with magnetite and effecting the heating at 550° to 1450° C. (provided that 0.1 to 4.0% by weight of a substance having a carbon-to-carbon single or double bond is also added).

Detailed descriptions on the heating curbed for 2-hr heating at the heating temperature T°C. (heating temperature specified in Tables 12 to 15) and the saturation magnetization relating to the above embodiment are omitted in view of the similarity to and obviousness from those form FIGS. 2 and 3 relating to the first embodiment of the present invention.

Besides the above embodiment, it has been found that the saturation magnetization may further finely be regulated by controlling the sintering conditions so as to form an oxide phase (hematite calcium peroxide, etc.), for example, on the surface of the powder. This is applicable according to necessity although additional operation is required.

As described above, in the forgoing embodiment, an Si compound and a substance having a carbon-to-carbon single or double bond are mixed with hematite, hematite+magnetite, or magnetite, and sintered to thereby produce a powder comprising magnetite and another magnetic and/or nonmagnetic phase and having an arbitrary saturation magnetization value. Therefore, a magnetic oxide having any desired saturation magnetization can easily be mass-produced at a lowered cost. In particular, a powder (magnetic oxide) comprising magnetite and another magnetic and/or nonmagnetic phase and having an arbitrary saturation magnetization value can easily be produced at a lowered cost by a simple process in which a mixed powder comprising a large volume of hematite, hematite+magnetite, or magnetite, an Si compound and a substance having a carbon-to-carbon single or double bond is directly brought into the sintering step 5.

Fifth Embodiment

Figure 10:
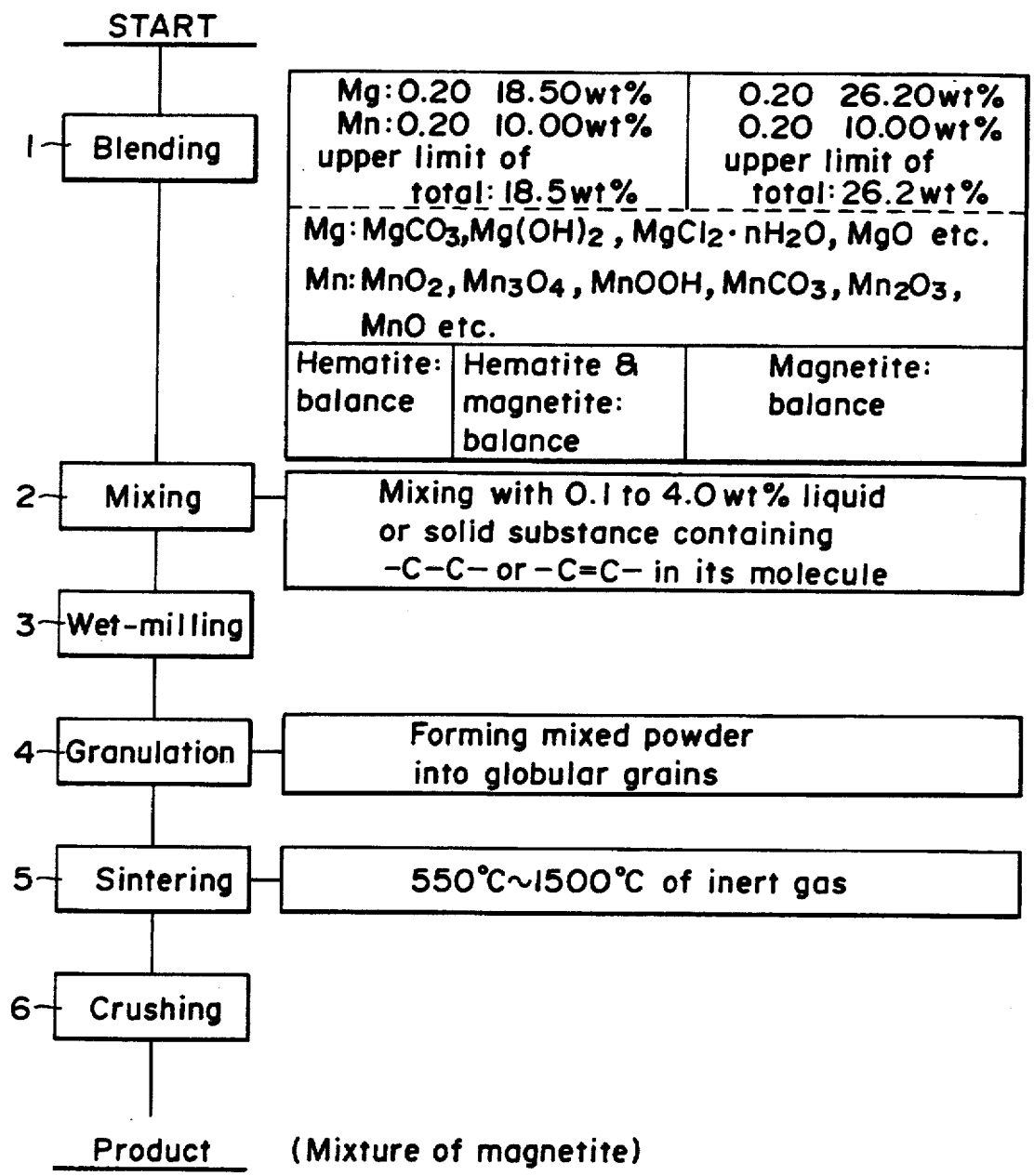
FIG. 10 is an explanatory view of the steps taken in the fifth embodiment of the present invention.

Referring to FIG. 10, hematite or hematite+magnetite is blended with 0.20 to 18.50% by weight of Mg or alternatively magnetite is blended with 0.20 to 26.20% by weight of Mg, optionally together with 0.20 to 10.00% by weight of Mn (the upper limit of the total of the former two is 18.50% by weight while that of the latter is 26.20% by weight) to thereby form a mixed powder in the blending step 1. The term "Mg" means the Mg moiety, expressed in % by weight, of organic and inorganic compounds each containing Mg, such as $MgCO_3$, $Mg(OH)_2$, $MgCl_2nH_2O$ and MgO. Likewise, the term "Mn" means the Mn moiety expressed in % by weight of organic and inorganic compounds each containing Mn, such as $MnO_2$, $Mn_3O_4$, MnOOH, $MnCO_3$, $Mn_2O_3$ and MnO. The terms "Mg" and "Mn" are employed for brevity in this specification. 0.20 to 18.50% by weight or 0.20 to 26.20% by weight of Mg optionally together with 0.20 to 10.00% by weight of Mn is blended with the balance (q.s. ad 100%) of hematite, hematite+magnetite, or magnetite (that is, for example, the weight percentage of the "O" moiety of MgO is not contained in the value of 100% by weight). The terminology "hematite+magnetite" employed herein means a mixture (mixed powder) of hematite and magnetite. In particular, the magnetite as a starting material may be either of:

(1) magnetite powder (produced in the house or purchased from other companies), and (2) magnetite powder obtained by pulverizing a product having an off-specification particle size (recovered item) so as for the same to have the given particle size.

The product grains described later are those each composed of, for example, 103 to 107 starting powder particles (1–3 µm) gathered into a globular form having a diameter of 50 to 100 µm. Thus, any once produced magnetite powder product (off-specification item) can be pulverized to thereby easily obtain the desired starting material powder.

In the mixing step 2, the above mixed powder is mixed with 0.1 to 4.0% by weight of a compound having —C—C— or —C=C— in its molecules (liquid or solid). For example, 2% by weight of polyvinyl alcohol as a binder and 1% by weight of a polycarboxylate as a dispersant are added to the mixed powder, and further water is added for granulation into globular grains. The amount of water added is in the range of 30 to 70% by weight. When the amount of water was less than 30% by weight, the viscosity of the slurry obtained by milling was too high to be granulated into globular grains. On the other hand, when the amount of water exceeded 70% by weight, the slurry concentration was too low to be granulated into dense globular grains.

In the wet-milling step 3, the mixture obtained in the mixing step 2 is wet crushed in an attrition mill to thereby prepare a slurry having a mixed powder concentration of about 50% by weight.

In the granulating step 4, the powder is formed into globular grains. In this step, the slurry is agitated in an attrition mill (attritor) for 1 hr, and hot-air dried by a spray dryer to obtain globular grains.

In the sintering step 5, the grains obtained in the granulating step 4 are heated at 550° to 1500° C. in an atmosphere of an inert gas (such as nitrogen gas) for 2 hr to thereby obtain powder in which single phase magnetite and nonmagnetic phase are coexistent. The value of saturation magnetization of the powder can be regulated by the amount of Mg added, so that it is feasible to produce a powdery magnetic oxide having any desired saturation magnetization by changing the amount of Mg added (see Tables 16 to 18). When hematite is present in part of the hematite or magnetite powder, during the 550° to 1500° C. sintering step 5, not only is the thermal transition from hematite to magnetite effected in the inert gas (in weakly reducing atmosphere) but also the organic substance mixed is brought by the heating in the inert gas into the stage of incomplete combustion, in which the hematite is deprived of oxygen during the thermal decomposition of the organic substance to thereby be reduced to markedly promote the conversion to magnetite. The mixing of Mn improves the grain strength of the powder (see Table 10 and FIG. 12).

In the disintegration step 6, the powder in which magnetite and another magnetic and/or nonmagnetic phase are coexistent, obtained in the sintering step 5, is disintegrated into a product.

According to the above steps, hematite, hematite+magnetite, or magnetite is mixed with the above Mg, optionally together with Mn for improving the grain strength of the powder, to obtain a mixed powder, and this mixed powder is further mixed with a compound having —C—C— or —C=C— in its molecules and water, milled well, hot-air dried, granulated into globular grains and sintered in an inert gas at 550° to 1500° C., so that the magnetic oxide powder in which magnetite and nonmagnetic phase are coexistent can be produced. Thus, it has become feasible to safely mass-produce a magnetic oxide powder having any desired saturation magnetization and a satisfactory grain strength at a lowered cost. Descriptions will be made below.

Table 16 shows sintering experiment results (hematite+Mg) according to this embodiment. In the experiment, 0.00 to 40.00% by weight, in terms of Mg, of powder of magnesium oxide (MgO) was blended with hematite powder, and mixed with water to obtain a slurry having a powder concentration of 50% by weight. 1.0% by weight of polyvinyl alcohol was added to the slurry, and agitated in an attrition mill for 1 hr. The slurry was spray dried by the use of a spray dryer to obtain grains. The thus obtained grains were heated at 500° to 1500° C. in nitrogen gas for 2 hr. After the heating, the saturation magnetization of each sample was measured by means of a vibrating sample magnetometer. The grain strength of each sample was determined by measuring with the use of a micro-compression tester (MCTM-500 manufactured by Shimadzu Corp.) and calculating according to the following Hiramatsu's formula.

(Grain strength)={2.8×(Breaking load of grain)}/{p×(Diameter of grain)$^2$}

(1) When the heating temperature was 500° C., the grain strength was as small as less than 1E7 Pa to thereby cause the magnetic oxide to fall to serve practical use. Thus, 500° C. is unacceptable. On the other hand, when the heating temperature was 550° C., the grain strength was not smaller than 1E7 Pa, so that the magnetic oxide would serve practical use. Therefore, it has been determined that 550° C. is an appropriate lower limit of the heating temperature.

(2) When the heating temperature was 1500° C., the conversion to magnetite was so incomplete as to form wustite (FeO) with the result that the saturation magnetization began to become as small as 86 emu/g or less as noted with respect to Sample No. 91. Although satisfactory saturation magnetization can be obtained at higher temperatures, it has been determined that 1500° C. is an appropriate upper limit of the heating temperature from the viewpoint of the practical heating limit of electric furnaces.

(3) When the amount of Mg added was 0.20% by weight (Sample Nos. 13, 23, 33, 43, 53, 63, 73, 83 and 93) at which the saturation magnetization began to decrease within the heating temperature range of 550° to 1500° C., a saturation magnetization of 90 to 82 emu/g was obtained at 550° to 1100° C.

Thus, it has been determined that 0.20% by weight is an appropriate lower limit of the amount of Mg added. On the other hand, the amount of Mg added at which the saturation magnetization was at least 10 emu/g was 18.50% by weight (Sample Nos. 18, 28, 38, 48, 58, 68, 78, 88 and 98) at 550° to 1500° C. Thus, it has been determined that 18.50% by weight is an appropriate upper limit of the amount of Mg added.

It has been found from the above experimental results that a powder (magnetic oxide) comprising magnetite and another magnetic and/or nonmagnetic phase admixed together and having an arbitrary saturation magnetization as indicated by the hatched portion in FIG. 11(a) described later can be formed by mixing 0.20 to 18.50% by weight of Mg with hematite and sintering the resultant mixed powder at 550° to 1500° C. for 2 hr.

Table 17 shows results of another sintering experiment (hematite+magnetite+Mg) according to this embodiment.

In the experiment, 0.00 to 40.0% by weight, in terms of of powder of magnesium oxide (MgO) was blended with a 1:1 mixture of hematite and magnetite powders, treated in the same manner as specified in Table 16, and measured.

(1) When the heating temperature was 500° C., the grain strength was as small as less that 1E7 Pa to thereby cause the magnetic oxide to fall to serve practical use. Thus, 500° C. is unacceptable. On the other hand, when the heating temperature was 550° C., the grain strength was not smaller than 1E7 Pa, so that the magnetic oxide would serve practical use. Therefore, it has been determined that 550° C. is an appropriate lower limit of the heating temperature.

(2) When the heating temperature was 1500° C., the conversion to magnetite was so incomplete as to form wustite (FeO) with the result that the saturation magnetization began to become as small as 86 emu/g or less as noted with respect to Sample No. 91. Although satisfactory saturation magnetization can be obtained at higher temperatures, it has been determined that 1500° C. is an appropriate upper limit of the heating temperature from the viewpoint of the practical heating limit of electric furnaces.

(3) When the amount of Mg added was 0.20% by weight (Sample Nos. 13, 23, 33, 43, 53, 63, 73, 83 and 93) at which the saturation magnetization began to decrease within the heating temperature range of 550° to 1500° C., a saturation magnetization of 61 emu/g was obtained at 550° to 1100° C. while a saturation magnetization of 90 to 82 emu/g was obtained at 1200° to 1500° C. Thus, it has been determined that 0.20% by weight is an appropriate power limit of the amount of Mg added. On the other hand, the amount of Mg added at which the saturation magnetization was at least 10 emu/g was 18.50% by weight (Sample Nos. 18, 28, 38, 48, 58, 68, 78, 88 and 98) at 550° to 1500° C. Thus, it has been determined that 18.50% by weight is an appropriate upper limit of the amount of Mg added.

It has been found from the above experimental results that a powder (magnetic oxide) comprising magnetite and another magnetic and/or nonmagnetic phase admixed together and having an arbitrary saturation magnetization as indicated by the hatched portion in FIG. 11(b) described later can be formed by mixing 0.20 to 18.50% by weight of Mg with hematite+magnetite and sintering the resultant mixed powder at 550° to 1500° C. for 2 hr.

Table 18 shows results of a further sintering experiment (magnetite+Mg) according to this embodiment. In the experiment, 0.00 to 40.0% by weight, in terms of Mg, of powder of magnesium oxide (MgO) was blended with magnetite, treated in the same manner as specified in Table 16, and measured.

(1) When the heating temperature was 500° C., the grain strength was as small as less than 1E7 Pa to thereby cause the magnetic oxide to fail to serve practical use. Thus, 500° C. is unacceptable. On the other hand, when the heating temperature was 550° C., the grain strength was not smaller than 1E7 Pa, so that the magnetic oxide would serve practical use. Therefore, it has been determined that 550° C. is an appropriate lower limit of the heating temperature.

(2) When the heating temperature was 1500° C., the conversion to magnetite was so incomplete as to form wustite (FeO) with the result that the saturation magnetization began to become as small as 86 emu/g or less as noted with respect to sample No. 91. Although satisfactory saturation magnetization can be obtained at higher temperatures, it has been determined that 1500° C. is an appropriate upper limit of the heating temperature from the viewpoint of the practical heating limit of electric furnaces.

(3) When the amount of MK added was 0.20% by weight (Sample Nos. 13, 23, 33, 43, 53, 63, 73, 83 and 93) at which the saturation magnetization began to decrease within the heating temperature range of 550° to 1500° C., a saturation magnetization of 91 to 82 emu/g was obtained at 550° to 1500° C. Thus, it has been determined that 0.20% by weight is an appropriate lower limit of the amount of Mg added. On the other hand, the amount of Mg added at which the saturation magnetization was at most about 10 emu/g was 26.20% by weight (Sample Nos. 19, 29, 39 and 49) at 550° to 1100° C. and 19.50% by weight (Sample Nos. 58, 68, 78, 88 and 98) at 1200° to 1500° C. It has been determined, taking the above two values into account, that 26.20% by weight is an appropriate upper limit of the amount of Mg added.

It has been found from the above experimental results that a powder (magnetic oxide) comprising magnetite and another magnetic and/or nonmagnetic phase admixed together and having an arbitrary saturation magnetization as indicated by the hatched portion in FIG. 11(a) described later can be formed by mixing 0.20 to 26.20% by weight of Mg with magnetite and sintering the resultant mixed powder at 550° to 1100° C. for 2 hr.

Figure 11A:
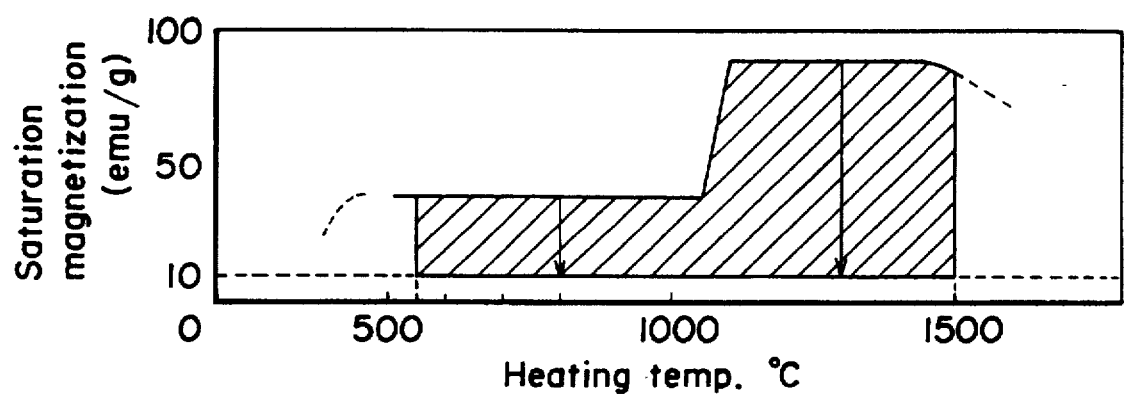
FIGS. 11(a), 11(b) and 11(c) are explanatory view of the ranges of saturation magnetization control attained in the fifth embodiment of the present invention.
Figure 11B:
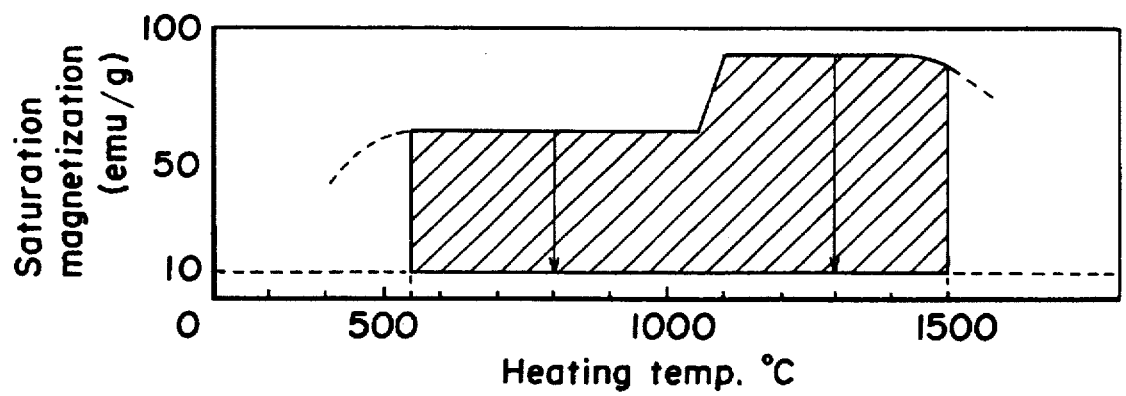
Figure 11C:
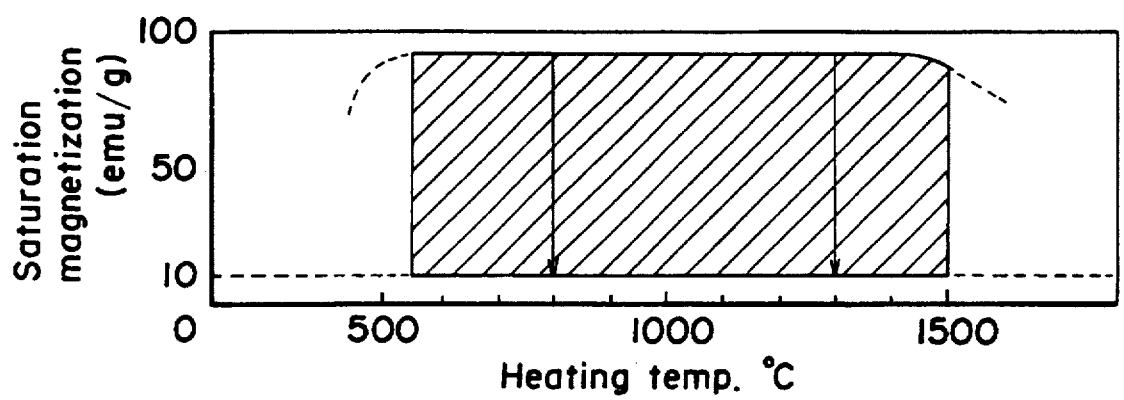

FIGS. 11(a), 11(b) and 11(c) are explanatory vies of the scope of variation of saturation magnetization by regulation.

These are summaries of the above-mentioned experimental results of Tables 16 to 18, made for easy understanding. The axis of abscissa indicates the heating temperature, the axis of ordinate the saturation magnetization by regulation.

FIG. 11(a) shows the scope of variation of saturation magnetization by regulation, based on Table 16 relating to hematite+Mg.

(1) When the heating temperature is in the range of 550° to 1100° C., the magnetic oxide can have an arbitrary saturation magnetization ranging from 40 to 10 emu/g as indicated by the hatched portion in the figure by changing the amount of Mg added within the range of 0.20 to 18.50% by weight, as described with respect to Table 16.

(2) When the heating temperature is in the range of 1200° to 1500° C., the magnetic oxide can have an arbitrary saturation magnetization ranging from 90 to 10 emu/g as indicated by the hatched portion in the figure by changing the amount of Mg added within the range of 0.20 to 18.50% by weight, as described with respect to Table 16.

FIG. 11(b) shows the scope of variation of saturation magnetization by regulation, based on Table 17 relating to hematite+magnetite+Mg.

(1) When the heating temperature is in the range of 550° to 1100° C., the magnetic oxide can have an arbitrary saturation magnetization ranging from 60 to 10 emu/g as indicated by the hatched portion in the Figure by changing the amount of Mg added within the range of 0.20 to 18.50% by weight, as described with respect to Table 17.

FIG. 11(c) shows the scope of variation of saturation magnetization by regulation, based on Table 18 relating to magnetite+Mg.

(1) When the heating temperature is in the range of 550° to 1100° C., the magnetic oxide can have an arbitrary saturation magnetization ranging from 90 to 10 emu/g as indicated by the hatched portion in the Figure by changing the amount of Mg added within the range of 0.20 to 26.20% by weight, as described with respect to Table 18.

Table 19 shows results of a still further sintering experiment (hematite+Mg+Mn) according to this embodiment. In the experiment, 3.60% by weight, in terms of of powder of magnesium oxide (MgO) was blended with hematite powder, and further 0.00 to 10.00% by weight, in terms of Mn, of manganese oxide ($Mn_3O_4$) was added thereto. The resultant mixture was treated under the same conditions as specified in Table 16.

(1) When the heating temperature was 550° C., the grain strength was gradually increased from 13E8 Pa of Sample No. 16 of Table 16 not containing Mn to 17E8 Pa in accordance with the increase of the amount of Mn added as shown in Table 19, thus demonstrating the contribution of the addition of Mn to the grain strength. The saturation magnetization was also increased from 27 emu/g to 39 emu/g in accordance with the increase of the amount of Mn added. The increase of the saturation magnetization is caused by the incorporation of Mn which itself is magnetized.

(2) When the heating temperature was 1300° C., the grain strength was gradually increased from 36E9 Pa of Sample No. 66 of Table 16 not containing Mn to 52E9 Pa in accordance with the increase of the amount of Mn added as shown in Table 19, thus demonstrating the contribution of the addition of M to the grain strength. The saturation magnetization was also increased from 67 emu/g to 80 emu/g in accordance with the increase of the amount of Mn added. The increase of the saturation magnetization is caused by the incorporation of Mn which itself is magnetized.

Figure 12A:
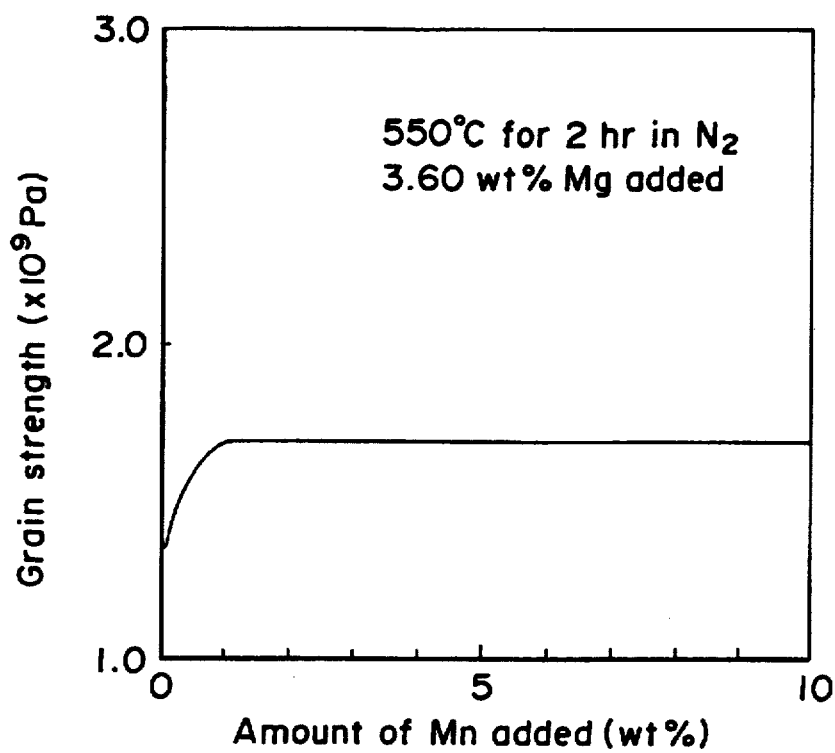
FIGS. 12(a) and 12(b) are explanatory views of the grain strengths attained in the fifth embodiment of the present invention.
Figure 12B:
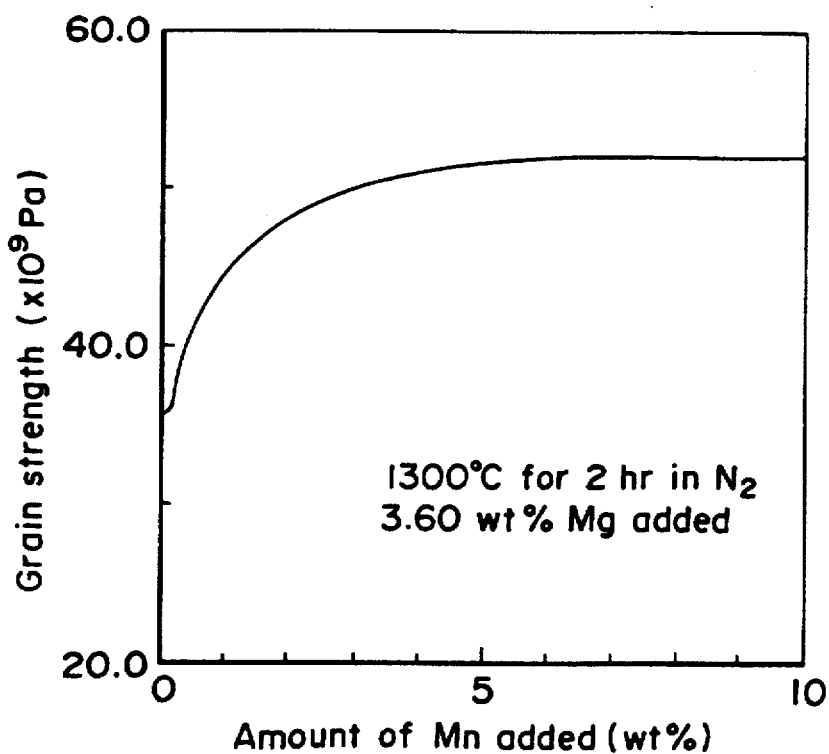

FIGS. 12(a) and 12(b) are explanatory views of the effect of the addition of Mn on the grain strength of the Mg blend according to this embodiment. These are graphs of the results of sintering experiment shown in Table 19, prepared for easy understanding. The axis of abscissa indicates the amount of Mn added, % by weight, while the axis of ordinate indicates the grain strength Pa.

FIG. 12 (a) shows the relationship between the amount of Mn added and the grain strength with respect to the magnetic oxide produced by sintering a powder obtained by mixing hematite with 3.60% by weight of Mg and further with Mn at 550° C. in $N_2$ for 2 hr as specified in Table 19. This graph demonstrates the effect of the addition of Mn in increasing the grain strength of the sintered magnetic oxide.

FIG. 12(b) shows the relationship between the amount of Mn added and the grain strength with respect to the magnetic oxide produced by sintering a powder obtained by mixing hematite with 3.60% by weight of Mg and further with Mn at 1300° C. in $N_2$ for 2 hr as specified in Table 19. This graph demonstrates the effect of the addition of Mn in increasing the grain strength of the sintered magnetic oxide.

Figure 13:
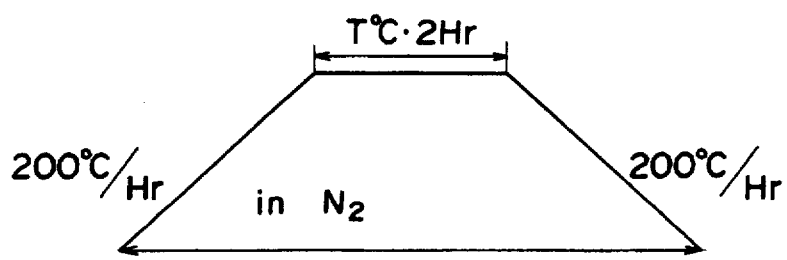
FIG. 13 is a view of an exemplary heating curve suitable for the fifth embodiment of the present invention.

FIG. 13 shows an exemplary heating temperature curve according to this embodiment. The curve is employed in the experiments relating to the above-mentioned Table 16 and FIGS. 12(a) and 12(b). In the sintering, the heating is conducted in an atmosphere of $N_2$ at a rate of 200° C./hr to a given temperature, which is held for 2 hr. Thereafter, the cooling is conducted at a rate of 200° C./hr.

As described above, in the foregoing embodiment, an Si compound and a substance having a carbon-to-carbon single or double bond are mixed with hematite, hematite+magnetite, or magnetite, and sintered to thereby produce a powder comprising magnetite and nonmagnetic phase admixed together and having an arbitrary saturation magnetization value. Therefore, a magnetic oxide having any desired saturation magnetization can easily be mass-produced at a lowered cost. In particular, a powder (magnetic oxide) comprising magnetite and another magnetic and/or nonmagnetic phase admixed together and having an arbitrary saturation magnetization value can easily be produced at a lowered cost by a simple process in which a mixed powder comprising a large volume of hematite, hematite+magnetite, or magnetite, an Si compound and a substance having a carbon-to-carbon single or double bond is directly brought into the sintering step 5.

TABLE 1

Firing Experiment Results (Hematite) of the Present Invention

| Sample No. | Amt. of Ca added (wt %) | Heating temp. T (°C.) | Atmosphere | Satn. magnetization δs (emu/g) | Results of powder X-ray diffractometry | | |
|---|---|---|---|---|---|---|---|
| | | | | | α-$Fe_2O_3$ | $Fe_3O_4$ | FeO |
| 1 | 0.00 | 1100 | $N_2$ | 80 | found | found | none |
| 2 | 0.71 | " | " | 82 | found | found | none |
| 3 | 1.43 | " | " | 80 | found | found | none |
| 4 | 3.55 | " | " | 75 | found | found | none |
| 5 | 4.97 | " | " | 72 | found | found | none |
| 6 | 7.10 | " | " | 68 | found | found | none |
| 7 | 10.65 | " | " | 64 | found | found | none |
| 8 | 14.30 | " | " | 60 | found | found | none |
| 9 | 0.00 | 1200 | $N_2$ | 92 | none | found | none |
| 10 | 0.71 | " | " | 88 | none | found | none |
| 11 | 1.43 | " | " | 88 | none | found | none |
| 12 | 3.55 | " | " | 86 | none | found | none |
| 13 | 4.97 | " | " | 80 | none | found | none |
| 14 | 7.10 | " | " | 77 | none | found | none |
| 15 | 10.65 | " | " | molten | immeasurable | immeasurable | immeasurable |
| 16 | 14.30 | " | " | " | " | " | " |
| 17 | 0.00 | 1300 | $N_2$ | 92 | none | found | none |
| 18 | 0.71 | " | " | 88 | none | found | none |
| 19 | 1.43 | " | " | 87 | none | found | none |
| 20 | 3.55 | " | " | 86 | none | found | none |
| 21 | 4.97 | " | " | 81 | none | found | none |
| 22 | 7.10 | " | " | 77 | none | found | none |
| 23 | 10.65 | " | " | molten | immeasurable | immeasurable | immeasurable |
| 24 | 14.30 | " | " | " | " | " | " |
| 25 | 0.00 | 1450 | $N_2$ | 92 | none | found | none |
| 26 | 0.71 | " | " | 88 | none | found | none |
| 27 | 1.43 | " | " | 87 | none | found | none |
| 28 | 3.55 | " | " | 85 | none | found | none |
| 29 | 4.97 | " | " | 80 | none | found | none |
| 30 | 7.10 | " | " | 76 | none | found | none |
| 31 | 10.65 | " | " | molten | immeasurable | immeasurable | immeasurable |
| 32 | 14.30 | " | " | " | " | " | " |
| 33 | 0.00 | 1500 | $N_2$ | 85 | none | found | found |
| 34 | 0.71 | " | " | 85 | none | found | found |
| 35 | 1.43 | " | " | 87 | none | found | found |
| 36 | 3.55 | " | " | 80 | none | found | found |
| 37 | 4.97 | " | " | 77 | none | found | found |
| 38 | 7.10 | " | " | molten | none | found | found |
| 39 | 10.65 | " | " | " | immeasurable | immeasurable | immeasurable |
| 40 | 14.30 | " | " | " | " | " | " |

TABLE 2

Firing Experiment Results (Hematite + Magnetite) of the Present Invention

| Sample No. | Amt. of Ca added (wt %) | Heating temp. T (°C.) | Atmosphere | Satn. magnetization δs (emu/g) | Results of powder X-ray diffractometry | | |
|---|---|---|---|---|---|---|---|
| | | | | | α-$Fe_2O_3$ | $Fe_3O_4$ | FeO |
| 1 | 0.00 | 1100 | $N_2$ | 67 | found | found | none |
| 2 | 0.71 | " | " | 66 | found | found | none |
| 3 | 1.43 | " | " | 65 | found | found | none |
| 4 | 3.55 | " | " | 64 | found | found | none |
| 5 | 4.97 | " | " | 61 | found | found | none |
| 6 | 7.10 | " | " | 56 | found | found | none |
| 7 | 10.65 | " | " | 51 | found | found | none |
| 8 | 14.30 | " | " | 47 | found | found | none |
| 9 | 0.00 | 1200 | $N_2$ | 92 | none | found | none |
| 10 | 0.71 | " | " | 89 | none | found | none |
| 11 | 1.43 | " | " | 88 | none | found | none |
| 12 | 3.55 | " | " | 86 | none | found | none |
| 13 | 4.97 | " | " | 80 | none | found | none |
| 14 | 7.10 | " | " | 77 | none | found | none |
| 15 | 10.65 | " | " | molten | immeasurable | immeasurable | immeasurable |
| 16 | 14.30 | " | " | " | " | " | " |
| 17 | 0.00 | 1300 | $N_2$ | 92 | none | found | none |
| 18 | 0.71 | " | " | 88 | none | found | none |
| 19 | 1.43 | " | " | 88 | none | found | none |
| 20 | 3.55 | " | " | 86 | none | found | none |

TABLE 2-continued

Firing Experiment Results (Hematite + Magnetite) of the Present Invention

| Sample No. | Amt. of Ca added (wt %) | Heating temp. T (°C.) | Atmo-sphere | Satn. magnetization δs (emu/g) | Results of powder X-ray diffractometry | | |
|---|---|---|---|---|---|---|---|
| | | | | | $\alpha\text{-}Fe_2O_3$ | $Fe_3O_4$ | FeO |
| 21 | 4.97 | " | " | 81 | none | found | none |
| 22 | 7.10 | " | " | 75 | none | found | none |
| 23 | 10.65 | " | " | molten | immeasurable | immeasurable | immeasurable |
| 24 | 14.30 | " | " | " | " | " | " |
| 25 | 0.00 | 1450 | $N_2$ | 92 | none | found | none |
| 26 | 0.71 | " | " | 88 | none | found | none |
| 27 | 1.43 | " | " | 88 | none | found | none |
| 28 | 3.55 | " | " | 85 | none | found | none |
| 29 | 4.97 | " | " | 82 | none | found | none |
| 30 | 7.10 | " | " | 76 | none | found | none |
| 31 | 10.65 | " | " | molten | immeasurable | immeasurable | immeasurable |
| 32 | 14.30 | " | " | " | " | " | " |
| 33 | 0.00 | 1500 | $N_2$ | 87 | none | found | found |
| 34 | 0.71 | " | " | 85 | none | found | found |
| 35 | 1.43 | " | " | 86 | none | found | found |
| 36 | 3.55 | " | " | 80 | none | found | found |
| 37 | 4.97 | " | " | 77 | none | found | found |
| 38 | 7.10 | " | " | molten | none | found | found |
| 39 | 10.65 | " | " | " | immeasurable | immeasurable | immeasurable |
| 40 | 14.30 | " | " | " | " | " | " |

TABLE 3

Firing Experiment Results (Magnetite) of the Present Invention

| Sample No. | Amt. of Ca added (wt %) | Heating temp. T (°C.) | Atmo-sphere | Satn. magnetization δs (emu/g) | Results of powder X-ray diffractometry | | |
|---|---|---|---|---|---|---|---|
| | | | | | $\alpha\text{-}Fe_2O_3$ | $Fe_3O_4$ | FeO |
| 1 | 0.00 | 500 | $N_2$ | 86 | found | found | none |
| 2 | 0.71 | " | " | 85 | found | found | none |
| 3 | 1.43 | " | " | 84 | found | found | none |
| 4 | 3.55 | " | " | 83 | found | found | none |
| 5 | 4.97 | " | " | 80 | found | found | none |
| 6 | 7.10 | " | " | 77 | found | found | none |
| 7 | 10.65 | " | " | 72 | found | found | none |
| 8 | 14.30 | " | " | 69 | found | found | none |
| 9 | 21.30 | " | " | 60 | found | found | none |
| 10 | 35.50 | " | " | 44 | found | found | none |
| 11 | 56.80 | " | " | 18 | found | found | none |
| 12 | 64.00 | " | " | 9 | found | found | none |
| 13 | 0.00 | 550 | $N_2$ | 91 | none | found | none |
| 14 | 0.71 | " | " | 90 | none | found | none |
| 15 | 1.43 | " | " | 90 | none | found | none |
| 16 | 3.55 | " | " | 87 | none | found | none |
| 17 | 4.97 | " | " | 85 | none | found | none |
| 18 | 7.10 | " | " | 82 | none | found | none |
| 19 | 10.65 | " | " | 77 | none | found | none |
| 20 | 14.30 | " | " | 74 | none | found | none |
| 21 | 21.30 | " | " | 65 | none | found | none |
| 22 | 35.50 | " | " | 45 | none | found | none |
| 23 | 56.80 | " | " | 19 | none | found | none |
| 24 | 64.00 | " | " | 10 | none | found | none |
| 25 | 0.00 | 600 | $N_2$ | 92 | none | found | none |
| 26 | 0.71 | " | " | 90 | none | found | none |
| 27 | 1.43 | " | " | 90 | none | found | none |
| 28 | 3.55 | " | " | 87 | none | found | none |
| 29 | 4.97 | " | " | 84 | none | found | none |
| 30 | 7.10 | " | " | 83 | none | found | none |
| 31 | 10.65 | " | " | 76 | none | found | none |
| 32 | 14.30 | " | " | 74 | none | found | none |
| 33 | 21.30 | " | " | 65 | none | found | none |
| 34 | 35.50 | " | " | 45 | none | found | none |
| 35 | 56.80 | " | " | 20 | none | found | none |
| 36 | 64.00 | " | " | 10 | none | found | none |
| 37 | 0.00 | 800 | $N_2$ | 91 | none | found | none |
| 38 | 0.71 | " | " | 91 | none | found | none |
| 39 | 1.43 | " | " | 89 | none | found | none |
| 40 | 3.55 | " | " | 86 | none | found | none |

TABLE 3-continued

Firing Experiment Results (Magnetite) of the Present Invention

| Sample No. | Amt. of Ca added (wt %) | Heating temp. T (°C.) | Atmosphere | Satn. magnetization δs (emu/g) | Results of powder X-ray diffractometry $\alpha\text{-}Fe_2O_3$ | $Fe_3O_4$ | FeO |
|---|---|---|---|---|---|---|---|
| 41 | 4.97 | " | " | 85 | none | found | none |
| 42 | 7.10 | " | " | 77 | none | found | none |
| 43 | 10.65 | " | " | 60 | none | found | none |
| 44 | 14.30 | " | " | 47 | none | found | none |
| 45 | 21.30 | " | " | 20 | none | found | none |
| 46 | 35.50 | " | " | 2 | none | found | none |
| 47 | 56.80 | " | " | 1 | none | found | none |
| 48 | 64.00 | " | " | 0 | none | found | none |
| 49 | 0.00 | 1100 | $N_2$ | 91 | found | found | none |
| 50 | 0.71 | " | " | 91 | found | found | none |
| 51 | 1.43 | " | " | 89 | found | found | none |
| 52 | 3.55 | " | " | 87 | found | found | none |
| 53 | 4.97 | " | " | 84 | found | found | none |
| 54 | 7.10 | " | " | 76 | found | found | none |
| 55 | 10.65 | " | " | 62 | found | found | none |
| 56 | 14.30 | " | " | 45 | found | found | none |
| 57 | 21.30 | " | " | 19 | found | found | none |
| 58 | 35.50 | " | " | 2 | found | found | none |
| 59 | 56.80 | " | " | 1 | found | found | none |
| 60 | 64.00 | " | " | 0 | found | found | none |
| 61 | 0.00 | 1200 | $N_2$ | 92 | none | found | none |
| 62 | 0.71 | " | " | 91 | none | found | none |
| 63 | 1.43 | " | " | 90 | none | found | none |
| 64 | 3.55 | " | " | 87 | none | found | none |
| 65 | 4.97 | " | " | 85 | none | found | none |
| 66 | 7.10 | " | " | 74 | none | found | none |
| 67 | 10.65 | " | " | molten | immeasurable | immeasurable | immeasurable |
| 68 | 14.30 | " | " | " | " | " | " |
| 69 | 21.30 | " | " | " | " | " | " |
| 70 | 35.50 | " | " | " | " | " | " |
| 71 | 56.80 | " | " | " | " | " | " |
| 72 | 64.00 | " | " | " | " | " | " |
| 73 | 0.00 | 1450 | $N_2$ | 92 | none | found | none |
| 74 | 0.71 | " | " | 90 | none | found | none |
| 75 | 1.43 | " | " | 90 | none | found | none |
| 76 | 3.55 | " | " | 87 | none | found | none |
| 77 | 4.97 | " | " | 84 | none | found | none |
| 78 | 7.10 | " | " | 75 | none | found | none |
| 79 | 10.65 | " | " | molten | immeasurable | immeasurable | immeasurable |
| 80 | 14.30 | " | " | " | " | " | " |
| 81 | 21.30 | " | " | " | " | " | " |
| 82 | 35.50 | " | " | " | " | " | " |
| 83 | 56.80 | " | " | " | " | " | " |
| 84 | 64.00 | " | " | " | " | " | " |
| 85 | 0.00 | 1500 | $N_2$ | 86 | none | found | none |
| 86 | 0.71 | " | " | 86 | none | found | none |
| 87 | 1.43 | " | " | 84 | none | found | none |
| 88 | 3.55 | " | " | 80 | none | found | none |
| 89 | 4.97 | " | " | 78 | none | found | none |
| 90 | 7.10 | " | " | molten | immeasurable | immeasurable | immeasurable |
| 91 | 10.65 | " | " | " | " | " | " |
| 92 | 14.30 | " | " | " | " | " | " |
| 93 | 21.30 | " | " | " | " | " | " |
| 94 | 35.50 | " | " | " | " | " | " |
| 95 | 56.80 | " | " | " | " | " | " |
| 96 | 64.00 | " | " | " | " | " | " |

TABLE 4

Firing Experiment Results (TiO₂: 0 wt. %) of the Present Invention

| Sample No. | Amt. of PVA added (wt. %) | Heating temp. T (°C.) | Results of qual. anal. of powder X-ray diffractometry $Fe_3O_4$ | $\alpha\text{-}Fe_2O_3$ | FeO |
|---|---|---|---|---|---|
| Comp. Ex. 1 | 0 | 800 | — | ○ | — |
| " 2 | " | 1000 | — | ○ | — |

TABLE 4-continued

Firing Experiment Results (TiO₂: 0 wt. %) of the Present Invention

| | Sample No. | Amt. of PVA added (wt. %) | Heating temp. T (°C.) | Results of qual. anal. of powder X-ray diffractometry | | |
|---|---|---|---|---|---|---|
| | | | | Fe₃O₄ | α-Fe₂O₃ | FeO |
| " | 3 | " | 1100 | — | o | — |
| " | 4 | " | 1150 | o | o | — |
| " | 5 | " | 1200 | o | o | — |
| " | 6 | " | 1400 | o | o | — |
| " | 7 | " | 1450 | o | o | — |
| " | 8 | " | 1470 | o | — | o |
| Comp. Ex. | 9 | 2.0 | 800 | o | o | — |
| " | 10 | " | 1000 | o | o | — |
| " | 11 | " | 1100 | o | o | — |
| " | 12 | " | 1150 | o | o | — |
| Invention | 13 | " | 1200 | o | — | — |
| " | 14 | " | 1400 | o | — | — |
| " | 15 | " | 1450 | o | — | — |
| Comp. Ex. | 16 | " | 1500 | o | — | o |
| Invention | 17 | 0.1 | 1300 | o | — | — |
| " | 18 | 0.2 | " | o | — | — |
| " | 19 | 0.5 | " | o | — | — |
| " | 20 | 1.0 | " | o | — | — |
| " | 21 | 2.0 | " | o | — | — |
| " | 22 | 3.0 | " | o | — | — |

TABLE 5

Experimental Examples of the Present Invention (Magnetite, Ti)

| Sample No. | Amt. of Ti added (wt %) | Heating temp. T (°C.) | Atmosphere | Satn. magnetization δs (emu/g) | Grain strength (Pa) | Results of powder X-ray diffractometry | | |
|---|---|---|---|---|---|---|---|---|
| | | | | | | α-Fe₂O₃ | Fe₃O₄ | FeO |
| 1 | 0.00 | 500 | N₂ | 86 | 15E6 | none | found | none |
| 2 | 0.60 | " | " | 85 | 15E6 | none | found | none |
| 3 | 1.20 | " | " | 84 | 17E6 | none | found | none |
| 4 | 3.00 | " | " | 83 | 12E6 | none | found | none |
| 5 | 6.20 | " | " | 80 | 13E6 | none | found | none |
| 6 | 9.50 | " | " | 77 | 14E6 | none | found | none |
| 7 | 13.00 | " | " | 72 | 13E6 | none | found | none |
| 8 | 16.70 | " | " | 69 | 12E6 | none | found | none |
| 9 | 28.60 | " | " | 60 | 11E6 | none | found | none |
| 10 | 37.50 | " | " | 44 | 12E6 | none | found | none |
| 11 | 52.70 | " | " | 28 | 13E6 | none | found | none |
| 12 | 84.40 | " | " | 9 | 11E6 | none | found | none |
| 13 | 0.00 | 550 | N₂ | 91 | 15E8 | none | found | none |
| 14 | 0.60 | " | " | 91 | 15E8 | none | found | none |
| 15 | 1.20 | " | " | 90 | 17E8 | none | found | none |
| 16 | 3.00 | " | " | 86 | 12E8 | none | found | none |
| 17 | 6.20 | " | " | 81 | 13E8 | none | found | none |
| 18 | 9.50 | " | " | 75 | 14E8 | none | found | none |
| 19 | 13.00 | " | " | 70 | 13E8 | none | found | none |
| 20 | 16.70 | " | " | 64 | 12E8 | none | found | none |
| 21 | 28.60 | " | " | 45 | 11E8 | none | found | none |
| 22 | 37.50 | " | " | 36 | 12E8 | none | found | none |
| 23 | 52.70 | " | " | 20 | 13E8 | none | found | none |
| 24 | 84.40 | " | " | 1 | 11E8 | none | found | none |
| 25 | 0.00 | 600 | N₂ | 92 | 23E8 | none | found | none |
| 26 | 0.60 | " | " | 91 | 25E8 | none | found | none |
| 27 | 1.20 | " | " | 90 | 25E8 | none | found | none |
| 28 | 3.00 | " | " | 86 | 22E8 | none | found | none |
| 29 | 6.20 | " | " | 81 | 22E8 | none | found | none |
| 30 | 9.50 | " | " | 74 | 24E8 | none | found | none |
| 31 | 13.00 | " | " | 70 | 24E8 | none | found | none |
| 32 | 16.70 | " | " | 64 | 22E8 | none | found | none |
| 33 | 28.60 | " | " | 47 | 21E8 | none | found | none |
| 34 | 37.50 | " | " | 35 | 20E8 | none | found | none |
| 35 | 52.70 | " | " | 20 | 25E8 | none | found | none |
| 36 | 84.40 | " | " | 1 | 21E8 | none | found | none |
| 37 | 0.00 | 800 | N₂ | 92 | 45E8 | none | found | none |
| 38 | 0.60 | " | " | 91 | 48E8 | none | found | none |
| 39 | 1.20 | " | " | 85 | 47E8 | none | found | none |
| 40 | 3.00 | " | " | 78 | 42E8 | none | found | none |
| 41 | 6.20 | " | " | 66 | 41E8 | none | found | none |
| 42 | 9.50 | " | " | 58 | 44E8 | none | found | none |
| 43 | 13.00 | " | " | 51 | 49E8 | none | found | none |
| 44 | 16.70 | " | " | 42 | 42E8 | none | found | none |
| 45 | 28.60 | " | " | 21 | 45E8 | none | found | none |
| 46 | 37.50 | " | " | 3 | 43E8 | none | found | none |
| 47 | 52.70 | " | " | 1 | 40E8 | none | found | none |

TABLE 5-continued

Experimental Examples of the Present Invention (Magnetite, Ti)

| Sample No. | Amt. of Ti added (wt %) | Heating temp. T (°C.) | Atmo- sphere | Satn. magnetization δs (emu/g) | Grain strength (Pa) | Results of powder X-ray diffractometry | | |
|---|---|---|---|---|---|---|---|---|
| | | | | | | $\alpha$-$Fe_2O_3$ | $Fe_3O_4$ | FeO |
| 48 | 84.40 | " | " | 1 | 41E8 | none | found | none |
| 49 | 0.00 | 1100 | $N_2$ | 91 | 15E9 | none | found | none |
| 50 | 0.60 | " | " | 91 | 16E9 | none | found | none |
| 51 | 1.20 | " | " | 87 | 17E9 | none | found | none |
| 52 | 3.00 | " | " | 77 | 14E9 | none | found | none |
| 53 | 6.20 | " | " | 58 | 13E9 | none | found | none |
| 54 | 9.50 | " | " | 35 | 14E9 | none | found | none |
| 55 | 13.00 | " | " | 20 | 13E9 | none | found | none |
| 56 | 16.70 | " | " | 2 | 11E9 | none | found | none |
| 57 | 28.60 | " | " | 2 | 11E9 | none | found | none |
| 58 | 37.50 | " | " | 2 | 12E9 | none | found | none |
| 59 | 52.70 | " | " | 1 | 13E9 | none | found | none |
| 60 | 84.40 | " | " | 0 | 12E9 | none | found | none |
| 61 | 0.00 | 1200 | $N_2$ | 92 | 25E9 | none | found | none |
| 62 | 0.60 | " | " | 91 | 25E9 | none | found | none |
| 63 | 1.20 | " | " | 86 | 23E9 | none | found | none |
| 64 | 3.00 | " | " | 78 | 22E9 | none | found | none |
| 65 | 6.20 | " | " | 57 | 22E9 | none | found | none |
| 66 | 9.50 | " | " | 37 | 25E9 | none | found | none |
| 67 | 13.00 | " | " | 20 | 24E9 | none | found | none |
| 68 | 16.70 | " | " | 1 | 23E9 | none | found | none |
| 69 | 28.60 | " | " | 0 | 21E9 | none | found | none |
| 70 | 37.50 | " | " | 0 | 20E9 | none | found | none |
| 71 | 52.70 | " | " | 0 | 26E9 | none | found | none |
| 72 | 84.40 | " | " | 0 | 21E9 | none | found | none |
| 73 | 0.00 | 1450 | $N_2$ | 92 | 23E9 | none | found | none |
| 74 | 0.60 | " | " | 91 | 24E9 | none | found | none |
| 75 | 1.20 | " | " | 87 | 25E9 | none | found | none |
| 76 | 3.00 | " | " | 78 | 22E9 | none | found | none |
| 77 | 6.20 | " | " | 56 | 26E9 | none | found | none |
| 78 | 9.50 | " | " | 37 | 24E9 | none | found | none |
| 79 | 13.00 | " | " | 21 | 23E9 | none | found | none |
| 80 | 16.70 | " | " | 1 | 22E9 | none | found | none |
| 81 | 28.60 | " | " | 0 | 21E9 | none | found | none |
| 82 | 37.50 | " | " | 0 | 26E9 | none | found | none |
| 83 | 52.70 | " | " | 0 | 25E9 | none | found | none |
| 84 | 84.40 | " | " | 0 | 21E9 | none | found | none |
| 85 | 0.00 | 1500 | $N_2$ | 85 | 20E9 | none | found | found |
| 86 | 0.60 | " | " | 82 | 21E9 | none | found | found |
| 87 | 1.20 | " | " | 80 | 21E9 | none | found | found |
| 88 | 3.00 | " | " | 69 | 20E9 | none | found | found |
| 89 | 6.20 | " | " | 49 | 19E9 | none | found | found |
| 90 | 9.50 | " | " | 30 | 22E9 | none | found | found |
| 91 | 13.00 | " | " | 14 | 21E9 | none | found | found |
| 92 | 16.70 | " | " | 1 | 22E9 | none | found | found |
| 93 | 28.60 | " | " | 0 | 18E9 | none | found | found |
| 94 | 37.50 | " | " | 0 | 16E9 | none | found | found |
| 95 | 52.70 | " | " | 0 | 17E9 | none | found | found |
| 96 | 84.40 | " | " | 0 | 19E9 | none | found | found |

TABLE 6

Experiment Examples of the Present Invention (1:1 Magnetite + Hematite, Ti)

| Sample No. | Amt. of mag- netite added (wt %) | Amt. of hematite added (wt %) | Amt. of Ti added (wt %) | Heating temp. T (°C.) | Atmo- sphere | Satn. magnet- ization δs (emu/g) | Grain strength (Pa) | Results of powder X-ray diffractometry | | |
|---|---|---|---|---|---|---|---|---|---|---|
| | | | | | | | | $\alpha$-$Fe_2O_3$ | $Fe_2O_4$ | FeO |
| 1 | 50.00 | 50.00 | 0.00 | 1100 | $N_2$ | 91 | 15E9 | found | found | none |
| 2 | 49.70 | 49.70 | 0.60 | " | " | 91 | 16E9 | found | found | none |
| 3 | 49.40 | 49.40 | 1.20 | " | " | 87 | 17E9 | found | found | none |
| 4 | 48.50 | 48.50 | 3.00 | " | " | 77 | 14E9 | found | found | none |
| 5 | 46.90 | 46.90 | 6.20 | " | " | 58 | 13E9 | found | found | none |
| 6 | 45.25 | 45.25 | 9.50 | " | " | 35 | 14E9 | found | found | none |
| 7 | 43.50 | 43.50 | 13.00 | " | " | 20 | 13E9 | found | found | none |
| 8 | 41.70 | 41.70 | 16.60 | " | " | 2 | 11E9 | found | found | none |

TABLE 6-continued

Experiment Examples of the Present Invention (1:1 Magnetite + Hematite, Ti)

| Sample No. | Amt. of magnetite added (wt %) | Amt. of hematite added (wt %) | Amt. of Ti added (wt %) | Heating temp. T (°C.) | Atmosphere | Satn. magnetization $\delta s$ (emu/g) | Grain strength (Pa) | Results of powder X-ray diffractometry | | |
|---|---|---|---|---|---|---|---|---|---|---|
| | | | | | | | | $\alpha$-$Fe_2O_3$ | $Fe_2O_4$ | FeO |
| 9  | 35.70 | 35.70 | 28.60 | "    | "    | 2  | 11E9 | found | found | none  |
| 10 | 31.30 | 31.30 | 37.40 | "    | "    | 2  | 12E9 | found | found | none  |
| 11 | 23.70 | 23.70 | 52.60 | "    | "    | 1  | 13E9 | found | found | none  |
| 12 | 7.80  | 7.80  | 84.40 | "    | "    | 0  | 12E9 | found | found | none  |
| 13 | 50.00 | 50.00 | 0.00  | 1200 | $N_2$ | 92 | 25E9 | none  | found | none  |
| 14 | 49.70 | 49.70 | 0.60  | "    | "    | 91 | 25E9 | none  | found | none  |
| 15 | 49.40 | 49.40 | 1.20  | "    | "    | 86 | 23E9 | none  | found | none  |
| 16 | 48.50 | 48.50 | 3.00  | "    | "    | 78 | 22E9 | none  | found | none  |
| 17 | 46.90 | 46.90 | 6.20  | "    | "    | 57 | 22E9 | none  | found | none  |
| 18 | 45.25 | 45.25 | 9.50  | "    | "    | 37 | 25E9 | none  | found | none  |
| 19 | 43.50 | 43.50 | 13.00 | "    | "    | 20 | 24E9 | none  | found | none  |
| 20 | 41.70 | 41.70 | 16.60 | "    | "    | 1  | 23E9 | none  | found | none  |
| 21 | 35.70 | 35.70 | 28.60 | "    | "    | 0  | 21E9 | none  | found | none  |
| 22 | 31.30 | 31.30 | 37.40 | "    | "    | 0  | 20E9 | none  | found | none  |
| 23 | 23.70 | 23.70 | 52.70 | "    | "    | 0  | 26E9 | none  | found | none  |
| 24 | 7.80  | 7.80  | 84.40 | "    | "    | 0  | 21E9 | none  | found | none  |
| 25 | 50.00 | 50.00 | 0.00  | 1450 | $N_2$ | 92 | 23E9 | none  | found | none  |
| 26 | 49.70 | 49.70 | 0.60  | "    | "    | 91 | 24E9 | none  | found | none  |
| 27 | 49.40 | 49.40 | 1.20  | "    | "    | 87 | 25E9 | none  | found | none  |
| 28 | 48.50 | 48.50 | 3.00  | "    | "    | 78 | 22E9 | none  | found | none  |
| 29 | 46.90 | 46.90 | 6.20  | "    | "    | 56 | 26E9 | none  | found | none  |
| 30 | 45.25 | 45.25 | 9.50  | "    | "    | 37 | 24E9 | none  | found | none  |
| 31 | 43.50 | 43.50 | 13.00 | "    | "    | 21 | 23E9 | none  | found | none  |
| 32 | 41.70 | 41.70 | 16.60 | "    | "    | 1  | 22E9 | none  | found | none  |
| 33 | 35.70 | 35.70 | 28.60 | "    | "    | 0  | 21E9 | none  | found | none  |
| 34 | 31.30 | 31.30 | 37.40 | "    | "    | 0  | 26E9 | none  | found | none  |
| 35 | 23.70 | 23.70 | 52.60 | "    | "    | 0  | 25E9 | none  | found | none  |
| 36 | 7.80  | 7.80  | 84.40 | "    | "    | 0  | 21E9 | none  | found | none  |
| 37 | 50.00 | 50.00 | 0.00  | 1500 | $N_2$ | 85 | 20E9 | none  | found | found |
| 38 | 49.70 | 49.70 | 0.60  | "    | "    | 82 | 21E9 | none  | found | found |
| 39 | 49.40 | 49.40 | 1.20  | "    | "    | 80 | 21E9 | none  | found | found |
| 40 | 48.50 | 48.50 | 3.00  | "    | "    | 69 | 20E9 | none  | found | found |
| 41 | 46.90 | 46.90 | 6.20  | "    | "    | 49 | 19E9 | none  | found | found |
| 42 | 45.25 | 45.25 | 9.50  | "    | "    | 30 | 22E9 | none  | found | found |
| 43 | 43.50 | 43.50 | 13.00 | "    | "    | 14 | 21E9 | none  | found | found |
| 44 | 41.70 | 41.70 | 16.60 | "    | "    | 1  | 22E9 | none  | found | found |
| 45 | 35.70 | 35.70 | 28.60 | "    | "    | 0  | 18E9 | none  | found | found |
| 46 | 31.30 | 31.30 | 37.40 | "    | "    | 0  | 16E9 | none  | found | found |
| 47 | 23.70 | 23.70 | 52.60 | "    | "    | 0  | 17E9 | none  | found | found |
| 48 | 7.80  | 7.80  | 84.40 | "    | "    | 0  | 19E9 | none  | found | found |

TABLE 7

Experiment Examples of the Present Invention (1:3 Magnetite + Hematite, Ti)

| Sample No. | Amt. of magnetite added (wt %) | Amt. of hematite added (wt %) | Amt. of Ti added (wt %) | Heating temp. T (°C.) | Atmosphere | Satn. magnetization $\delta s$ (emu/g) | Grain strength (Pa) | Results of powder X-ray diffractometry | | |
|---|---|---|---|---|---|---|---|---|---|---|
| | | | | | | | | $\alpha$-$Fe_2O_3$ | $Fe_2O_4$ | FeO |
| 1  | 25.00 | 75.00 | 0.00  | 1100 | $N_2$ | 91 | 15E9 | none | found | none |
| 2  | 24.90 | 74.50 | 0.60  | "    | "    | 91 | 16E9 | none | found | none |
| 3  | 24.70 | 74.10 | 1.20  | "    | "    | 87 | 17E9 | none | found | none |
| 4  | 24.25 | 72.75 | 3.00  | "    | "    | 77 | 14E9 | none | found | none |
| 5  | 23.45 | 70.35 | 6.20  | "    | "    | 58 | 13E9 | none | found | none |
| 6  | 22.63 | 67.87 | 9.50  | "    | "    | 35 | 14E9 | none | found | none |
| 7  | 21.75 | 65.25 | 13.00 | "    | "    | 20 | 13E9 | none | found | none |
| 8  | 20.83 | 62.47 | 16.70 | "    | "    | 2  | 11E9 | none | found | none |
| 9  | 17.85 | 53.55 | 28.60 | "    | "    | 2  | 11E9 | none | found | none |
| 10 | 15.63 | 46.87 | 37.50 | "    | "    | 2  | 12E9 | none | found | none |
| 11 | 11.83 | 35.47 | 52.70 | "    | "    | 1  | 13E9 | none | found | none |
| 12 | 3.90  | 11.70 | 84.40 | "    | "    | 0  | 12E9 | none | found | none |
| 13 | 25.00 | 75.00 | 0.00  | 1200 | $N_2$ | 92 | 25E9 | none | found | none |
| 14 | 24.90 | 74.50 | 0.60  | "    | "    | 91 | 25E9 | none | found | none |

TABLE 7-continued

Experiment Examples of the Present Invention (1:3 Magnetite + Hematite, Ti)

| Sample No. | Amt. of magnetite added (wt %) | Amt. of hematite added (wt %) | Amt. of Ti added (wt %) | Heating temp. T (°C.) | Atmosphere | Satn. magnetization $\delta s$ (emu/g) | Grain strength (Pa) | Results of powder X-ray diffractometry | | |
|---|---|---|---|---|---|---|---|---|---|---|
| | | | | | | | | $\alpha\text{-}Fe_2O_3$ | $Fe_2O_4$ | FeO |
| 15 | 24.70 | 74.10 | 1.20 | " | " | 86 | 23E9 | none | found | none |
| 16 | 24.25 | 72.75 | 3.00 | " | " | 78 | 22E9 | none | found | none |
| 17 | 23.45 | 70.35 | 6.20 | " | " | 57 | 22E9 | none | found | none |
| 18 | 22.63 | 67.87 | 9.50 | " | " | 37 | 25E9 | none | found | none |
| 19 | 21.75 | 65.25 | 13.00 | " | " | 20 | 24E9 | none | found | none |
| 20 | 20.83 | 62.47 | 16.70 | " | " | 1 | 23E9 | none | found | none |
| 21 | 17.85 | 53.55 | 28.60 | " | " | 0 | 21E9 | none | found | none |
| 22 | 15.63 | 46.87 | 37.50 | " | " | 0 | 20E9 | none | found | none |
| 23 | 11.83 | 35.47 | 52.70 | " | " | 0 | 26E9 | none | found | none |
| 24 | 3.90 | 11.70 | 84.40 | " | " | 0 | 21E9 | none | found | none |
| 25 | 25.00 | 75.00 | 0.00 | 1450 | $N_2$ | 92 | 23E9 | none | found | none |
| 26 | 24.90 | 74.50 | 0.60 | " | " | 91 | 24E9 | none | found | none |
| 27 | 24.70 | 74.10 | 1.20 | " | " | 87 | 25E9 | none | found | none |
| 28 | 24.25 | 72.75 | 3.00 | " | " | 78 | 22E9 | none | found | none |
| 29 | 23.45 | 70.35 | 6.20 | " | " | 56 | 26E9 | none | found | none |
| 30 | 22.63 | 67.87 | 9.50 | " | " | 37 | 24E9 | none | found | none |
| 31 | 21.75 | 65.25 | 13.00 | " | " | 21 | 23E9 | none | found | none |
| 32 | 20.83 | 62.47 | 16.70 | " | " | 1 | 22E9 | none | found | none |
| 33 | 17.85 | 53.55 | 28.60 | " | " | 0 | 21E9 | none | found | none |
| 34 | 15.63 | 46.87 | 37.50 | " | " | 0 | 26E9 | none | found | none |
| 35 | 11.83 | 35.47 | 52.70 | " | " | 0 | 25E9 | none | found | none |
| 36 | 3.90 | 11.70 | 84.40 | " | " | 0 | 21E9 | none | found | none |
| 37 | 25.00 | 75.00 | 0.00 | 1500 | $N_2$ | 85 | 20E9 | none | found | found |
| 38 | 24.90 | 74.50 | 0.60 | " | " | 82 | 21E9 | none | found | found |
| 39 | 24.70 | 74.10 | 1.20 | " | " | 80 | 21E9 | none | found | found |
| 40 | 24.25 | 72.75 | 3.00 | " | " | 69 | 20E9 | none | found | found |
| 41 | 23.45 | 70.35 | 6.20 | " | " | 49 | 19E9 | none | found | found |
| 42 | 22.63 | 67.87 | 9.50 | " | " | 30 | 22E9 | none | found | found |
| 43 | 21.75 | 65.25 | 13.00 | " | " | 14 | 21E9 | none | found | found |
| 44 | 20.83 | 62.47 | 16.70 | " | " | 1 | 22E9 | none | found | found |
| 45 | 17.85 | 53.55 | 28.60 | " | " | 0 | 18E9 | none | found | found |
| 46 | 15.63 | 46.87 | 37.50 | " | " | 0 | 16E9 | none | found | found |
| 47 | 11.83 | 35.47 | 52.70 | " | " | 0 | 17E9 | none | found | found |
| 48 | 3.90 | 11.70 | 84.40 | " | " | 0 | 19E9 | none | found | found |

TABLE 8

Experiment Examples of the Present Invention (1:4 Magnetite + Hematite, Ti)

| Sample No. | Amt. of magnetite added (wt %) | Amt. of hematite added (wt %) | Amt. of Ti added (wt %) | Heating temp. T (°C.) | Atmosphere | Satn. magnetization $\delta s$ (emu/g) | Grain strength (Pa) | Results of powder X-ray diffractometry | | |
|---|---|---|---|---|---|---|---|---|---|---|
| | | | | | | | | $\alpha\text{-}Fe_2O_3$ | $Fe_2O_4$ | FeO |
| 1 | 20.00 | 80.00 | 0.00 | 1100 | $N_2$ | 91 | 15E9 | found | found | none |
| 2 | 19.90 | 79.50 | 0.60 | " | " | 91 | 16E9 | found | found | none |
| 3 | 19.80 | 79.00 | 1.20 | " | " | 87 | 17E9 | found | found | none |
| 4 | 19.40 | 77.60 | 3.00 | " | " | 77 | 14E9 | found | found | none |
| 5 | 18.80 | 75.00 | 6.20 | " | " | 58 | 13E9 | found | found | none |
| 6 | 18.10 | 72.40 | 9.50 | " | " | 35 | 14E9 | found | found | none |
| 7 | 17.40 | 69.40 | 13.00 | " | " | 20 | 13E9 | found | found | none |
| 8 | 16.70 | 66.60 | 16.70 | " | " | 2 | 11E9 | found | found | none |
| 9 | 14.30 | 57.10 | 28.60 | " | " | 2 | 11E9 | found | found | none |
| 10 | 12.50 | 50.00 | 37.50 | " | " | 2 | 12E9 | found | found | none |
| 11 | 9.50 | 37.80 | 52.70 | " | " | 1 | 13E9 | found | found | none |
| 12 | 3.10 | 12.50 | 84.40 | " | " | 0 | 12E9 | found | found | none |
| 13 | 20.00 | 80.00 | 0.00 | 1200 | $N_2$ | 92 | 25E9 | none | found | none |
| 14 | 19.90 | 79.50 | 0.60 | " | " | 91 | 25E9 | none | found | no)ne |
| 15 | 19.80 | 79.00 | 1.20 | " | " | 86 | 23E9 | none | found | none |
| 16 | 19.40 | 77.60 | 3.00 | " | " | 78 | 22E9 | none | found | none |
| 17 | 18.80 | 75.00 | 6.20 | " | " | 57 | 22E9 | none | found | none |
| 18 | 18.10 | 72.40 | 9.50 | " | " | 37 | 25E9 | none | found | none |
| 19 | 17.40 | 69.40 | 13.00 | " | " | 20 | 24E9 | none | found | none |
| 20 | 16.70 | 66.60 | 16.70 | " | " | 1 | 23E9 | none | found | none |

TABLE 8-continued

Experiment Examples of the Present Invention (1:4 Magnetite + Hematite, Ti)

| Sample No. | Amt. of magnetite added (wt %) | Amt. of hematite added (wt %) | Amt. of Ti added (wt %) | Heating temp. T (°C.) | Atmo-sphere | Satn. magnetization δs (emu/g) | Grain strength (Pa) | Results of powder X-ray diffractometry | | |
|---|---|---|---|---|---|---|---|---|---|---|
| | | | | | | | | α-Fe$_2$O$_3$ | Fe$_2$O$_4$ | FeO |
| 21 | 14.30 | 57.10 | 28.60 | " | " | 0 | 21E9 | none | found | none |
| 22 | 12.50 | 50.00 | 37.50 | " | " | 0 | 20E9 | none | found | none |
| 23 | 9.50 | 37.80 | 52.70 | " | " | 0 | 26E9 | none | found | none |
| 24 | 3.10 | 12.50 | 84.40 | " | " | 0 | 21E9 | none | found | none |
| 25 | 20.00 | 80.00 | 0.00 | 1450 | N$_2$ | 92 | 23E9 | none | found | none |
| 26 | 19.90 | 79.50 | 0.60 | " | " | 91 | 24E9 | none | found | none |
| 27 | 19.80 | 79.00 | 1.20 | " | " | 87 | 25E9 | none | found | none |
| 28 | 19.40 | 77.60 | 3.00 | " | " | 78 | 22E9 | none | found | none |
| 29 | 18.80 | 75.00 | 6.20 | " | " | 56 | 26E9 | none | found | none |
| 30 | 18.10 | 72.40 | 9.50 | " | " | 37 | 24E9 | none | found | none |
| 31 | 17.40 | 69.40 | 13.00 | " | " | 21 | 23E9 | none | found | none |
| 32 | 16.70 | 66.60 | 16.70 | " | " | 1 | 22E9 | none | found | none |
| 33 | 14.30 | 57.10 | 28.60 | " | " | 0 | 21E9 | none | found | none |
| 34 | 12.50 | 50.00 | 37.50 | " | " | 0 | 26E9 | none | found | none |
| 35 | 9.50 | 37.80 | 52.70 | " | " | 0 | 25E9 | none | found | none |
| 36 | 3.10 | 12.50 | 84.40 | " | " | 0 | 21E9 | none | found | none |
| 37 | 20.00 | 80.00 | 0.00 | 1500 | N$_2$ | 85 | 20E9 | none | found | found |
| 38 | 19.90 | 79.50 | 0.60 | " | " | 82 | 21E9 | none | found | found |
| 39 | 19.80 | 79.00 | 1.20 | " | " | 80 | 21E9 | none | found | found |
| 40 | 19.40 | 77.60 | 3.00 | " | " | 69 | 20E9 | none | found | found |
| 41 | 18.80 | 75.00 | 6.20 | " | " | 49 | 19E9 | none | found | found |
| 42 | 18.10 | 72.40 | 9.50 | " | " | 30 | 22E9 | none | found | found |
| 43 | 17.40 | 69.40 | 13.00 | " | " | 14 | 21E9 | none | found | found |
| 44 | 16.70 | 66.60 | 16.70 | " | " | 1 | 22E9 | none | found | found |
| 45 | 14.30 | 57.10 | 28.60 | " | " | 0 | 18E9 | none | found | found |
| 46 | 12.50 | 50.00 | 37.50 | " | " | 0 | 16E9 | none | found | found |
| 47 | 9.50 | 37.80 | 52.70 | " | " | 0 | 17E9 | none | found | found |
| 48 | 3.10 | 12.50 | 84.40 | " | " | 0 | 19E9 | none | found | found |

TABLE 9

Other Experimental Examples of the Present Invention (Hematite, Sn)

| Sample No. | Amt. of Sn added (wt %) | Heating temp. T (°C.) | Atmosphere | Satn. magnetization δs (emu/g) | Results of powder X-ray diffractometry | | |
|---|---|---|---|---|---|---|---|
| | | | | | α-Fe$_2$O$_3$ | Fe$_3$O$_4$ | FeO |
| 1 | 0.00 | 1100 | N$_2$ | 86 | found | found | none |
| 2 | 0.80 | " | " | 85 | found | found | none |
| 3 | 1.58 | " | " | 84 | found | found | none |
| 4 | 3.98 | " | " | 83 | found | found | none |
| 5 | 8.04 | " | " | 75 | found | found | none |
| 6 | 16.44 | " | " | 69 | found | found | none |
| 7 | 44.04 | " | " | 41 | found | found | none |
| 8 | 64.74 | " | " | 26 | found | found | none |
| 9 | 76.00 | " | " | 16 | found | found | none |
| 10 | 87.60 | " | " | 8 | found | found | none |
| 11 | 0.00 | 1200 | N$_2$ | 92 | none | found | none |
| 12 | 0.80 | " | " | 91 | none | found | none |
| 13 | 1.58 | " | " | 90 | none | found | none |
| 14 | 3.98 | " | " | 87 | none | found | none |
| 15 | 8.04 | " | " | 82 | none | found | none |
| 16 | 16.44 | " | " | 76 | none | found | none |
| 17 | 44.04 | " | " | 47 | none | found | none |
| 18 | 64.74 | " | " | 28 | none | found | none |
| 19 | 76.00 | " | " | 21 | none | found | none |
| 20 | 87.60 | " | " | 9 | none | found | none |
| 21 | 0.00 | 1300 | N$_2$ | 92 | none | found | none |
| 22 | 0.80 | " | " | 91 | none | found | none |
| 23 | 1.58 | " | " | 90 | none | found | none |
| 24 | 3.98 | " | " | 86 | none | found | none |
| 25 | 8.04 | " | " | 82 | none | found | none |
| 26 | 16.44 | " | " | 74 | none | found | none |
| 27 | 44.04 | " | " | 47 | none | found | none |

TABLE 9-continued

Other Experimental Examples of the Present Invention (Hematite, Sn)

| Sample No. | Amt. of Sn added (wt %) | Heating temp. T (°C.) | Atmosphere | Satn. magnet- ization δs (emu/g) | Results of powder X-ray diffractometry | | |
|---|---|---|---|---|---|---|---|
| | | | | | α-Fe$_2$O$_3$ | Fe$_3$O$_4$ | FeO |
| 28 | 64.74 | " | " | 25 | none | found | none |
| 29 | 76.00 | " | " | 21 | none | found | none |
| 30 | 87.60 | " | " | 8 | none | found | none |
| 31 | 0.00 | 1450 | N$_2$ | 92 | none | found | none |
| 32 | 0.80 | " | " | 91 | none | found | none |
| 33 | 1.58 | " | " | 90 | none | found | none |
| 34 | 3.98 | " | " | 87 | none | found | none |
| 35 | 8.04 | " | " | 85 | none | found | none |
| 36 | 16.44 | " | " | 75 | none | found | none |
| 37 | 44.04 | " | " | 47 | none | found | none |
| 38 | 64.74 | " | " | 29 | none | found | none |
| 39 | 76.00 | " | " | 21 | none | found | none |
| 40 | 87.60 | " | " | 9 | none | found | none |
| 41 | 0.00 | 1500 | N$_2$ | 86 | none | found | found |
| 42 | 0.80 | " | " | 85 | none | found | found |
| 43 | 1.58 | " | " | 84 | none | found | found |
| 44 | 3.98 | " | " | 83 | none | found | found |
| 45 | 8.04 | " | " | 75 | none | found | found |
| 46 | 16.44 | " | " | 68 | none | found | found |
| 47 | 44.04 | " | " | 39 | none | found | found |
| 48 | 64.74 | " | " | 22 | none | found | found |
| 49 | 76.00 | " | " | 15 | none | found | found |
| 50 | 87.60 | " | " | 2 | none | found | found |

TABLE 10

Other Experimental Examples of the Present Invention (1:1 Hematite + Magnetite, Sn)

| Sample No. | Amt. of Sn added (wt %) | Heating temp. T (°C.) | Atmosphere | Satn. magnet- ization δs (emu/g) | Results of powder X-ray diffractometry | | |
|---|---|---|---|---|---|---|---|
| | | | | | α-Fe$_2$O$_3$ | Fe$_3$O$_4$ | FeO |
| 1 | 0.00 | 1100 | N$_2$ | 86 | found | found | none |
| 2 | 0.80 | " | " | 85 | found | found | none |
| 3 | 1.58 | " | " | 84 | found | found | none |
| 4 | 3.98 | " | " | 83 | found | found | none |
| 5 | 8.04 | " | " | 75 | found | found | none |
| 6 | 16.44 | " | " | 69 | found | found | none |
| 7 | 44.04 | " | " | 39 | found | found | none |
| 8 | 64.74 | " | " | 22 | found | found | none |
| 9 | 76.00 | " | " | 16 | found | found | none |
| 10 | 87.60 | " | " | 4 | found | found | none |
| 11 | 0.00 | 1200 | N$_2$ | 92 | none | found | none |
| 12 | 0.80 | " | " | 91 | none | found | none |
| 13 | 1.58 | " | " | 90 | none | found | none |
| 14 | 3.98 | " | " | 87 | none | found | none |
| 15 | 8.04 | " | " | 85 | none | found | none |
| 16 | 16.44 | " | " | 75 | none | found | none |
| 17 | 44.04 | " | " | 47 | none | found | none |
| 18 | 64.74 | " | " | 29 | none | found | none |
| 19 | 76.00 | " | " | 21 | none | found | none |
| 20 | 87.60 | " | " | 9 | none | found | none |
| 21 | 0.00 | 1300 | N$_2$ | 92 | none | found | none |
| 22 | 0.80 | " | " | 91 | none | found | none |
| 23 | 1.58 | " | " | 90 | none | found | none |
| 24 | 3.98 | " | " | 87 | none | found | none |
| 25 | 8.04 | " | " | 85 | none | found | none |
| 26 | 16.44 | " | " | 74 | none | found | none |
| 27 | 44.04 | " | " | 47 | none | found | none |
| 28 | 64.74 | " | " | 29 | none | found | none |
| 29 | 76.00 | " | " | 20 | none | found | none |
| 30 | 87.60 | " | " | 9 | none | found | none |
| 31 | 0.00 | 1450 | N$_2$ | 92 | none | found | none |
| 32 | 0.80 | " | " | 91 | none | found | none |

TABLE 10-continued

Other Experimental Examples of the Present Invention
(1:1 Hematite + Magnetite, Sn)

| Sample No. | Amt. of Sn added (wt %) | Heating temp. T (°C.) | Atmosphere | Satn. magnetization δs (emu/g) | Results of powder X-ray diffractometry | | |
|---|---|---|---|---|---|---|---|
| | | | | | α-Fe$_2$O$_3$ | Fe$_3$O$_4$ | FeO |
| 33 | 1.58 | " | " | 90 | none | found | none |
| 34 | 3.98 | " | " | 86 | none | found | none |
| 35 | 8.04 | " | " | 85 | none | found | none- |
| 36 | 16.44 | " | " | 74 | none | found | none |
| 37 | 44.04 | " | " | 46 | none | found | none |
| 38 | 64.74 | " | " | 29 | none | found | none |
| 39 | 76.00 | " | " | 20 | none | found | none |
| 40 | 87.60 | " | " | 10 | none | found | none |
| 41 | 0.00 | 1500 | N$_2$ | 86 | none | found | found |
| 42 | 0.80 | " | " | 85 | none | found | found |
| 43 | 1.58 | " | " | 84 | none | found | found |
| 44 | 3.98 | " | " | 83 | none | found | found |
| 45 | 8.04 | " | " | 75 | none | found | found |
| 46 | 16.44 | " | " | 69 | none | found | found |
| 47 | 44.04 | " | " | 39 | none | found | found |
| 48 | 64.74 | " | " | 22 | none | found | found |
| 49 | 76.00 | " | " | 16 | none | found | found |
| 50 | 87.60 | " | " | 4 | none | found | found |

TABLE 11

Other Experimental Examples of the Present Invention
(Magnetite, Sn)

| Sample No. | Amt. of Sn added (wt %) | Heating temp. T (°C.) | Atmosphere | Satn. magnetization δs (emu/g) | Results of powder X-ray diffractometry | | |
|---|---|---|---|---|---|---|---|
| | | | | | α-Fe$_2$O$_3$ | Fe$_3$O$_4$ | FeO |
| 1 | 0.00 | 500 | N$_2$ | 86 | found | found | none |
| 2 | 0.80 | " | " | 85 | found | found | none |
| 3 | 1.58 | " | " | 84 | found | found | none |
| 4 | 3.98 | " | " | 83 | found | found | none |
| 5 | 8.04 | " | " | 75 | found | found | none |
| 6 | 16.44 | " | " | 70 | found | found | none |
| 7 | 44.04 | " | " | 39 | found | found | none |
| 8 | 64.74 | " | " | 22 | found | found | none |
| 9 | 76.00 | " | " | 14 | found | found | none |
| 10 | 87.60 | " | " | 3 | found | found | none |
| 11 | 0.00 | 550 | N$_2$ | 92 | none | found | none |
| 12 | 0.80 | " | " | 91 | none | found | none |
| 13 | 1.58 | " | " | 90 | none | found | none |
| 14 | 3.98 | " | " | 87 | none | found | none |
| 15 | 8.04 | " | " | 85 | none | found | none |
| 16 | 16.44 | " | " | 75 | none | found | none |
| 17 | 44.04 | " | " | 47 | none | found | none |
| 18 | 64.74 | " | " | 29 | none | found | none |
| 19 | 76.00 | " | " | 21 | none | found | none |
| 20 | 87.60 | " | " | 9 | none | found | none |
| 21 | 0.00 | 600 | N$_2$ | 92 | none | found | none |
| 22 | 0.80 | " | " | 91 | none | found | none |
| 23 | 1.58 | " | " | 90 | none | found | none |
| 24 | 3.98 | " | " | 87 | none | found | none |
| 25 | 8.04 | " | " | 85 | none | found | none |
| 26 | 16.44 | " | " | 74 | none | found | none |
| 27 | 44.04 | " | " | 47 | none | found | none |
| 28 | 64.74 | " | " | 29 | none | found | none |
| 29 | 76.00 | " | " | 20 | none | found | none |
| 30 | 87.60 | " | " | 9 | none | found | none |
| 31 | 0.00 | 800 | N$_2$ | 92 | none | found | none |
| 32 | 0.80 | " | " | 91 | none | found | none. |
| 33 | 1.58 | " | " | 90 | none | found | none |
| 34 | 3.98 | " | " | 86 | none | found | none |
| 35 | 8.04 | " | " | 85 | none | found | none |
| 36 | 16.44 | " | " | 74 | none | found | none |

TABLE 11-continued

Other Experimental Examples of the Present Invention (Magnetite, Sn)

| Sample No. | Amt. of Sn added (wt %) | Heating temp. T (°C.) | Atmosphere | Satn. magnetization δs (emu/g) | Results of powder X-ray diffractometry | | |
|---|---|---|---|---|---|---|---|
| | | | | | $\alpha\text{-Fe}_2\text{O}_3$ | $\text{Fe}_3\text{O}_4$ | FeO |
| 37 | 44.04 | " | " | 46 | none | found | none |
| 38 | 64.74 | " | " | 29 | none | found | none |
| 39 | 76.00 | " | " | 20 | none | found | none |
| 40 | 87.60 | " | " | 10 | none | found | none |
| 41 | 0.00 | 1100 | $\text{N}_2$ | 92 | none | found | none |
| 42 | 0.80 | " | " | 91 | none | found | none |
| 43 | 1.58 | " | " | 90 | none | found | none |
| 44 | 3.98 | " | " | 87 | none | found | none |
| 45 | 8.04 | " | " | 83 | none | found | none |
| 46 | 16.44 | " | " | 75 | none | found | none |
| 47 | 44.04 | " | " | 47 | none | found | none |
| 48 | 64.74 | " | " | 28 | none | found | none |
| 49 | 76.00 | " | " | 20 | none | found | none |
| 50 | 87.60 | " | " | 9 | none | found | none |
| 51 | 0.00 | 1200 | $\text{N}_2$ | 92 | none | found | none |
| 52 | 0.80 | " | " | 91 | none | found | none |
| 53 | 1.58 | " | " | 90 | none | found | none |
| 54 | 3.98 | " | " | 87 | none | found | none |
| 55 | 8.04 | " | " | 82 | none | found | none |
| 56 | 16.44 | " | " | 74 | none | found | none |
| 57 | 44.04 | " | " | 47 | none | found | none |
| 58 | 64.74 | " | " | 26 | none | found | none |
| 59 | 76.00 | " | " | 21 | none | found | none |
| 60 | 87.60 | " | " | 8 | none | found | none |
| 61 | 0.00 | 1300 | $\text{N}_2$ | 92 | none | found | none |
| 62 | 0.80 | " | " | 91 | none | found | none |
| 63 | 1.58 | " | " | 90 | none | found | none |
| 64 | 3.98 | " | " | 87 | none | found | none |
| 65 | 8.04 | " | " | 85 | none | found | none |
| 66 | 16.44 | " | " | 74 | none | found | none |
| 67 | 44.04 | " | " | 47 | none | found | none |
| 68 | 64.74 | " | " | 29 | none | found | none |
| 69 | 76.00 | " | " | 20 | none | found | none |
| 70 | 87.60 | " | " | 9 | none | found | none |
| 71 | 0.00 | 1450 | $\text{N}_2$ | 92 | none | found | none |
| 72 | 0.80 | " | " | 91 | none | found | none |
| 73 | 1.58 | " | " | 90 | none | found | none |
| 74 | 3.98 | " | " | 87 | none | found | none |
| 75 | 8.04 | " | " | 82 | none | found | none |
| 76 | 16.44 | " | " | 74 | none | found | none |
| 77 | 44.04 | " | " | 47 | none | found | none |
| 78 | 64.74 | " | " | 26 | none | found | none |
| 79 | 76.00 | " | " | 21 | none | found | none |
| 80 | 87.60 | " | " | 8 | none | found | none |
| 81 | 0.00 | 1500 | $\text{N}_2$ | 86 | none | found | found |
| 82 | 0.80 | " | " | 85 | none | found | found |
| 83 | 1.58 | " | " | 84 | none | found | found |
| 84 | 3.98 | " | " | 83 | none | found | found |
| 85 | 8.04 | " | " | 75 | none | found | found |
| 86 | 16.44 | " | " | 69 | none | found | found |
| 87 | 44.04 | " | " | 39 | none | found | found |
| 88 | 64.74 | " | " | 22 | none | found | found |
| 89 | 76.00 | " | " | 16 | none | found | found |
| 90 | 87.60 | " | " | 4 | none | found | found |

TABLE 12

Firing Experiment Results (SiO$_2$: 0 wt. %) of the Present Invention

| | Sample No. | Amt. of PVA added (wt. %) | Heating temp. T (°C.) | Results of powder X-ray diffractometry | | |
|---|---|---|---|---|---|---|
| | | | | Fe$_3$O$_4$ | α-Fe$_2$O$_3$ | FeO |
| Comp. Ex. | 1 | 0 | 800 | — | ○ | — |
| " | 2 | " | 1000 | — | ○ | — |
| " | 3 | " | 1100 | — | ○ | — |
| " | 4 | " | 1150 | ○ | ○ | — |
| " | 5 | " | 1200 | ○ | ○ | — |
| " | 6 | " | 1400 | ○ | ○ | — |
| " | 7 | " | 1450 | ○ | ○ | — |
| " | 8 | " | 1470 | ○ | — | ○ |
| Comp. Ex. | 9 | 2.0 | 800 | ○ | ○ | — |
| " | 10 | " | 1000 | ○ | ○ | — |
| " | 11 | " | 1100 | ○ | ○ | — |
| " | 12 | " | 1150 | ○ | ○ | — |

TABLE 12-continued

Firing Experiment Results (SiO$_2$: 0 wt. %) of the Present Invention

| | Sample No. | Amt. of PVA added (wt. %) | Heating temp. T (°C.) | Results of powder X-ray diffractometry | | |
|---|---|---|---|---|---|---|
| | | | | Fe$_3$O$_4$ | α-Fe$_2$O$_3$ | FeO |
| Invention | 13 | " | 200 | ○ | — | — |
| " | 14 | " | 1400 | ○ | — | — |
| " | 15 | " | 1450 | ○ | — | — |
| Comp. Ex. | 16 | " | 1500 | ○ | — | ○ |
| Invention | 17 | 0.1 | 1300 | ○ | — | — |
| " | 18 | 0.2 | " | ○ | — | — |
| " | 19 | 0.5 | " | ○ | — | — |
| " | 20 | 1.0 | " | ○ | — | — |
| " | 21 | 2.0 | " | ○ | — | — |
| " | 22 | 3.0 | " | ○ | — | — |

TABLE 13

Experimental Examples of the Present Invention (Hematite)

| Sample No. | Amt. of Si added (wt %) | Heating temp. T (°C.) | Atmosphere | Satn. magnetization δs (emu/g) | Results of powder X-ray diffractometry | | |
|---|---|---|---|---|---|---|---|
| | | | | | α-Fe$_2$O$_3$ | Fe$_3$O$_4$ | FeO |
| 1 | 0.00 | 1100 | N$_2$ | 86 | found | found | none |
| 2 | 0.50 | " | " | 85 | found | found | none |
| 3 | 0.90 | " | " | 84 | found | found | none |
| 4 | 2.40 | " | " | 83 | found | found | none |
| 5 | 4.90 | " | " | 75 | found | found | none |
| 6 | 10.40 | " | " | 69 | found | found | none |
| 7 | 31.50 | " | " | 39 | found | found | none |
| 8 | 51.20 | " | " | 22 | found | found | none |
| 9 | 65.00 | " | " | 16 | found | found | none |
| 10 | 79.50 | " | " | 4 | found | found | none |
| 11 | 0.00 | 1200 | N$_2$ | 92 | none | found | none |
| 12 | 0.50 | " | " | 91 | none | found | none |
| 13 | 0.90 | " | " | 90 | none | found | none |
| 14 | 2.40 | " | " | 87 | none | found | none |
| 15 | 4.90 | " | " | 83 | none | found | none |
| 16 | 10.40 | " | " | 75 | none | found | none |
| 17 | 31.50 | " | " | 47 | none | found | none |
| 18 | 51.20 | " | " | 28 | none | found | none |
| 19 | 65.00 | " | " | 20 | none | found | none |
| 20 | 79.50 | " | " | 9 | none | found | none |
| 21 | 0.00 | 1300 | N$_2$ | 92 | none | found | none |
| 22 | 0.50 | " | " | 91 | none | found | none |
| 23 | 0.90 | " | " | 90 | none | found | none |
| 24 | 2.40 | " | " | 87 | none | found | none |
| 25 | 4.90 | " | " | 82 | none | found | none |
| 26 | 10.40 | " | " | 74 | none | found | none |
| 27 | 31.50 | " | " | 47 | none | found | none |
| 28 | 51.20 | " | " | 26 | none | found | none |
| 29 | 65.00 | " | " | 21 | none | found | none |
| 30 | 79.50 | " | " | 8 | none | found | none |
| 31 | 0.00 | 1450 | N$_2$ | 92 | none | found | none |
| 32 | 0.50 | " | " | 91 | none | found | none |
| 33 | 0.90 | " | " | 90 | none | found | none |
| 34 | 2.40 | " | " | 87 | none | found | none |
| 35 | 4.90 | " | " | 85 | none | found | none |
| 36 | 10.40 | " | " | 74 | none | found | none |
| 37 | 31.50 | " | " | 47 | none | found | none |
| 38 | 51.20 | " | " | 29 | none | found | none |
| 39 | 65.00 | " | " | 20 | none | found | none |
| 40 | 79.50 | " | " | 9 | none | found | none |
| 41 | 0.00 | 1500 | N$_2$ | 86 | none | found | found |
| 42 | 0.50 | " | " | 85 | none | found | found |
| 43 | 0.90 | " | " | 84 | none | found | found |
| 44 | 2.40 | " | " | 83 | none | found | found |
| 45 | 4.90 | " | " | 75 | none | found | found |
| 46 | 10.40 | " | " | 69 | none | found | found |

TABLE 13-continued

Experimental Examples of the Present Invention (Hematite)

| Sample No. | Amt. of Si added (wt %) | Heating temp. T (°C.) | Atmo- sphere | Satn. magnetization δs (emu/g) | Results of powder X-ray diffractometry | | |
|---|---|---|---|---|---|---|---|
| | | | | | $\alpha\text{-}Fe_2O_3$ | $Fe_3O_4$ | FeO |
| 47 | 31.50 | " | " | 39 | none | found | found |
| 48 | 51.20 | " | " | 22 | none | found | found |
| 49 | 65.00 | " | " | 16 | none | found | found |
| 50 | 79.50 | " | " | 4 | none | found | found |

TABLE 14

Experimental Examples of the Present Invention (Hematite + Magnetite)

| Sample No. | Amt. of Si added (wt %) | Heating temp. T (°C.) | Atmo- sphere | Satn. magnetization δs (emu/g) | Results of powder X-ray diffractometry | | |
|---|---|---|---|---|---|---|---|
| | | | | | $\alpha\text{-}Fe_2O_3$ | $Fe_3O_4$ | FeO |
| 1 | 0.00 | 1100 | $N_2$ | 86 | found | found | none |
| 2 | 0.50 | " | " | 85 | found | found | none |
| 3 | 0.90 | " | " | 84 | found | found | none |
| 4 | 2.40 | " | " | 83 | found | found | none |
| 5 | 4.90 | " | " | 75 | found | found | none |
| 6 | 10.40 | " | " | 69 | found | found | none |
| 7 | 31.50 | " | " | 39 | found | found | none |
| 8 | 51.20 | " | " | 22 | found | found | none |
| 9 | 65.00 | " | " | 16 | found | found | none |
| 10 | 79.50 | " | " | 4 | found | found | none |
| 11 | 0.00 | 1200 | $N_2$ | 92 | none | found | none |
| 12 | 0.50 | " | " | 91 | none | found | none |
| 13 | 0.90 | " | " | 90 | none | found | none |
| 14 | 2.40 | " | " | 87 | none | found | none |
| 15 | 4.90 | " | " | 85 | none | found | none |
| 16 | 10.40 | " | " | 75 | none | found | none |
| 17 | 31.50 | " | " | 47 | none | found | none |
| 18 | 51.20 | " | " | 29 | none | found | none |
| 19 | 65.00 | " | " | 21 | none | found | none |
| 20 | 79.50 | " | " | 9 | none | found | none |
| 21 | 0.00 | 1300 | $N_2$ | 92 | none | found | none |
| 22 | 0.50 | " | " | 91 | none | found | none |
| 23 | 0.90 | " | " | 90 | none | found | none |
| 24 | 2.40 | " | " | 87 | none | found | none |
| 25 | 4.90 | " | " | 85 | none | found | none |
| 26 | 10.40 | " | " | 74 | none | found | none |
| 27 | 31.50 | " | " | 47 | none | found | none |
| 28 | 51.20 | " | " | 29 | none | found | none |
| 29 | 65.00 | " | " | 20 | none | found | none |
| 30 | 79.50 | " | " | 9 | none | found | none |
| 31 | 0.00 | 1450 | $N_2$ | 92 | none | found | none |
| 32 | 0.50 | " | " | 91 | none | found | none |
| 33 | 0.90 | " | " | 90 | none | found | none |
| 34 | 2.40 | " | " | 86 | none | found | none |
| 35 | 4.90 | " | " | 85 | none | found | none |
| 36 | 10.40 | " | " | 74 | none | found | none- |
| 37 | 31.50 | " | " | 46 | none | found | none |
| 38 | 51.20 | " | " | 29 | none | found | none |
| 39 | 65.00 | " | " | 20 | none | found | none |
| 40 | 79.50 | " | " | 10 | none | found | none |
| 41 | 0.00 | 1500 | $N_2$ | 86 | none | found | found |
| 42 | 0.50 | " | " | 85 | none | found | found |
| 43 | 0.90 | " | " | 84 | none | found | found |
| 44 | 2.40 | " | " | 83 | none | found | found |
| 45 | 4.90 | " | " | 75 | none | found | found |
| 46 | 10.40 | " | " | 69 | none | found | found |
| 47 | 31.50 | " | " | 39 | none | found | found |
| 48 | 51.20 | " | " | 22 | none | found | found |
| 49 | 65.00 | " | " | 16 | none | found | found |
| 50 | 79.50 | " | " | 4 | none | found | found |

TABLE 15

Experimental Examples of the Present Invention (Magnetite)

| Sample No. | Amt. of Si added (wt %) | Heating temp. T (°C.) | Atmosphere | Satn. magnetization δs (emu/g) | Results of powder X-ray diffractometry | | |
|---|---|---|---|---|---|---|---|
| | | | | | α-$Fe_2O_3$ | $Fe_3O_4$ | FeO |
| 1 | 0.00 | 500 | $N_2$ | 86 | found | found | none |
| 2 | 0.50 | " | " | 85 | found | found | none |
| 3 | 0.90 | " | " | 84 | found | found | none |
| 4 | 2.40 | " | " | 83 | found | found | none |
| 5 | 4.90 | " | " | 75 | found | found | none |
| 6 | 10.40 | " | " | 70 | found | found | none |
| 7 | 31.50 | " | " | 39 | found | found | none |
| 8 | 51.20 | " | " | 22 | found | found | none |
| 9 | 65.00 | " | " | 14 | found | found | none |
| 10 | 79.50 | " | " | 3 | found | found | none |
| 11 | 0.00 | 550 | $N_2$ | 92 | none | found | none |
| 12 | 0.50 | " | " | 91 | none | found | none |
| 13 | 0.90 | " | " | 90 | none | found | none |
| 14 | 2.40 | " | " | 87 | none | found | none |
| 15 | 4.90 | " | " | 85 | none | found | none |
| 16 | 10.40 | " | " | 75 | none | found | none |
| 17 | 31.50 | " | " | 47 | none | found | none |
| 18 | 51.20 | " | " | 29 | none | found | none |
| 19 | 65.00 | " | " | 21 | none | found | none |
| 20 | 79.50 | " | " | 9 | none | found | none |
| 21 | 0.00 | 600 | $N_2$ | 92 | none | found | none |
| 22 | 0.50 | " | " | 91 | none | found | none |
| 23 | 0.90 | " | " | 90 | none | found | none |
| 24 | 2.40 | " | " | 87 | none | found | none |
| 25 | 4.90 | " | " | 85 | none | found | none |
| 26 | 10.40 | " | " | 74 | none | found | none |
| 27 | 31.50 | " | " | 47 | none | found | none |
| 28 | 51.20 | " | " | 29 | none | found | none |
| 29 | 65.00 | " | " | 20 | none | found | none |
| 30 | 79.50 | " | " | 9 | none | found | none |
| 31 | 0.00 | 800 | $N_2$ | 92 | none | found | none |
| 32 | 0.50 | " | " | 91 | none | found | none |
| 33 | 0.90 | " | " | 90 | none | found | none |
| 34 | 2.40 | " | " | 86 | none | found | none |
| 35 | 4.90 | " | " | 85 | none | found | none |
| 36 | 10.40 | " | " | 74 | none | found | none |
| 37 | 31.50 | " | " | 46 | none | found | none |
| 38 | 51.20 | " | " | 29 | none | found | none |
| 39 | 65.00 | " | " | 20 | none | found | none |
| 40 | 79.50 | " | " | 10 | none | found | none |
| 41 | 0.00 | 1100 | $N_2$ | 92 | none | found | none |
| 42 | 0.50 | " | " | 91 | none | found | none |
| 43 | 0.90 | " | " | 90 | none | found | none |
| 44 | 2.40 | " | " | 87 | none | found | none |
| 45 | 4.90 | " | " | 83 | none | found | none |
| 46 | 10.40 | " | " | 75 | none | found | none |
| 47 | 31.50 | " | " | 47 | none | found | none |
| 48 | 51.20 | " | " | 28 | none | found | none |
| 49 | 65.00 | " | " | 20 | none | found | none |
| 50 | 79.50 | " | " | 9 | none | found | none |
| 51 | 0.00 | 1200 | $N_2$ | 92 | none | found | none |
| 52 | 0.50 | " | " | 91 | none | found | none |
| 53 | 0.90 | " | " | 90 | none | found | none |
| 54 | 2.40 | " | " | 87 | none | found | none |
| 55 | 4.90 | " | " | 82 | none | found | none |
| 56 | 10.40 | " | " | 74 | none | found | none |
| 57 | 31.50 | " | " | 47 | none | found | none |
| 58 | 51.20 | " | " | 26 | none | found | none |
| 59 | 65.00 | " | " | 21 | none | found | none |
| 60 | 79.50 | " | " | 8 | none | found | none |
| 61 | 0.00 | 1300 | $N_2$ | 92 | none | found | none |
| 62 | 0.50 | " | " | 91 | none | found | none |
| 63 | 0.90 | " | " | 90 | none | found | none |
| 64 | 2.40 | " | " | 87 | none | found | none |
| 65 | 4.90 | " | " | 85 | none | found | none |
| 66 | 10.40 | " | " | 74 | none | found | none |
| 67 | 31.50 | " | " | 47 | none | found | none |
| 68 | 51.20 | " | " | 29 | none | found | none |
| 69 | 65.00 | " | " | 20 | none | found | none |
| 70 | 79.50 | " | " | 9 | none | found | none |
| 71 | 0.00 | 1450 | $N_2$ | 92 | none | found | none |
| 72 | 0.50 | " | " | 91 | none | found | none |

TABLE 15-continued

Experimental Examples of the Present Invention (Magnetite)

| Sample No. | Amt. of Si added (wt %) | Heating temp. T (°C.) | Atmosphere | Satn. magnetization $\delta s$ (emu/g) | Results of powder X-ray diffractometry $\alpha$-$Fe_2O_3$ | $Fe_3O_4$ | FeO |
|---|---|---|---|---|---|---|---|
| 73 | 0.90 | " | " | 90 | none | found | none |
| 74 | 2.40 | " | " | 87 | none | found | none |
| 75 | 4.90 | " | " | 82 | none | found | none |
| 76 | 10.40 | " | " | 74 | none | found | none |
| 77 | 31.50 | " | " | 47 | none | found | none |
| 78 | 51.20 | " | " | 26 | none | found | none |
| 79 | 65.00 | " | " | 21 | none | found | none |
| 80 | 79.50 | " | " | 8 | none | found | none |
| 81 | 0.00 | 1500 | $N_2$ | 86 | none | found | found |
| 82 | 0.50 | " | " | 85 | none | found | found |
| 83 | 0.90 | " | " | 84 | none | found | found |
| 84 | 2.40 | " | " | 83 | none | found | found |
| 85 | 4.90 | " | " | 75 | none | found | found |
| 86 | 10.40 | " | " | 69 | none | found | found |
| 87 | 31.50 | " | " | 39 | none | found | found |
| 88 | 51.20 | " | " | 22 | none | found | found |
| 89 | 65.00 | " | " | 16 | none | found | found |
| 90 | 79.50 | " | " | 4 | none | found | found |

TABLE 16

Firing Experiment Results (Hematite + Mg) of the Present Invention

| Sample No. | Amt. of Mg added (wt %) | Heating temp. (°C.) | Atmosphere | Satn. magnetization $\delta s$ (emu/g) | Grain strength (Pa) |
|---|---|---|---|---|---|
| 1 | 0.00 | 500 | $N_2$ | 40 | 12E6 |
| 2 | 0.10 | " | " | 41 | 15E6 |
| 3 | 0.20 | " | " | 41 | 14E6 |
| 4 | 0.80 | " | " | 35 | 13E6 |
| 5 | 1.60 | " | " | 29 | 13E6 |
| 6 | 3.60 | " | " | 27 | 12E6 |
| 7 | 13.20 | " | " | 16 | 14E6 |
| 8 | 18.50 | " | " | 10 | 14E6 |
| 9 | 26.20 | " | " | 5 | 12E6 |
| 10 | 40.00 | " | " | 1 | 11E6 |
| 11 | 0.00 | 550 | $N_2$ | 40 | 12E8 |
| 12 | 0.10 | " | " | 41 | 13E8 |
| 13 | 0.20 | " | " | 41 | 12E8 |
| 14 | 0.80 | " | " | 35 | 13E8 |
| 15 | 1.60 | " | " | 29 | 14E8 |
| 16 | 3.60 | " | " | 27 | 13E8 |
| 17 | 13.20 | " | " | 16 | 15E8 |
| 18 | 18.50 | " | " | 10 | 14E8 |
| 19 | 26.20 | " | " | 5 | 15E8 |
| 20 | 40.00 | " | " | 1 | 13E8 |
| 21 | 0.00 | 600 | $N_2$ | 40 | 15E8 |
| 22 | 0.10 | " | " | 41 | 15E8 |
| 23 | 0.20 | " | " | 41 | 16E8 |
| 24 | 0.80 | " | " | 35 | 15E8 |
| 25 | 1.60 | " | " | 28 | 14E8 |
| 26 | 3.60 | " | " | 27 | 16E8 |
| 27 | 13.20 | " | " | 16 | 15E8 |
| 28 | 18.50 | " | " | 11 | 16E8 |
| 29 | 26.20 | " | " | 5 | 15E8 |
| 30 | 40.00 | " | " | 1 | 17E8 |
| 31 | 0.00 | 800 | $N_2$ | 40 | 25E8 |
| 32 | 0.10 | " | " | 41 | 26E8 |
| 33 | 0.20 | " | " | 41 | 26E8 |
| 34 | 0.80 | " | " | 35 | 26E8 |
| 35 | 1.60 | " | " | 29 | 25E8 |
| 36 | 3.60 | " | " | 26 | 28E8 |
| 37 | 13.20 | " | " | 16 | 26E8 |
| 38 | 18.50 | " | " | 10 | 25E8 |
| 39 | 26.20 | " | " | 4 | 27E8 |
| 40 | 40.00 | " | " | 1 | 23E8 |
| 41 | 0.00 | 1100 | $N_2$ | 40 | 16E9 |
| 42 | 0.10 | " | " | 41 | 15E9 |
| 43 | 0.20 | " | " | 40 | 16E9 |
| 44 | 0.80 | " | " | 35 | 16E9 |
| 45 | 1.60 | " | " | 29 | 17E9 |
| 46 | 3.60 | " | " | 24 | 17E9 |
| 47 | 13.20 | " | " | 16 | 17E9 |
| 48 | 18.50 | " | " | 10 | 16E9 |
| 49 | 26.20 | " | " | 5 | 17E9 |
| 50 | 40.00 | " | " | 1 | 17E9 |
| 51 | 0.00 | 1200 | $N_2$ | 92 | 23E9 |
| 52 | 0.10 | " | " | 92 | 24E9 |
| 53 | 0.20 | " | " | 90 | 25E9 |
| 54 | 0.80 | " | " | 87 | 26E9 |
| 55 | 1.60 | " | " | 81 | 25E9 |
| 56 | 3.60 | " | " | 67 | 26E9 |
| 57 | 13.20 | " | " | 32 | 26E9 |
| 58 | 18.50 | " | " | 21 | 23E9 |
| 59 | 26.20 | " | " | 6 | 25E9 |
| 60 | 40.00 | " | " | 1 | 27E9 |
| 61 | 0.00 | 1300 | $N_2$ | 92 | 30E9 |
| 62 | 0.10 | " | " | 92 | 34E9 |
| 63 | 0.20 | " | " | 90 | 34E9 |
| 64 | 0.80 | " | " | 87 | 35E9 |
| 65 | 1.60 | " | " | 81 | 35E9 |
| 66 | 3.60 | " | " | 67 | 36E9 |
| 67 | 13.20 | " | " | 32 | 37E9 |
| 68 | 18.50 | " | " | 21 | 36E9 |
| 69 | 26.20 | " | " | 6 | 36E9 |
| 70 | 40.00 | " | " | 1 | 35E9 |
| 71 | 0.00 | 1400 | $N_2$ | 92 | 33E9 |
| 72 | 0.10 | " | " | 92 | 34E9 |
| 73 | 0.20 | " | " | 90 | 34E9 |
| 74 | 0.80 | " | " | 87 | 35E9 |
| 75 | 1.60 | " | " | 82 | 35E9 |
| 76 | 3.60 | " | " | 67 | 36E9 |
| 77 | 13.20 | " | " | 31 | 37E9 |
| 78 | 18.50 | " | " | 20 | 36E9 |
| 79 | 26.20 | " | " | 6 | 36E9 |
| 80 | 40.00 | " | " | 1 | 35E9 |
| 81 | 0.00 | 1450 | $N_2$ | 92 | 36E9 |
| 82 | 0.10 | " | " | 92 | 37E9 |

TABLE 16-continued

Firing Experiment Results (Hematite + Mg) of the Present Invention

| Sample No. | Amt. of Mg added (wt %) | Heating temp. (°C.) | Atmosphere | Satn. magnetization δs (emu/g) | Grain strength (Pa) |
|---|---|---|---|---|---|
| 83 | 0.20 | " | " | 90 | 36E9 |
| 84 | 0.80 | " | " | 87 | 37E9 |
| 85 | 1.60 | " | " | 81 | 37E9 |
| 86 | 3.60 | " | " | 66 | 36E9 |
| 87 | 13.20 | " | " | 32 | 37E9 |
| 88 | 18.50 | " | " | 20 | 36E9 |
| 89 | 26.20 | " | " | 6 | 37E9 |
| 90 | 40.00 | " | " | 1 | 37E9 |
| 91 | 0.00 | 1500 | $N_2$ | 86 | 40E9 |
| 92 | 0.10 | " | " | 85 | 42E9 |
| 93 | 0.20 | " | " | 82 | 40E9 |
| 94 | 0.80 | " | " | 77 | 41E9 |
| 95 | 1.60 | " | " | 70 | 42E9 |
| 96 | 3.60 | " | " | 65 | 41E9 |
| 97 | 13.20 | " | " | 25 | 43E9 |
| 98 | 18.50 | " | " | 16 | 43E9 |
| 99 | 26.20 | " | " | 3 | 41E9 |
| 100 | 40.00 | " | " | 1 | 40E9 |

TABLE 17

Firing Experiment Results (Hematite + Magnetite + Mg) of the Present Invention

| Sample No. | Amt. of Mg added (wt %) | Heating temp. (°C.) | Atmosphere | Satn. magnetization δs (emu/g) | Grain strength (Pa) |
|---|---|---|---|---|---|
| 1 | 0.00 | 500 | $N_2$ | 60 | 11E6 |
| 2 | 0.10 | " | " | 61 | 12E6 |
| 3 | 0.20 | " | " | 61 | 15E6 |
| 4 | 0.80 | " | " | 55 | 12E6 |
| 5 | 1.60 | " | " | 49 | 11E6 |
| 6 | 3.60 | " | " | 37 | 11E6 |
| 7 | 13.20 | " | " | 26 | 15E6 |
| 8 | 18.50 | " | " | 20 | 12E6 |
| 9 | 26.20 | " | " | 7 | 14E6 |
| 10 | 40.00 | " | " | 3 | 14E6 |
| 11 | 0.00 | 550 | $N_2$ | 62 | 15E8 |
| 12 | 0.10 | " | " | 62 | 15E8 |
| 13 | 0.20 | " | " | 61 | 14E8 |
| 14 | 0.80 | " | " | 52 | 15E8 |
| 15 | 1.60 | " | " | 45 | 17E8 |
| 16 | 3.60 | " | " | 40 | 16E8 |
| 17 | 13.20 | " | " | 31 | 13E8 |
| 18 | 18.50 | " | " | 18 | 13E8 |
| 19 | 26.20 | " | " | 7 | 16E8 |
| 20 | 40.00 | " | " | 3 | 17E8 |
| 21 | 0.00 | 600 | $N_2$ | 62 | 17E8 |
| 22 | 0.10 | " | " | 62 | 15E8 |
| 23 | 0.20 | " | " | 61 | 16E8 |
| 24 | 0.80 | " | " | 52 | 14E8 |
| 25 | 1.60 | " | " | 44 | 15E8 |
| 26 | 3.60 | " | " | 40 | 17E8 |
| 27 | 13.20 | " | " | 31 | 15E8 |
| 28 | 18.50 | " | " | 20 | 15E8 |
| 29 | 26.20 | " | " | 6 | 14E8 |
| 30 | 40.00 | " | " | 3 | 15E8 |
| 31 | 0.00 | 800 | $N_2$ | 62 | 30E8 |
| 32 | 0.10 | " | " | 62 | 36E8 |
| 33 | 0.20 | " | " | 61 | 35E8 |
| 34 | 0.80 | " | " | 53 | 36E8 |
| 35 | 1.60 | " | " | 44 | 34E8 |
| 36 | 3.60 | " | " | 40 | 38E8 |
| 37 | 13.20 | " | " | 32 | 35E8 |
| 38 | 18.50 | " | " | 20 | 36E8 |
| 39 | 26.20 | " | " | 7 | 37E8 |
| 40 | 40.00 | " | " | 3 | 33E8 |
| 41 | 0.00 | 1100 | $N_2$ | 62 | 17E9 |
| 42 | 0.10 | " | " | 62 | 15E9 |

TABLE 17-continued

Firing Experiment Results (Hematite + Magnetite + Mg) of the Present Invention

| Sample No. | Amt. of Mg added (wt %) | Heating temp. (°C.) | Atmosphere | Satn. magnetization δs (emu/g) | Grain strength (Pa) |
|---|---|---|---|---|---|
| 43 | 0.20 | " | " | 61 | 16E9 |
| 44 | 0.80 | " | " | 55 | 16E9 |
| 45 | 1.60 | " | " | 44 | 17E9 |
| 46 | 3.60 | " | " | 41 | 17E9 |
| 47 | 13.20 | " | " | 32 | 17E9 |
| 48 | 18.50 | " | " | 21 | 16E9 |
| 49 | 26.20 | " | " | 7 | 17E9 |
| 50 | 40.00 | " | " | 2 | 17E9 |
| 51 | 0.00 | 1200 | $N_2$ | 92 | 22E9 |
| 52 | 0.10 | " | " | 92 | 24E9 |
| 53 | 0.20 | " | " | 90 | 25E9 |
| 54 | 0.80 | " | " | 87 | 25E9 |
| 55 | 1.60 | " | " | 81 | 25E9 |
| 56 | 3.60 | " | " | 67 | 26E9 |
| 57 | 13.20 | " | " | 32 | 24E9 |
| 58 | 18.50 | " | " | 21 | 25E9 |
| 59 | 26.20 | " | " | 6 | 25E9 |
| 60 | 40.00 | " | " | 1 | 28E9 |
| 61 | 0.00 | 1300 | $N_2$ | 92 | 31E9 |
| 62 | 0.10 | " | " | 92 | 33E9 |
| 63 | 0.20 | " | " | 90 | 34E9 |
| 64 | 0.80 | " | " | 87 | 35E9 |
| 65 | 1.60 | " | " | 81 | 34E9 |
| 66 | 3.60 | " | " | 67 | 35E9 |
| 67 | 13.20 | " | " | 32 | 37E9 |
| 68 | 18.50 | " | " | 21 | 36E9 |
| 69 | 26.20 | " | " | 6 | 36E9 |
| 70 | 40.00 | " | " | 1 | 35E9 |
| 71 | 0.00 | 1400 | $N_2$ | 92 | 33E9 |
| 72 | 0.10 | " | " | 92 | 34E9 |
| 73 | 0.20 | " | " | 90 | 34E9 |
| 74 | 0.80 | " | " | 87 | 35E9 |
| 75 | 1.60 | " | " | 82 | 35E9 |
| 76 | 3.60 | " | " | 67 | 36E9 |
| 77 | 13.20 | " | " | 31 | 37E9 |
| 78 | 18.50 | " | " | 20 | 36E9 |
| 79 | 26.20 | " | " | 6 | 36E9 |
| 80 | 40.00 | " | " | 1 | 35E9 |
| 81 | 0.00 | 1450 | $N_2$ | 92 | 38E9 |
| 82 | 0.10 | " | " | 92 | 36E9 |
| 83 | 0.20 | " | " | 90 | 36E9 |
| 84 | 0.80 | " | " | 87 | 37E9 |
| 85 | 1.60 | " | " | 81 | 37E9 |
| 86 | 3.60 | " | " | 66 | 36E9 |
| 87 | 13.20 | " | " | 32 | 37E9 |
| 88 | 18.50 | " | " | 20 | 36E9 |
| 89 | 26.20 | " | " | 6 | 37E9 |
| 90 | 40.00 | " | " | 1 | 36E9 |
| 91 | 0.00 | 1500 | $N_2$ | 86 | 41E9 |
| 92 | 0.10 | " | " | 85 | 40E9 |
| 93 | 0.20 | " | " | 82 | 40E9 |
| 94 | 0.80 | " | " | 77 | 41E9 |
| 95 | 1.60 | " | " | 70 | 42E9 |
| 96 | 3.60 | " | " | 65 | 41E9 |
| 97 | 13.20 | " | " | 25 | 43E9 |
| 98 | 18.50 | " | " | 16 | 40E9 |
| 99 | 26.20 | " | " | 3 | 41E9 |
| 100 | 40.00 | " | " | 1 | 41E9 |

TABLE 18

Firing Experiment Results (Magnetite + Mg) of the Present Invention

| Sample No. | Amt. of Mg added (wt %) | Heating temp. (°C.) | Atmosphere | Satn. magnetization δs (emu/g) | Grain strength (Pa) |
|---|---|---|---|---|---|
| 1 | 0.00 | 500 | $N_2$ | 65 | 11E6 |
| 2 | 0.10 | " | " | 64 | 12E6 |

TABLE 18-continued

Firing Experiment Results (Magnetite + Mg) of the Present Invention

| Sample No. | Amt. of Mg added (wt %) | Heating temp. (°C.) | Atmosphere | Satn. magnetization δs (emu/g) | Grain strength (Pa) |
|---|---|---|---|---|---|
| 3 | 0.20 | " | " | 64 | 11E6 |
| 4 | 0.80 | " | " | 58 | 11E6 |
| 5 | 1.60 | " | " | 50 | 13E6 |
| 6 | 3.60 | " | " | 44 | 11E6 |
| 7 | 13.20 | " | " | 34 | 14E6 |
| 8 | 18.50 | " | " | 25 | 15E6 |
| 9 | 26.20 | " | " | 10 | 11E6 |
| 10 | 40.00 | " | " | 6 | 14E6 |
| 11 | 0.00 | 550 | $N_2$ | 92 | 15E8 |
| 12 | 0.10 | " | " | 92 | 15E8 |
| 13 | 0.20 | " | " | 91 | 16E8 |
| 14 | 0.80 | " | " | 89 | 15E8 |
| 15 | 1.60 | " | " | 82 | 18E8 |
| 16 | 3.60 | " | " | 72 | 16E8 |
| 17 | 13.20 | " | " | 34 | 17E8 |
| 18 | 18.50 | " | " | 25 | 17E8 |
| 19 | 26.20 | " | " | 10 | 16E8 |
| 20 | 40.00 | " | " | 6 | 17E8 |
| 21 | 0.00 | 600 | $N_2$ | 92 | 14E8 |
| 22 | 0.10 | " | " | 92 | 15E8 |
| 23 | 0.20 | " | " | 91 | 15E8 |
| 24 | 0.80 | " | " | 89 | 14E8 |
| 25 | 1.60 | " | " | 82 | 16E8 |
| 26 | 3.60 | " | " | 72 | 17E8 |
| 27 | 13.20 | " | " | 34 | 15E8 |
| 28 | 18.50 | " | " | 25 | 16E8 |
| 29 | 26.20 | " | " | 10 | 15E8 |
| 30 | 40.00 | " | " | 6 | 16E8 |
| 31 | 0.00 | 800 | $N_2$ | 92 | 22E8 |
| 32 | 0.10 | " | " | 92 | 26E8 |
| 33 | 0.20 | " | " | 91 | 25E8 |
| 34 | 0.80 | " | " | 88 | 26E8 |
| 35 | 1.60 | " | " | 82 | 24E8 |
| 36 | 3.60 | " | " | 72 | 26E8 |
| 37 | 13.20 | " | " | 33 | 25E8 |
| 38 | 18.50 | " | " | 25 | 28E8 |
| 39 | 26.20 | " | " | 11 | 27E8 |
| 40 | 40.00 | " | " | 6 | 23E8 |
| 41 | 0.00 | 1100 | $N_2$ | 92 | 17E9 |
| 42 | 0.10 | " | " | 92 | 15E9 |
| 43 | 0.20 | " | " | 91 | 16E9 |
| 44 | 0.80 | " | " | 88 | 16E9 |
| 45 | 1.60 | " | " | 83 | 18E9 |
| 46 | 3.60 | " | " | 72 | 17E9 |
| 47 | 13.20 | " | " | 33 | 17E9 |
| 48 | 18.50 | " | " | 25 | 17E9 |
| 49 | 26.20 | " | " | 11 | 17E9 |
| 50 | 40.00 | " | " | 7 | 17E9 |
| 51 | 0.00 | 1200 | $N_2$ | 92 | 23E9 |
| 52 | 0.10 | " | " | 92 | 24E9 |
| 53 | 0.20 | " | " | 90 | 26E9 |
| 54 | 0.80 | " | " | 87 | 25E9 |
| 55 | 1.60 | " | " | 81 | 26E9 |
| 56 | 3.60 | " | " | 67 | 27E9 |
| 57 | 13.20 | " | " | 33 | 24E9 |
| 58 | 18.50 | " | " | 21 | 25E9 |
| 59 | 26.20 | " | " | 7 | 25E9 |
| 60 | 40.00 | " | " | 1 | 28E9 |
| 61 | 0.00 | 1300 | $N_2$ | 92 | 35E9 |
| 62 | 0.10 | " | " | 92 | 33E9 |
| 63 | 0.20 | " | " | 90 | 34E9 |
| 64 | 0.80 | " | " | 87 | 35E9 |
| 65 | 1.60 | " | " | 81 | 34E9 |
| 66 | 3.60 | " | " | 65 | 35E9 |
| 67 | 13.20 | " | " | 32 | 37E9 |
| 68 | 18.50 | " | " | 21 | 35E9 |
| 69 | 26.20 | " | " | 6 | 36E9 |
| 70 | 40.00 | " | " | 1 | 35E9 |
| 71 | 0.00 | 1400 | $N_2$ | 92 | 33E9 |
| 72 | 0.10 | " | " | 92 | 34E9 |
| 73 | 0.20 | " | " | 90 | 34E9 |
| 74 | 0.80 | " | " | 87 | 35E9 |
| 75 | 1.60 | " | " | 82 | 35E9 |
| 76 | 3.60 | " | " | 65 | 36E9 |
| 77 | 13.20 | " | " | 31 | 37E9 |
| 78 | 18.50 | " | " | 20 | 37E9 |
| 79 | 26.20 | " | " | 6 | 36E9 |
| 80 | 40.00 | " | " | 1 | 35E9 |
| 81 | 0.00 | 1450 | $N_2$ | 92 | 38E9 |
| 82 | 0.10 | " | " | 92 | 36E9 |
| 83 | 0.20 | " | " | 90 | 36E9 |
| 84 | 0.80 | " | " | 87 | 37E9 |
| 85 | 1.60 | " | " | 81 | 36E9 |
| 86 | 3.60 | " | " | 66 | 36E9 |
| 87 | 13.20 | " | " | 33 | 36E9 |
| 88 | 18.50 | " | " | 21 | 37E9 |
| 89 | 26.20 | " | " | 6 | 38E9 |
| 90 | 40.00 | " | " | 1 | 37E9 |
| 91 | 0.00 | 1500 | $N_2$ | 86 | 40E9 |
| 92 | 0.10 | " | " | 85 | 40E9 |
| 93 | 0.20 | " | " | 82 | 40E9 |
| 94 | 0.80 | " | " | 76 | 41E9 |
| 95 | 1.60 | " | " | 70 | 42E9 |
| 96 | 3.60 | " | " | 65 | 41E9 |
| 97 | 13.20 | " | " | 23 | 43E9 |
| 98 | 18.50 | " | " | 16 | 40E9 |
| 99 | 26.20 | " | " | 2 | 41E9 |
| 100 | 40.00 | " | " | 1 | 41E9 |

TABLE 19

Firing Experiment Results (Hematite + Mg + Mn) of the Present Invention

Mg = 3.60 wt %

| Sample No. | Amt. of Mn added (wt %) | Heating temp. (°C.) | Atmosphere | Satn. magnetization δs (emu/g) | Grain strength (Pa) |
|---|---|---|---|---|---|
| 1 | 0.00 | 550 | $N_2$ | 27 | 14E8 |
| 2 | 0.10 | " | " | 27 | 14E8 |
| 3 | 0.20 | " | " | 27 | 14E8 |
| 4 | 0.50 | " | " | 28 | 16E8 |
| 5 | 1.00 | " | " | 29 | 17E8 |
| 6 | 2.00 | " | " | 31 | 17E8 |
| 7 | 3.00 | " | " | 32 | 17E8 |
| 8 | 4.00 | " | " | 33 | 17E8 |
| 9 | 6.00 | " | " | 35 | 17E8 |
| 10 | 8.00 | " | " | 37 | 17E8 |
| 11 | 10.00 | " | " | 39 | 17E8 |
| 12 | 0.00 | 1300 | $N_2$ | 67 | 36E9 |
| 13 | 0.10 | " | " | 67 | 36E9 |
| 14 | 0.20 | " | " | 67 | 37E9 |
| 15 | 0.50 | " | " | 68 | 40E9 |
| 16 | 1.00 | " | " | 69 | 45E9 |
| 17 | 2.00 | " | " | 71 | 48E9 |
| 18 | 3.00 | " | " | 72 | 50E9 |
| 19 | 4.00 | " | " | 73 | 51E9 |
| 20 | 6.00 | " | " | 75 | 52E9 |
| 21 | 8.00 | " | " | 77 | 52E9 |
| 22 | 10.00 | " | " | 80 | 52E9 |

We claim:

1. A process for producing magnetic oxide, comprising the steps of mixing a given amount ranging from 0.20 to 76.0% by weight of at least one member selected from among Ca, Ti, Sn, Si and Mg magnetization control (regulation) materials with hematite, a mixture of hematite and magnetite, or magnetite as a starting material to obtain a mixed powder, adding 0.1 to 4.0% by weight of a liquid or powdery substance having a carbon-to-carbon single or double bond to the mixed powder, stirring the mixture to obtain a substantially homogeneous mixture and sintering the obtained mixture in an inert gas at 550° to 1500° C.

2. The process according to claim 1, wherein said starting material is hematite or a mixture of hematite and magnetite, said magnetization control material is Ca and mixed in an amount of 1.43 to 64.0% by weight, and said sintering is conducted at 1200° to 1450° C.

3. The process according to claim 1, wherein said starting material is magnetite, said magnetization control material is Ca and mixed in an amount of 1.43 to 64.0% by weight, and said sintering is conducted at 550° to 1450° C.

4. The process according to claim 1, wherein, prior to said sintering, said mixed powder is granulated into globular grains to thereby render the powder globular.

5. The process according to claim 1, wherein 47.3 to 98.8% by weight of magnetite as the starting material is mixed with 1.2 to 52.7% by weight in terms of Ti, of a Ti compound as the magnetization control material, and said sintering is conducted at 550° to 1450° C.

6. The process according to claim 1, wherein a mixture of 9.8 to 98.8% by weight of magnetite and 0 to 79.0% by weight of hematite as the starting material is mixed with 1.2 to 52.7% by weight, in terms of Ti, of a Ti compound as the magnetization control material, and said sintering is conducted at 1200° to 1450° C.

7. The process according to claim 1, wherein 24.0 to 99.2% by weight of hematite or a mixture of hematite and magnetite as the starting material is mixed with 0.8 to 76.0% by weight, in terms of Sn, of an Sn compound as the magnetization control material, and said sintering is conducted at 1200° to 1450° C.

8. The process according to claim 1, wherein 24.0 to 99.2% by weight of magnetite as the starting material is mixed with 0.8 to 76.0% by weight, in terms of Sn, of an Sn compound as the magnetization control material, and said sintering is conducted at 550° to 1450° C.

9. The process according to claim 1, wherein 35.0 to 99.5% by weight of hematite as the starting material is mixed with 0.5 to 65% by weight, in terms of Si, of an Si compound as the magnetization control material, and said sintering is conducted at 1200° to 1450° C.

10. The process according to claim 1, wherein 35.0 to 99.5% by weight of a mixture of hematite and magnetite as the starting material is mixed with 0.5 to 65% by weight, in terms of Si, of an Si compound as the magnetization control material, and said sintering is conducted at 1200° to 1450° C.

11. The process according to claim 1, wherein 35.0 to 99.5% by weight of magnetite as the starting material is mixed with 0.5 to 65% by weight, in terms of Si, of an Si compound as the magnetization control material, and said sintering is conducted at 550° to 1450° C.

12. The process according to claim 1, wherein said starting material is hematite or a mixture of hematite and magnetite, the magnetization control material is an Mg compound and mixed in an amount of 0.20 to 18.50% by weight, in terms of Mg, and said sintering is conducted at 550° to 1500° C.

13. The process according to claim 1, wherein said starting material is magnetite, the magnetization control material is an Mg compound and mixed in an amount of 0.20 to 26.20% by weight, in terms of Mg, and said sintering is conducted at 550° to 1500° C.

14. The process according to claim 1, wherein said starting material is hematite or a mixture of hematite and magnetite compounded with 0.20 to 10.0% by weight of Mn, the magnetization control material is an Mg compound and mixed in an amount of 0.20 to 18.50% by weight, in terms of Mg, and said sintering is conducted at 550° to 1500° C.

15. The process according to claim 1, wherein said starting material is magnetite compounded with 0.20 to 10.0% by weight of Mn, the magnetization control material is an Mg compound and mixed in an amount of 0.20 to 26.20% by weight, in terms of Mg, and said sintering is conducted at 550° to 1500° C.

16. A magnetic oxide obtained by mixing a given amount ranging from 0.20 to 76.0% by weight of as least one member selected from among Ca, Ti, Sn, Si and Mg magnetization control (regulation) materials with hematite, a mixture of hematite and magnetite, or magnetite as a starting material to obtain a mixed powder, adding 0.1 to 4.0% by weight of a liquid or powdery substance having a carbon-to-carbon single or double bond to the mixed powder, stirring the mixture to obtain a substantially homogeneous mixture and sintering the obtained mixture in an inert gas at 550° to 1500° C.

\* \* \* \* \*